(12) United States Patent
Masuno et al.

(10) Patent No.: US 7,551,794 B2
(45) Date of Patent: Jun. 23, 2009

(54) METHOD APPARATUS, AND RECORDING MEDIUM FOR SMOOTHING LUMINANCE OF AN IMAGE

(75) Inventors: Tomonori Masuno, Tokyo (JP); Tomoo Mitsunaga, Kanagawa (JP); Hiroaki Ono, Saitama (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 11/037,806

(22) Filed: Jan. 18, 2005

(65) Prior Publication Data

US 2005/0180629 A1    Aug. 18, 2005

(30) Foreign Application Priority Data

Jan. 19, 2004    (JP)    ............................. 2004-010124

(51) Int. Cl.
 *G06K 9/36*    (2006.01)
(52) U.S. Cl. ....................... 382/264; 382/274; 382/275; 358/3.26; 358/3.27; 358/463
(58) Field of Classification Search ................ 382/264, 382/274, 275; 358/3.26, 3.27, 463
See application file for complete search history.

(56) References Cited

U.S. PATENT DOCUMENTS

| | | | | |
|---|---|---|---|---|
| 5,136,390 A | * | 8/1992 | Inova et al. ................. 348/383 |
| 5,719,398 A | * | 2/1998 | Colak ....................... 250/341.1 |
| 5,900,732 A | * | 5/1999 | Felmlee et al. .............. 324/309 |
| 6,590,703 B2 | * | 7/2003 | Park et al. .................... 359/372 |
| 6,653,794 B2 | * | 11/2003 | Sagano et al. ............. 315/169.2 |
| 6,678,220 B1 | * | 1/2004 | Saga ........................ 369/44.27 |
| 6,967,651 B2 | * | 11/2005 | Endoh et al. ................. 345/428 |
| 6,971,063 B1 | * | 11/2005 | Rappaport et al. .......... 715/733 |
| 6,985,141 B2 | * | 1/2006 | Abe et al. .................... 345/204 |
| 7,243,054 B2 | * | 7/2007 | Rappaport et al. ............. 703/2 |

FOREIGN PATENT DOCUMENTS

JP    10-283470    10/1998

* cited by examiner

*Primary Examiner*—Yosef Kassa
(74) *Attorney, Agent, or Firm*—Finnegan, Henderson, Farabow, Garrett & Dunner, L.L.P.

(57) ABSTRACT

A smoothing calculator determines a smoothed mean luminance value $C1 \times \mu(t)+(1-C1)\mu'(t-1)$ based on a mean luminance value $\mu(t)$ input at time t and a smoothed mean luminance value $\mu'(t-1)$ read at time $(t-1)$ from a buffer, and outputs the smoothed mean luminance value $C1 \times \mu(t)+(1-C1)\mu'(t-1)$ as the smoothed mean luminance value $\mu(t)$ of the mean luminance value $\mu(t)$. Coefficient C1 is greater than 0 but smaller than 1. Gradation conversion responsive to luminance variation from frame to frame in a moving image is thus achieved.

16 Claims, 43 Drawing Sheets

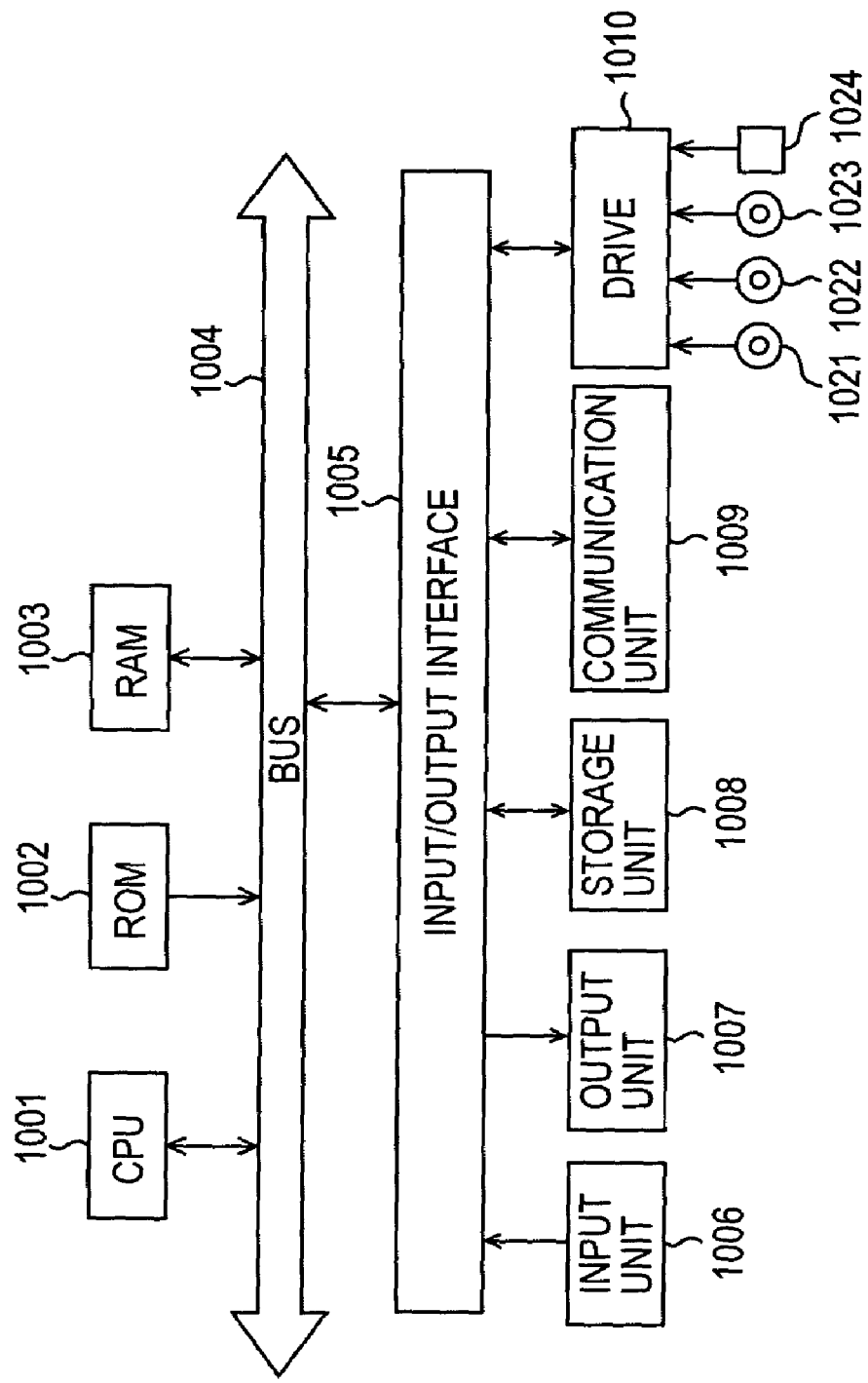

METHOD APPARATUS, AND RECORDING MEDIUM FOR SMOOTHING LUMINANCE OF AN IMAGE

BACKGROUND OF THE INVENTION

1. Field of the Invention

The present invention relates an image processing method, an image processing apparatus, a recording medium, and a computer program and, in particular, to an image processing method, an image processing apparatus for processing an image, a recording medium, and a computer program for performing gradation conversion responsive to a luminance variation from frame to frame in a moving image.

2. Description of the Related Art

A variety of gradation conversion methods have been proposed to compress a tonal gradation of image data captured by a solid-state image pickup device, such as a charge-coupled device (CCD), to present the image on a low-dynamic range on-screen media or print media to enhance contrast for attractive looking. For example, a histogram is produced from captured image data, a proper modification is applied to the histogram based on a maximum value and a minimum value of the histogram, and a representative value of the entire distribution of the data to produce a lookup table (LUT), and tonal gradation conversion is performed using the LUT (Japanese Unexamined Patent Application Publication No. 10-283470).

Known gradation conversion techniques are based on still images. The gradation conversion is performed with respect to both end-points of a luminance histogram of the image. If large variations take place in the histogram from frame to frame, the curve of the gradation conversion changes. The brightness level of the entire scene frequently changes, thereby making the scene aesthetically unpleasing.

For example, FIGS. 1A, 2A, and 3A show three consecutive frames, and FIGS. 1B, 2B, and 3B illustrate histograms of luminance values of the respective frames of FIGS. 1A, 2A, and 3A.

Captured image data on a per frame basis has a certain dynamic range. For convenience of explanation, the captured image data is an image 1 with the dynamic range thereof compressed into 8 bits.

The body of a plane represented by an object 21a of FIG. 2A, and an object 21b of FIG. 3A has the highest luminance in each frame, followed by a cloud 11 and the sky 12 in FIGS. 1A-3A. A roof 13 of a building has the lowest luminance.

The captured image data is subjected to a typical contrast enhancement process. For example, the top end and bottom end of a five-point histogram are assigned to a maximum luminance value and a minimum luminance value, respectively. In histograms of FIGS. 1B, 2B, and 3B, broken lines show that pixels are present within a width of the five-point histogram defined by the two broken lines. The range defined by the width corresponds to a dynamic range of an output image.

Since a range R1 of the histogram is assigned to the dynamic range as shown FIG. 1A, a high-contrast image output is expected. When the object 21a appears in the screen as shown in FIG. 2B, the histogram contains high frequency of occurrences of high luminance pixels. The dynamic range of luminance assigned to the output image thus extends. Since a white level is assigned to the highest luminance object 21a, the image of FIG. 1A is generally dark except the roof 13. The image of FIG. 1A appears to slightly lack contrast.

As shown in FIG. 3A, the object 21a shifts and appears as the object 21b. A high-luminance area is reduced, and the luminance dynamic range assigned to the output image is narrowed. For this reason, an image area other than the object 21b appears bright, presenting a slightly increased contrast.

If the result of gradation conversion shown in FIGS. 1A-3A is shown in a moving image, the brightness of the screen changes from frame to frame. Viewers feel as if the screen flickers. This is annoying to the users.

The problem involved in the gradation conversion has been discussed. To overcome this problem, stored gradation conversion results of a plurality of past frames and the result of a current frame may be averaged to ease sharp variations in scene luminance taking from frame to frame. However, requirements for computation performance and memory capacity become excessively high.

SUMMARY OF THE INVENTION

Accordingly, an object of the present invention is to control frame-by-frame flickering by smoothing parameters controlling frame-by-frame luminance in time sequence while reducing computation performance requirement and memory capacity requirement.

According to a first aspect of the present invention, an image processing apparatus includes a unit for calculating luminance domain information representing a width of a luminance distribution of an image, a unit for smoothing in time sequence the luminance domain information calculated by the luminance domain information calculating unit to output smoothed luminance domain information, and a unit for normalizing luminance of the image in accordance with a luminance range of a display displaying the image, based on the smoothed luminance domain information outputted from the luminance domain information smoothing unit.

The luminance domain information calculating unit may calculate a low-end luminance value and a high-end luminance value of the luminance distribution of the image as the luminance domain information.

The luminance domain information smoothing unit may perform, using a predetermined weight, a multiplication and summing operation on the luminance domain information of a first frame to be smoothed and the luminance domain information of a plurality of frames having a predetermined time-sequence relationship with the first frame to smooth the luminance domain information of the first frame in time sequence and to output the smoothed luminance domain information in time sequence.

The luminance domain information smoothing unit may perform, using a predetermined weight, a multiplication and summing operation on the luminance domain information of a first frame to be smoothed and the smoothed luminance domain information of a plurality of frames having a predetermined time-sequence relationship with the first frame to smooth the luminance domain information of the first frame in time sequence and to output the smoothed luminance domain information in time sequence.

The image processing apparatus may further include unit for calculating a mean luminance value of the image, and a unit for smoothing, in time sequence, the mean luminance value calculated by the mean luminance value calculating unit to output smoothed mean luminance value, and a unit for correcting brightness of the image based on the smoothed mean luminance value outputted from the mean luminance value smoothing unit.

The mean luminance value calculating unit may segment the image into m×n blocks, determine a mean luminance value of each block, and perform a multiplication and summing operation on the mean luminance values of the blocks using a predetermined weight in order to calculate the mean luminance value of the image.

The mean luminance value time-sequence smoothing unit may perform, using a predetermined weight, a multiplication and summing operation on a mean pixel value of a first frame to be smoothed and mean pixel values of a plurality of frames having a predetermined time-sequence relationship with the first frame to smooth the mean pixel value of the image in time sequence and to output the smoothed mean pixel value.

The mean luminance value time-sequence smoothing unit may perform, using a predetermined weight, a multiplication and summing operation on a mean pixel value of a first frame to be smoothed and smoothed mean pixel values of a plurality of frames having a predetermined time-sequence relationship with the first frame to smooth the mean pixel value of the image in time sequence and to output the smoothed mean pixel value.

The image processing apparatus may further include a unit for logarithmically converting a pixel value of the image, and a unit for anti-logarithmically converting a pixel value of the image, wherein the mean luminance value calculating unit calculates the mean luminance value of the image logarithmically converted by the logarithmically converting unit, and wherein the anti-logarithmically converting unit anti-logarithmically converts the image corrected by the brightness correcting unit.

According to a second aspect of the present invention, an image processing method includes steps of calculating luminance domain information representing a width of a luminance distribution of an image, smoothing in time sequence the luminance domain information calculated in the luminance domain information calculating step to output smoothed luminance domain information, and normalizing luminance of the image in accordance with a luminance range of a display displaying the image based on the smoothed luminance domain information output in the luminance domain information smoothing step.

According to a third aspect of the present invention, a recording medium stores a computer-executable program. The computer-executable program includes program codes for performing steps of calculating luminance domain information representing a width of a luminance distribution of an image, smoothing in time sequence the luminance domain information calculated in the luminance domain information calculating step to output smoothed luminance domain information, and normalizing luminance of the image in accordance with a luminance range of a display displaying the image, based on the smoothed luminance domain information output in the luminance domain information smoothing step.

According to a fourth aspect of the present invention, a computer-executable program includes program codes for performing steps of calculating luminance domain information representing a width of a luminance distribution of an image, smoothing in time sequence the luminance domain information calculated in the luminance domain information calculating step to output smoothed luminance domain information, and normalizing luminance of the image in accordance with a luminance range of a display displaying the image based on the smoothed luminance domain information output in the luminance domain information smoothing step.

According to a fifth aspect of the present invention, an image processing apparatus includes a unit for calculating a mean luminance value of an image, a unit for smoothing, in time sequence, the mean luminance value calculated by the mean luminance value calculating unit to output smoothed mean luminance value, and a unit for correcting brightness of the image based on the smoothed mean luminance value outputted from the mean luminance value smoothing unit.

The mean luminance value calculating unit may segment the image into m×n blocks, determine a mean luminance value of each block, and perform a multiplication and summing operation on the mean luminance values of the blocks using a predetermined weight in order to calculate the mean luminance value of the image.

The mean luminance value time-sequence smoothing unit may perform, using a predetermined weight, a multiplication and summing operation on a mean pixel value of a first frame to be smoothed and mean pixel values of a plurality of frames having a predetermined time-sequence relationship with the first frame to smooth the mean pixel value of the image in time sequence and to output the smoothed mean pixel value.

The mean luminance value time-sequence smoothing unit may perform, using a predetermined weight, a multiplication and summing operation on a mean pixel value of a first frame to be smoothed and smoothed mean pixel values of a plurality of frames having a predetermined time-sequence relationship with the first frame to smooth the mean pixel value of the image in time sequence and to output the smoothed mean pixel value.

The image processing apparatus may further include a unit for logarithmically converting a pixel value of the image, and a unit for anti-logarithmically converting a pixel value of the image, wherein the mean luminance value calculating unit calculates the mean luminance value of the image logarithmically converted by the logarithmically converting unit, and wherein the anti-logarithmically converting unit anti-logarithmically converts the image corrected by the brightness correcting unit.

According to a sixth aspect of the present invention, an image processing method includes steps of calculating a mean luminance value of an image, smoothing, in time sequence, the mean luminance value calculated in the mean luminance value calculating step to output a smoothed mean luminance value, and correcting brightness of the image based on the smoothed mean luminance value output in the mean luminance value smoothing step.

According to a seventh aspect of the present invention, a recording medium stores a computer-executable program. The computer-executable program includes program codes for performing steps of calculating a mean luminance value of an image, smoothing, in time sequence, the mean luminance value calculated in the mean luminance value calculating step to output a smoothed mean luminance value, and correcting brightness of the image based on the smoothed mean luminance value output in the mean luminance value smoothing step.

According to an eighth aspect of the present invention, a computer-executable program includes program code for performing steps of calculating a mean luminance value of an image, smoothing, in time sequence, the mean luminance value calculated in the mean luminance value calculating step to output a smoothed mean luminance value, and correcting brightness of the image based on the smoothed mean luminance value output in the mean luminance value smoothing step.

In accordance with the present invention, the luminance domain information representing the width of the luminance distribution of the image is calculated, the calculated luminance domain information is smoothed in time sequence, and the smoothed luminance domain information is outputted. In response to the output luminance domain information, the luminance of the image is normalized in accordance with the luminance range of the display that displays the image.

In accordance with the present invention, the mean luminance value of the image is calculated, the calculated mean luminance value is smoothed in time sequence, and the smoothed mean luminance value is outputted. Based on the output smoothed mean luminance value, the brightness of the image is corrected.

The image processing apparatus can be an independent apparatus, or in an apparatus a unit that processes an image.

In accordance with the present invention, flickering responsive to luminance variations from frame to frame in a moving image is controlled while computation performance requirement and memory capacity requirement in a gradation compression process are reduced.

BRIEF DESCRIPTION OF THE DRAWINGS

FIG. 43 is a block diagram illustrating a general-purpose personal computer.

DESCRIPTION OF THE PREFERRED EMBODIMENTS

Figure 5:
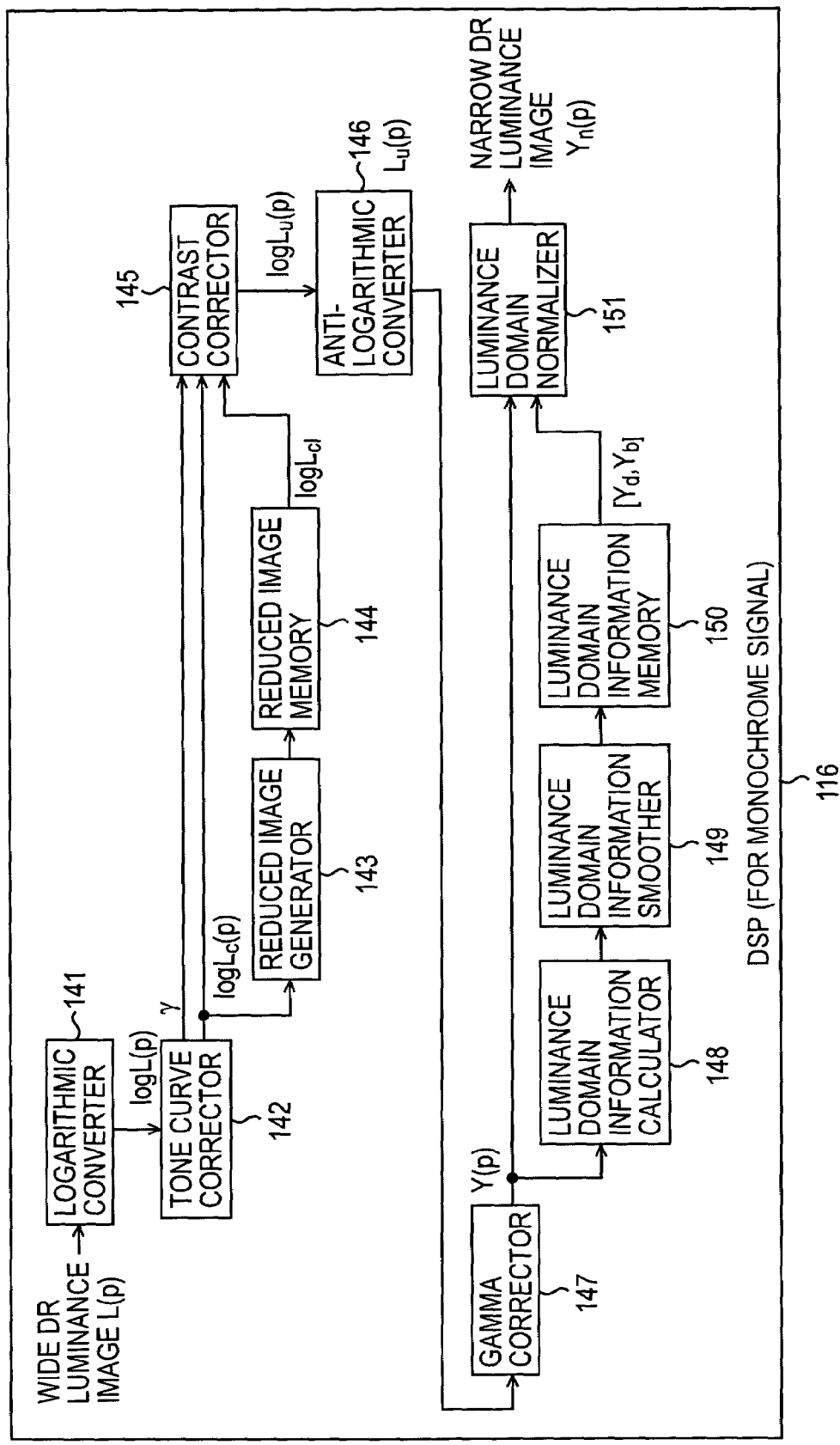
FIG. 5 is a block diagram of a first arrangement of a digital signal processor (DSP)

An image processing apparatus of the present invention includes a unit (for example, a luminance domain information calculator 148 of FIG. 5) for calculating luminance domain information representing a width of a luminance distribution of an image, a unit (for example, a luminance domain information smoother 149 of FIG. 5) for smoothing in time sequence the luminance domain information calculated by the luminance domain information calculating unit to output smoothed luminance domain information, and a unit (for example, a luminance domain normalizer 151 of FIG. 5) for normalizing luminance of the image in accordance with a luminance range of a display displaying the image, based on the smoothed luminance domain information outputted from the luminance domain information smoothing unit.

The image processing apparatus of the present invention further includes a unit (for example, a mean luminance calculator 213 of FIG. 9) for calculating a mean luminance value of the image, a unit (for example, a mean luminance smoother 214 of FIG. 9) for smoothing, in time sequence, the mean luminance value calculated by the mean luminance value calculating unit to output smoothed mean luminance value, and a unit (for example, a contrast corrector 145 of FIG. 5) for correcting brightness of the image based on the smoothed mean luminance value outputted from the mean luminance value smoothing unit.

The image processing apparatus of the present invention further includes a unit (for example, a logarithmic converter 141 of FIG. 5) for logarithmically converting a pixel value of the image, and a unit (for example, an anti-logarithmic converter 146 of FIG. 5) for anti-logarithmically converting a pixel value of the image. The mean luminance value calculating unit calculates the mean luminance value of the image logarithmically converted by the logarithmically converting unit, and the anti-logarithmically converting unit anti-logarithmically converts the image corrected by the brightness correcting unit.

Figure 24:
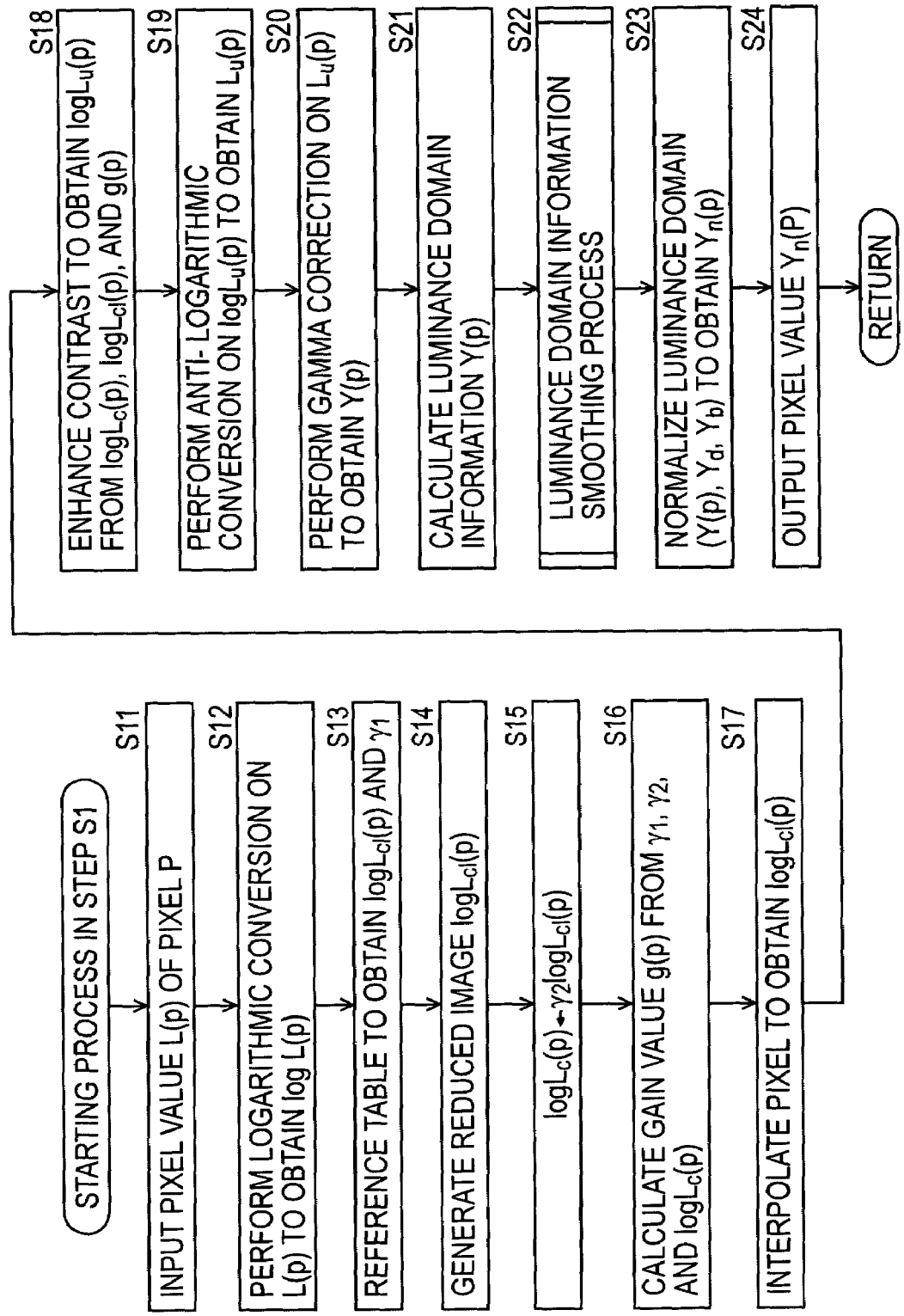
FIG. 24 is a flowchart illustrating a detailed process in step S1 of FIG. 23.

An image processing method of the present invention includes steps of calculating luminance domain information representing a width of a luminance distribution of an image (for example, a process in step S21 in a flowchart of FIG. 24), smoothing in time sequence the luminance domain information calculated in the luminance domain information calculating step to output smoothed luminance domain information (for example, a process in step S22 in the flowchart of FIG. 24), and normalizing luminance of the image in accordance with a luminance range of a display displaying the image based on the smoothed luminance domain information output in the luminance domain information smoothing step (for example, a process in step S23 in the flowchart of FIG. 24).

An image processing apparatus of the present invention includes a unit (for example, the mean luminance calculator 213 of FIG. 9) for calculating a mean luminance value of an image, a unit (for example, the mean luminance smoother 214 of FIG. 9) for smoothing, in time sequence, the mean luminance value calculated by the mean luminance value calculating unit to output smoothed mean luminance value, and a unit 8 (for example, the contrast corrector 145 of FIG. 5) for correcting brightness of the image based on the smoothed mean luminance value outputted from the mean luminance value smoothing unit.

The image processing apparatus further includes a unit (for example, the logarithmic converter 141 of FIG. 5) for logarithmically converting a pixel value of the image, and a unit (for example, the anti-logarithmic converter 146 of FIG. 5) for anti-logarithmically converting a pixel value of the image. The mean luminance value calculating unit calculates the mean luminance value of the image logarithmically converted by the logarithmically converting unit, and the anti-logarithmically converting unit anti-logarithmically converts the image that has been corrected by the brightness correcting unit.

An image processing method of the present invention includes steps of calculating a mean luminance value of an image (for example, a process in step S42 in a flowchart of FIG. 6), smoothing, in time sequence, the mean luminance value calculated in the mean luminance value calculating step to output a smoothed mean luminance value (for example, a process in step S43 in the flowchart of FIG. 6), and correcting brightness of the image based on the smoothed mean luminance value output in the mean luminance value smoothing step (for example, a process in step S18 in the flowchart of FIG. 24).

The correspondence between elements in a recording medium and a computer program of the present invention and specific elements in the embodiments to be discussed later remains unchanged from that in the image process method described above, and the discussion thereof is omitted here.

A digital video camera 101 of one embodiment of the present invention is described below with reference to the drawings.

Figure 1A:
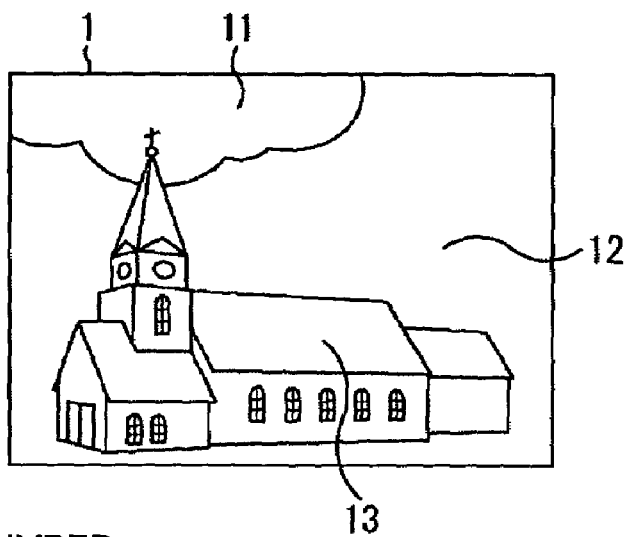
FIGS. 1A and 1B show an image and a histogram thereof.
Figure 1B:
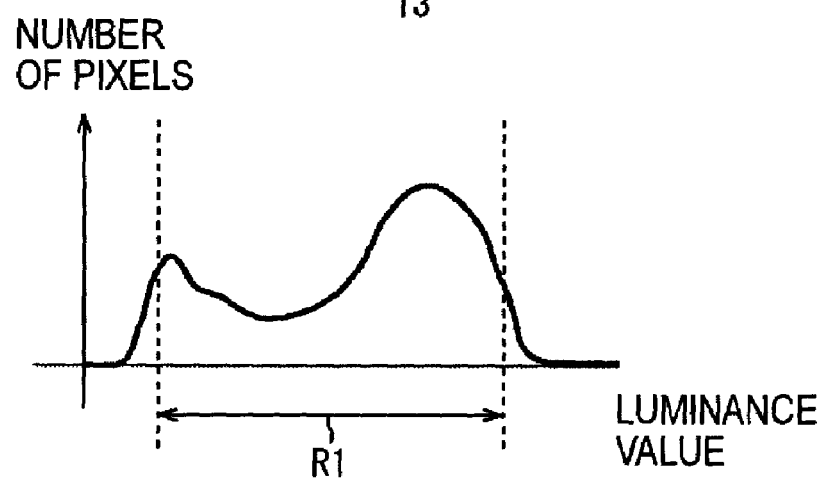
Figure 2A:
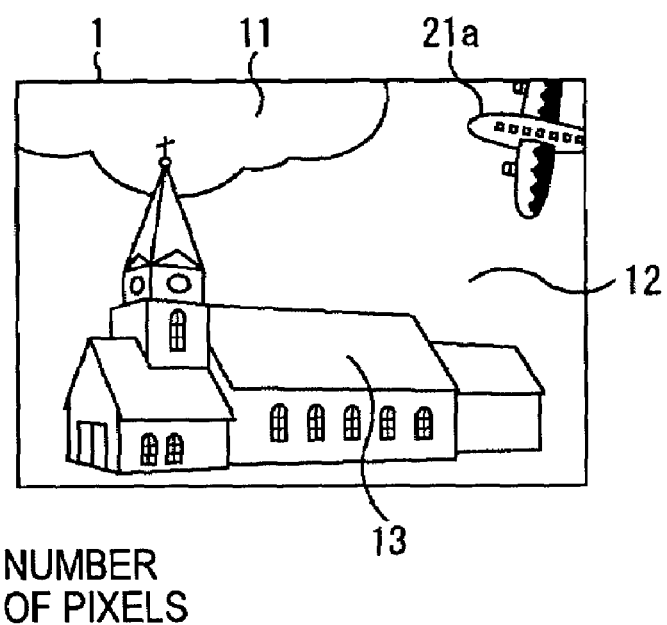
FIGS. 2A and 2B show an image and a histogram thereof.
Figure 2B:
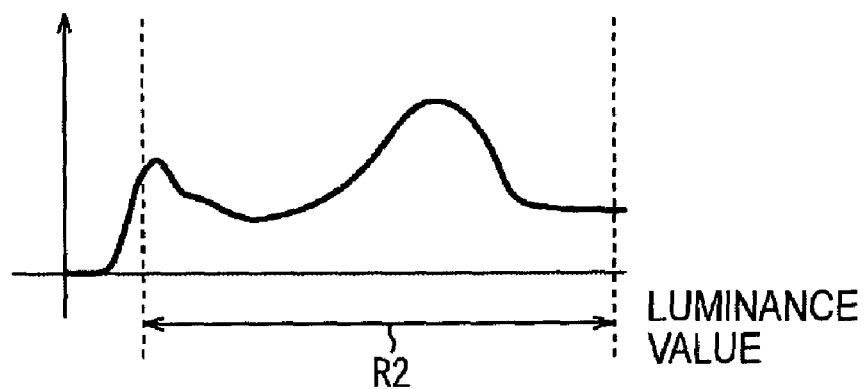
Figure 3A:
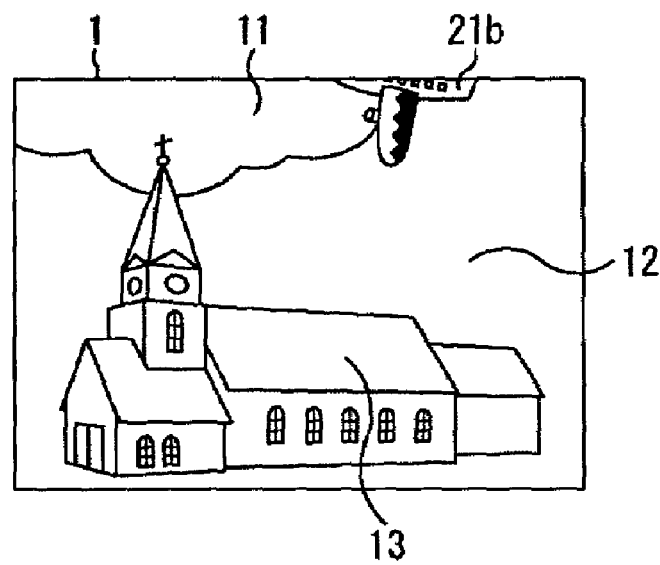
FIGS. 3A and 3B show an image and a histogram thereof.
Figure 3B:
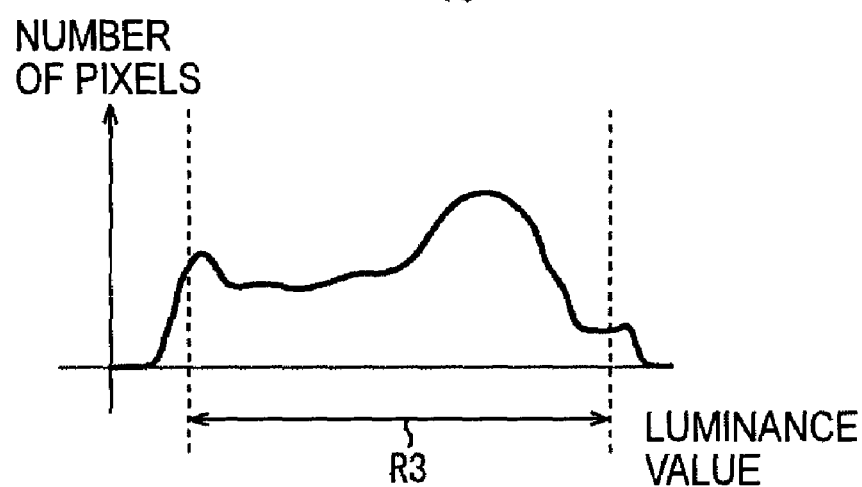
Figure 4:
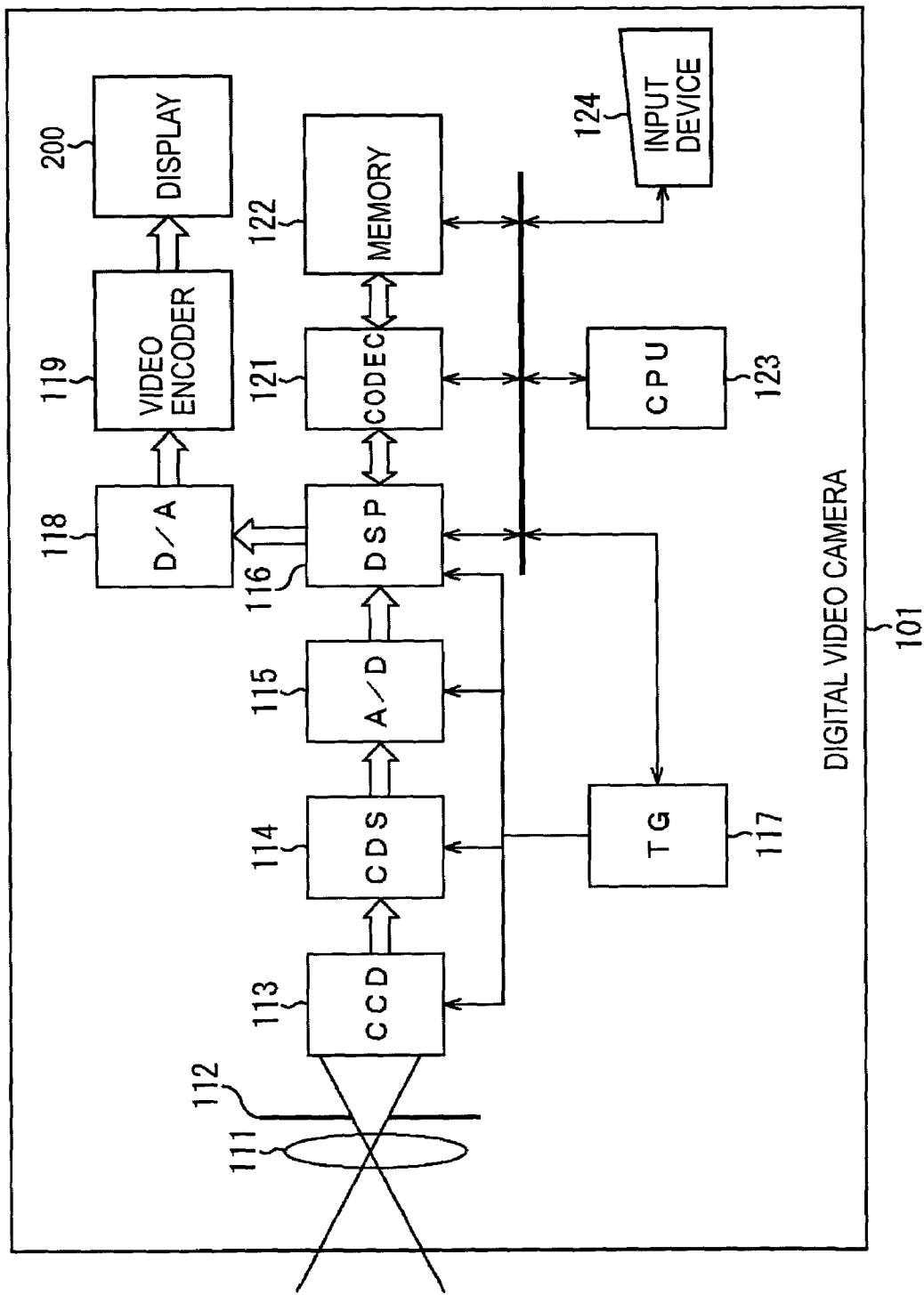
FIG. 4 is a block diagram of a digital video camera in accordance with one embodiment of the present invention.

FIG. 4 illustrates the digital video camera 101 of the embodiment of the present invention. The digital video camera 101 photographs an object, generates a wide dynamic range (DR) image, wider in a dynamic range than a standard image, and records the image onto a predetermined recording medium. The digital video camera 101 also displays the image on a display that also serves as a viewfinder or a video monitor for determining a picture composition. The digital video camera 101 converts the wide DR image into a narrower DR image before outputting the image to an external device. The digital video camera 101 thus controls frame-to-frame flickering.

The digital video camera 101 includes, as major portions thereof, an optical system, a signal processing system, a recording system, a display system, and a control system.

The optical system includes a lens 111 collecting an optical image of an object, a diaphragm 112 adjusting the amount of light of the optical image, and a charge-coupled device (CCD) image sensor 113 photoelectrically converting the captured optical image into a wide DR image at a predetermined frame rate. The wide DR image produced by the CCD image sensor 113 can be a monochrome image having a one-channel luminance signal, or a color image containing multi-channel (three channel) luminance signals. Both types of signals are described below.

The signal processing system includes a correlation double sampling (CDS) circuit 114 reducing noise by sampling the wide DR image outputted from the CCD image sensor 113, an analog-to-digital (A/D) converter 115 for analog-to-digital converting the wide DR image with noise thereof removed by the CDS circuit 114, into a signal having a bit width of 14 through 16 bits, and a digital signal processor (DSP) 116 performing a gradation compression process on the wide DR image outputted by the A/D converter 115.

The image signal having a large number of gradation levels, such as the wide DR image having a bit width of 14 through 16 bits outputted by the A/D converter 115, cannot be reproduced like a standard video signal of luminance signal Y and color difference signals Cr and Cb. However, the DSP 116 compresses gradation of the wide DR signal into a video signal that can be reproduced like the standard video signal of luminance signal Y and color difference signals Cr and Cb. The DSP 116 will be discussed later with reference to FIG. 5.

The recording system of the digital video camera 101 includes a compression and decompression (CODEC) unit 121 for encoding the wide DR image or a narrow DR image inputted from the DSP 116 to record the resulting image onto a memory 122 and decoding the encoded data from the memory 122 to supply the read data to the DSP 116, and the memory 122, such as a magnetic disk, an optical disk, a magneto-optical disk, or a semiconductor memory, for recording the encoded wide DR image or narrow DR image.

The display system includes a digital-to-analog (D/A) converter 118 for converting the narrow DR image supplied from the DSP 116, a video encoder 119 for converting the analog narrow DR image outputted from the D/A converter 118 into the standard video signals of luminance Y and color difference Cr and Cb, and outputting the standard video signal to a display 120, and a display 120, such as a liquid-crystal display (LCD) serving as a viewfinder or a video monitor, for displaying an image corresponding to the video signal.

The control system includes a timing generator 117 for controlling operation timings of the CCD image sensor 113 through the DSP 116, an input device 124 for receiving operational inputs from a user, and a central processing unit (CPU) 123 for generally controlling the digital video camera 101.

Operation of the digital video camera 101 is roughly described below. An optical image of an object, incident on the CCD image sensor 113 through the lens 111 and the diaphragm 112, is photoelectrically converted into an electrical signal as a pixel of a wide DR image by the CCD image sensor 113. The CDS circuit 114 removes a noise component from the electrical signal, and the resulting electrical signal is then converted into a digital signal by the A/D converter 115. The resulting digital signal is fed to the DSP 116.

The DSP 116 performs a gradation compression process on the wide DR image inputted from the A/D converter 115 to generate a narrow DR image. The narrow DR image is then output to at least one of the D/A converter 118 and the compression and decompression unit 121. The narrow DR image supplied to the D/A converter 118 is converted there into an analog signal. The video encoder 119 converts the analog signal to a standard video signal, which is then displayed on the display 120. The narrow DR image supplied to the compression and decompression unit 121 is encoded there, and the encoded signal is then recorded onto the memory 122.

The DSP 116, which is an important element of the present invention, is described below.

FIG. 5 illustrates a first arrangement of the DSP 116 handling a monochrome wide DR image. The monochrome wide DR image inputted to the DSP 116 is referred to as a wide DR luminance image L. A pixel value (i.e., a luminance value) of the wide DR luminance image is referred to as L(p). Here, p is a vector or coordinates representing a pixel position in an image, such as p=(x, y). L(p) contains information of both the pixel position and the luminance value, different from L representing the wide DR luminance image. The same is true of another image and the pixel values thereof to be discussed later.

The luminance L(p) of the wide DR luminance image L is inputted to the DSP 116 in a raster scan sequence.

In the first arrangement of the DSP 116, a logarithmic converter 141 logarithmically converts the input luminance L(p), and outputs a resulting logarithmic luminance log L(p) to a tone curve corrector 142. The tone curve corrector 142 applies a prepared tone curve to the input luminance logL(p) to narrow the gradation of the input logarithmic luminance log L(p), and outputs the resulting logarithmic luminance log Lc(p) to both a reduced image generator 143 and a contrast corrector 145. The tone curve corrector 142 also outputs a representative value γ representing a slope of the applied tone curve to the contrast corrector 145. The representative value γ representing the slope of the applied tone curve is also simply referred to as the representative value γ.

The reduced image generator 143 generates a reduced image log $L_{cl}$ in response to the logarithmic luminance logL$_c$(p) for one frame inputted from the tone curve corrector 142, and the reduced image log $L_{cl}$ is then stored in a reduced image memory 144.

The contrast corrector 145 corrects the contrast of the logarithmic luminance logL$_c$(p) of a current frame, lowered in the tone curve correction process by and inputted from the tone curve corrector 142, with the representative value γ and the reduced image log $L_{cl}$ of an immediately prior frame held in the reduced image memory 144. A resulting logarithmic luminance logL$_u$(p) is outputted to an anti-logarithmic converter 146. The anti-logarithmic converter 146 anti-logarithmically converts the contrast-corrected logarithmic luminance logL$_u$(p), thereby outputting a resulting non-logarithmic luminance L$_u$(p) to a gamma corrector 147.

The gamma corrector 147 performs a gamma correction process on the luminance L$_u$(p) inputted from the anti-logarithmic converter 146 in order to account for gamma characteristics of a replay device (such as the display 120). A resulting gamma-corrected luminance Y(p) is then fed to a luminance domain information calculator 148 and a luminance domain normalizer 151.

The luminance domain information calculator 148 calculates luminance domain information representing a distribution of luminance of the luminance Y(p) of one frame inputted from the gamma corrector 147, and supplies the resulting luminance domain information to a luminance domain information smoother 149. The luminance domain information smoother 149 smoothes the luminance domain information based on the luminance domain information of a frame to be smoothed and the luminance domain information (or the smoothed luminance domain information) of frames having a predetermined time-sequence relationship with the frame to be smoothed. The smoothed luminance domain information is then stored in a luminance domain information memory 150. The luminance domain information represents a range of a luminance distribution in one frame. For example, a luminance Y$_d$ close to the darkest side and a luminance Y$_b$ close to the brightest side are calculated as luminance domain information [Y$_d$, Y$_b$].

The luminance domain normalizer 151 converts the luminance Y(p) of the current frame inputted from the gamma corrector 147 based on the luminance domain information [Y$_d$, Y$_b$] stored in the luminance domain information memory 150 so that the distribution range of the luminance Y(p) matches a displayable luminance range of the replay device (such as the display 120). A resulting luminance Y$_n$(p) is outputted to a subsequent state as a pixel value of the narrow DR image.

In the gradation compression process of the first arrangement of the DSP 116, the reduced image generator 143 generates the reduced image log $L_{cl}$, and the luminance domain information calculator 148 calculates the luminance domain information [Y$_d$, Y$_b$]. The reduced image log $L_{cl}$ and the luminance domain information [Y$_d$, Y$_b$] are collectively referred to as intermediate information.

The DSP 116 thus calculates the intermediate information for each frame of the input wide DR image, and the calculated intermediate information is used to process a wide DR luminance image of the next frame.

To increase the effectiveness of the gradation compression process, information calculated based on the luminance of the entire image or of the wide area on the image is required. However, it takes time for such information to be calculated. Such a time lag before completing the calculation becomes a problem of the scale of electronic components to be mounted on a board. The DSP 116 selects an image that changes very slow or shows no change in luminance in time when the intermediate information of a frame immediately prior to a current frame is used in the gradation compression process to the current frame. This arrangement eliminates the need for the use of a high capacity memory and an electronic circuit of a large scale.

The first arrangement of the DSP 116 is described in detail below.

Figure 6:
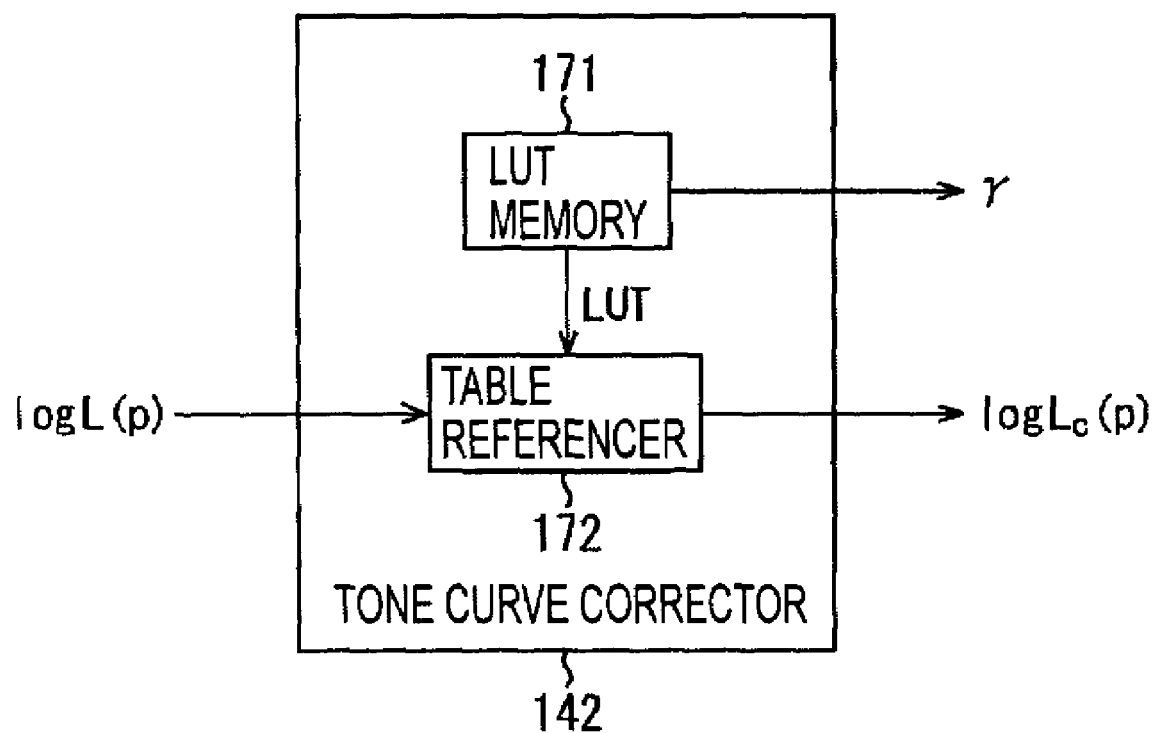
FIG. 6 is a block diagram of a first arrangement of a tone curve corrector of FIG. 5.

FIG. 6 illustrates a first arrangement of the tone curve corrector 142. As shown, an LUT memory 171 stores a lookup table (LUT) corresponding to a monotonously increasing tone curve shown in FIG. 7, and a representative value γ representing the slope of the tone curve. Instead of the tone curve, the LUT memory 171 can store a function corresponding to the tone curve. A table referencer 172 corrects logarithmic luminance logL(p) into a logarithmic luminance logL$_c$(p) based on the LUT stored in the LUT memory 171.

Figure 7:
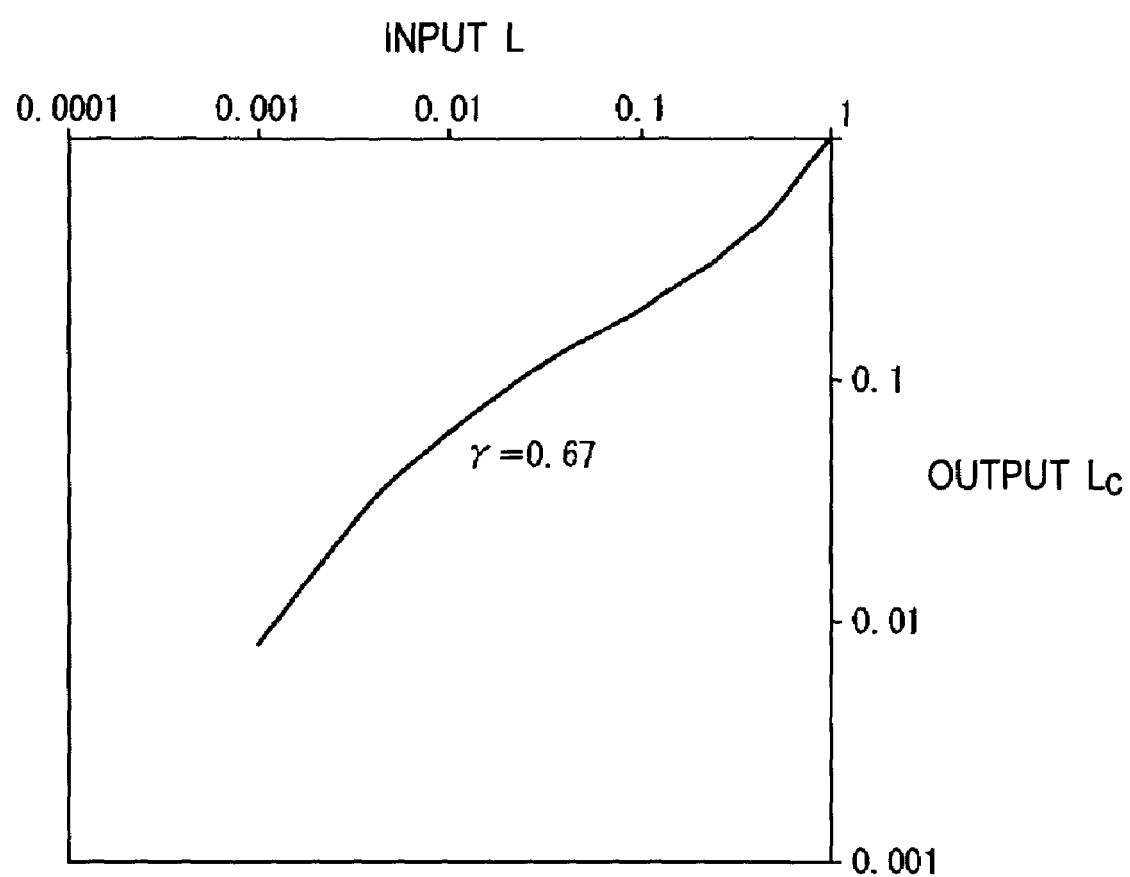
FIG. 7 illustrates a tone curve.

FIG. 7 illustrates one example of the tone curve. The abscissa and the ordinate logarithmically represent the input luminance L(p) and the tone-curve corrected logarithmic luminance logL$_c$(p), normalized at [0, 1], respectively. If a monotonously increasing mildly inclined S-shaped tone curve is applied in this way, gradation compression has no strong effect in a high-luminance zone and a low-luminance zone, and an excellent tonal gradation results as a result of the gradation compression process, free from out-of-range white level distortion and out-of-range black level distortion. Although the gradation compression has a strong effect in the intermediate luminance range, a contrast correction, discussed later, is sufficiently applied to the intermediate luminance range. An excellent narrow DR image free from contrast degradation even in the intermediate luminance range thus results.

The representative value $\gamma$ representing the slope of the tone curve is determined by calculating and then averaging the slopes of segments of the curve in the entire luminance range. As shown in FIG. 7, the tone curve has a representative value $\gamma$ of 0.67.

Figure 8:
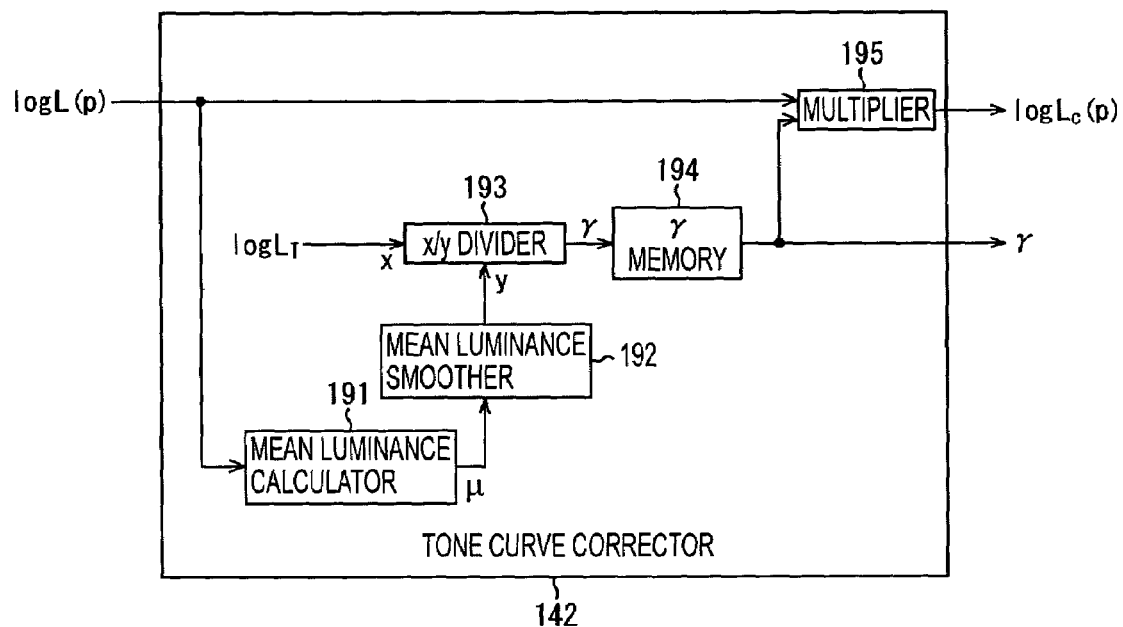
FIG. 8 is a block diagram of a second arrangement of the tone curve corrector of FIG. 5.

FIG. 8 illustrates a second arrangement of the tone curve corrector 142. Rather than using the prepared LUT as in the first arrangement, the tone curve corrector 142 of FIG. 8 calculates the representative value $\gamma$ on a frame by frame basis and corrects the logarithmic luminance logL(p) to the logarithmic luminance $logL_c(p)$. A mean luminance calculator 191 calculates a mean luminance value $\mu$ of the logarithmic luminance logL(p) of one frame and outputs the mean luminance value $\mu$ to a mean luminance smoother 192.

The mean luminance smoother 192 smoothes the mean luminance value $\mu$ supplied from the mean luminance calculator 191 using the mean luminance values $\mu$ of frames immediately prior to and immediately subsequent to the current frame, or smoothed mean luminance values $\mu$ of the frames immediately prior to and immediately subsequent to the current frame, and outputs the resulting smoothed mean luminance value $\mu$ to a divider 193. The divider 193 divides a predetermined constant $logL_T$ by the mean luminance value $\mu$, thereby calculating the representative value $\gamma$. A $\gamma$ memory 194 stores the representative value $\gamma$ inputted from the divider 193. A multiplier 195 multiplies the logarithmic luminance logL(p) of the current frame by the representative value $\gamma$ of the frame, immediately prior to the current frame, stored in the $\gamma$ memory 194, thereby calculating the tone-curve corrected logarithmic luminance $logL_c(p)$.

If the constant $logL_T$ is set to a logarithmic luminance at the intermediate level, the obtained tone-curve corrected logarithmic luminance $logL_c(p)$ has the mean value of the logarithmic luminance logL(p) of one frame equal to the constant $logL_T$.

The representative value $\gamma$ is calculated on a per frame basis. Since the representative value $\gamma$ is determined based on the mean luminance value $\mu$ of the logarithmic luminance logL(p) of each frame, it is expected in practice that the representative value $\gamma$ does not vary in a large amount from frame to frame. As the reduced image log $L_{cl}$ and the luminance domain information $[Y_d, Y_b]$, the representative value $\gamma$ of the frame immediately prior to the current frame is used in the tone curve correction of the current frame. The representative value $\gamma$ is also contained in the intermediate information hereinafter.

Figure 9:
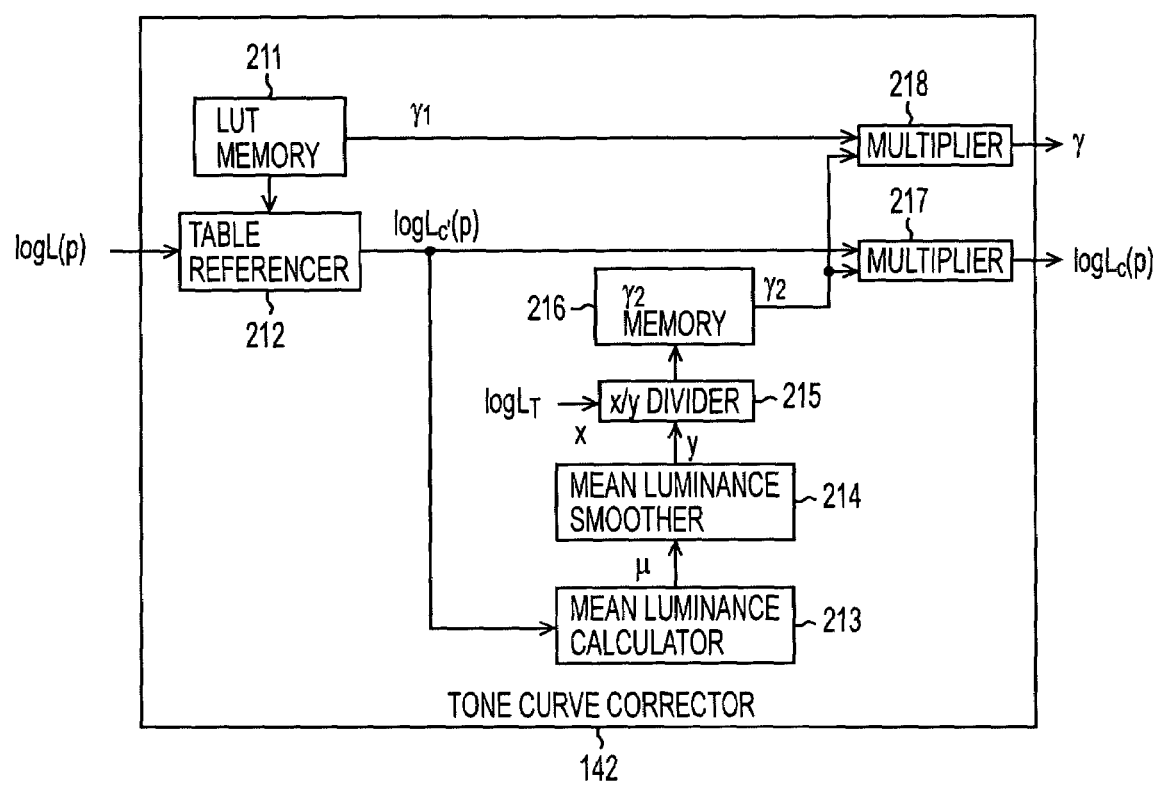
FIG. 9 is a block diagram of a third arrangement of the tone curve corrector of FIG. 5.

FIG. 9 illustrates a third arrangement of the tone curve corrector 142. The third arrangement of the tone curve corrector 142 is a combination of the first and the second arrangements of the tone curve corrector 142. In the third arrangement, an LUT memory 211 pre-stores the LUT of the tone curve of FIG. 7 and the representative value $\gamma_1$ representing the slope of the tone curve. A table referencer 212 corrects the logarithmic luminance logL(p) into the logarithmic luminance $logL_c(p)$ in accordance with the LUT stored in the LUT memory 211, and outputs the resulting logarithmic luminance $logL_c(p)$ to both a mean luminance calculator 213 and a multiplier 217.

The mean luminance calculator 213 calculates the mean luminance value $\mu$ of the logarithmic luminance $logL_c(p)$ and outputs the resulting mean luminance value $\mu$ to a mean luminance smoother 214. The mean luminance smoother 214 smoothes the mean luminance value $\mu$ supplied from the mean luminance calculator 213 using the mean luminance values $\mu$ of frames prior to and subsequent to the current frame, or the smoothed mean luminance values $\mu$ of the frames prior to and subsequent to the current frame, and outputs the smoothed mean luminance value $\mu$ to a divider 215.

The divider 215 divides a predetermined constant $logL_T$ by the mean luminance value $\mu$, thereby calculating a representative value $\gamma_2$ and storing the representative value $\gamma_2$ in a $\gamma_2$ memory 216. A multiplier 217 multiplies the logarithmic luminance $logL_c(p)$ of the current frame by the representative value $\gamma_2$ of the frame immediately prior to the current frame stored in the $\gamma_2$ memory 216, thereby calculating a tone-curve corrected logarithmic luminance $logL_c(p)$. A multiplier 218 outputs the product of the representative values $\gamma_1$ and $\gamma_2$ ($=\gamma_1 \cdot \gamma_2$) to the subsequent contrast corrector 145 as the representative value $\gamma$.

Figure 10:
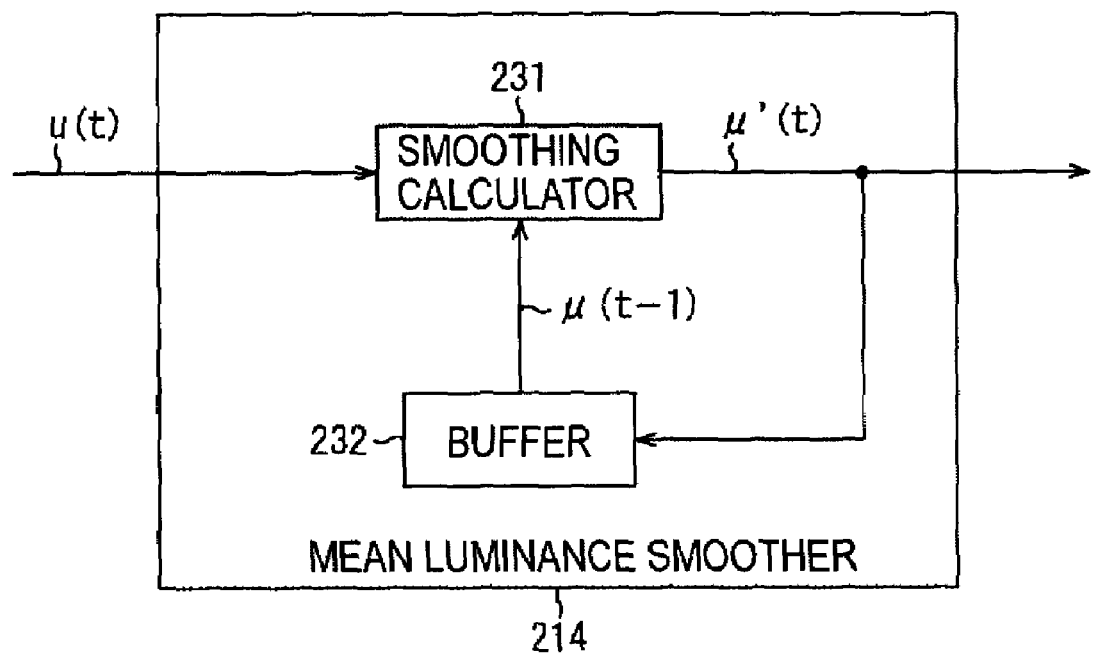
FIG. 10 is a block diagram of a luminance domain information smoother of FIG. 5.

The structure of the mean luminance smoother 214 is described with reference to FIG. 10. In a smoothing process, the mean luminance smoother 214 multiplies a mean luminance value $\mu(t)$ of a frame at time t to be smoothed and a smoothed mean luminance value $\mu(t-1)$ of a frame at time (t-1) immediately prior to the frame at time t by respective weights, and sums the resulting products. The resulting smoothed mean luminance value u'(t) of the frame at time t is outputted while the mean luminance value u'(t) is stored onto a buffer 232. The mean luminance value u'(t) overwrites the existing value as the mean luminance value $\mu(t-1)$, and is supplied to the smoothing calculator 231 as previously discussed. By repeating this process, the smoothing calculator 231 successively smoothes the mean luminance value $\mu$ of each frame.

The structure of the reduced image generator 143 is described below with reference to FIG. 11. A sorter 251 in the reduced image generator 143 sorts the logarithmic luminance $logL_c(p)$ of one frame supplied from the tone curve corrector 142 on a block by block basis. The entire image is segmented into m×n blocks. The sorted logarithmic luminances $logL_c(p)$ are supplied to the mean value calculators 252-1 through 252-N (=m×n). For example, the logarithmic luminance $logL_c(p)$ sorted as a first block is supplied to the mean value calculator 252-1, the logarithmic luminance $logL_c(p)$ sorted as a second block is supplied to the mean value calculator 252-2, ..., the logarithmic luminance $logL_c(p)$ sorted as an N-th block is supplied to the mean value calculator 252-N. When there is no need to discriminate the mean value calculators 252-1, 252-2, ..., 252-N one from another, these calculators are collectively referred to as a mean value calculator 252.

The mean value calculator 252-i (i=1, 2 ..., N) calculates the mean value of the logarithmic luminances $logL_c(p)$ sorted as the i-th block, out of the logarithmic luminances $logL_c(p)$ of one frame, and outputs the resulting mean value to a synthesizer 253. The synthesizer 253 generates a reduced image log $L_{cl}$ of m×n pixels, each having a pixel value of the mean value of the logarithmic luminance $logL_c(p)$ inputted from the mean value calculator 252-i, and stores the reduced image log $L_{cl}$ onto the subsequent reduced image memory 144.

Figure 12:
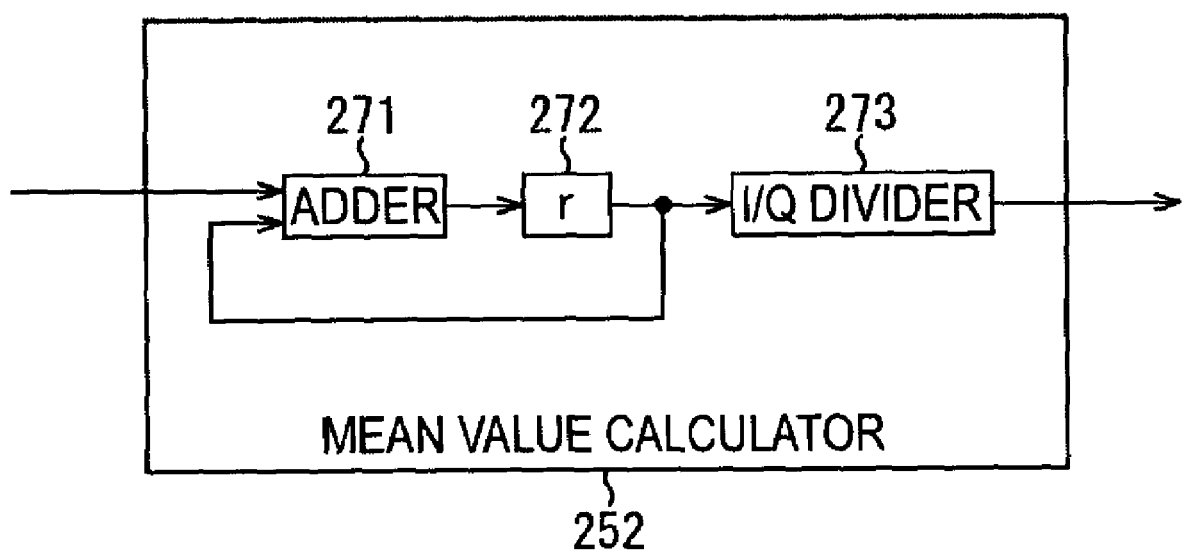
FIG. 12 is a block diagram of a mean value calculator of FIG. 11.

FIG. 12 illustrates the mean value calculator 252. An adder 271 in the mean value calculator 252 adds the logarithmic luminance $logL_c(p)$ inputted from the sorter 251 to a value stored in an (r) register 272, thereby updating the value stored in the (r) register 272. A divider 273 divides the value currently stored in the (r) register 272 by the number Q of pixels forming one block, thereby calculating the mean value of the Q logarithmic luminances logL$_c$(p) sorted as one block.

Figure 13:
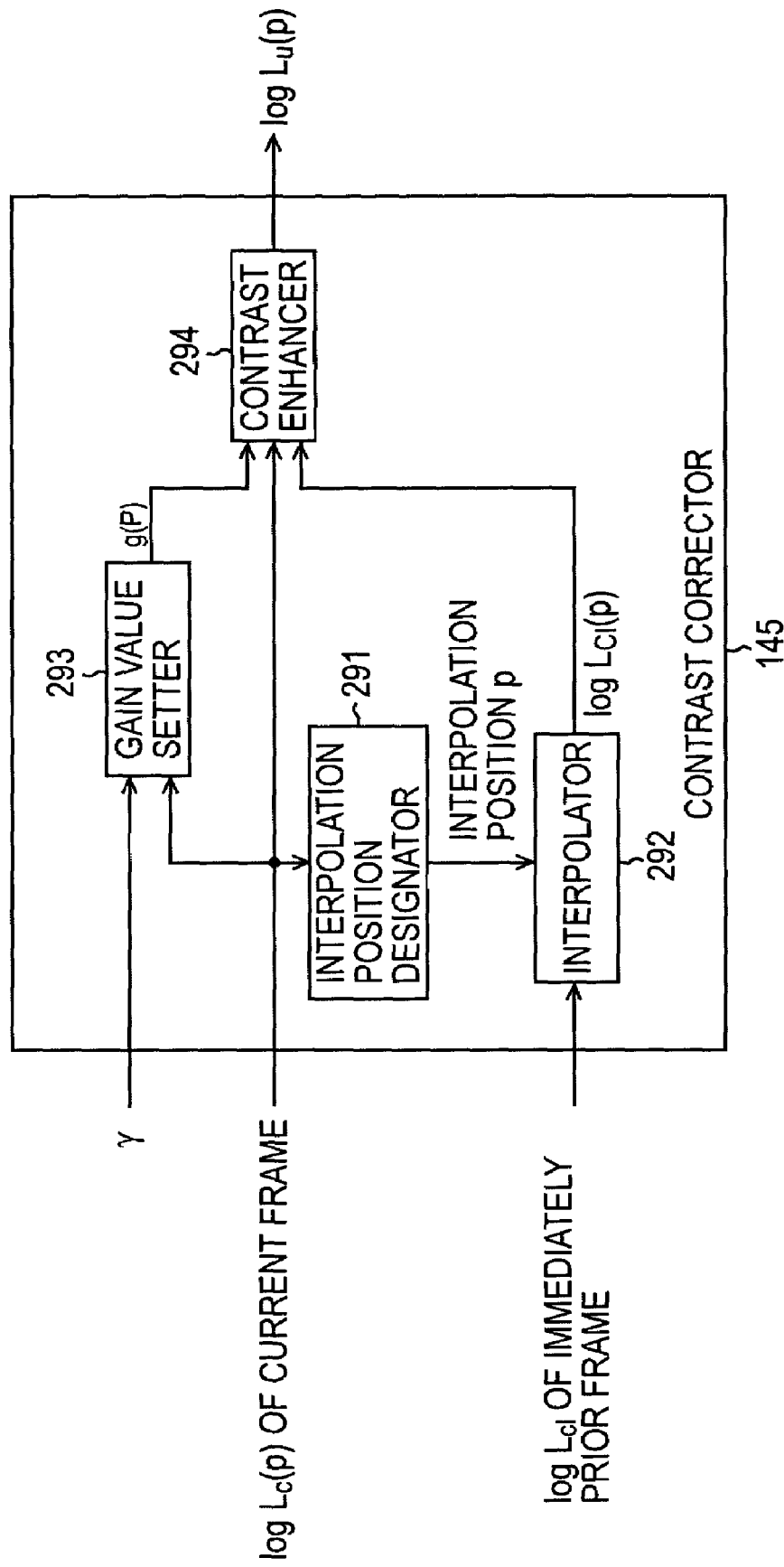
FIG. 13 is a block diagram of a contrast corrector of FIG. 5.

The contrast corrector 145 is described with reference to FIG. 13. An interpolation position designator 291 in the contrast corrector 145 acquires a pixel position p (also referred to as an interpolation position p) of the logarithmic luminance logL$_c$(p) inputted from the tone curve corrector 142, and outputs the pixel position p to an interpolator 292. In an interpolation process, the interpolator 292 calculates a pixel logL$_{cl}$(p) at the interpolation position p using the reduced image logL$_{cl}$ of the frame, immediately prior to the current frame, stored in the reduced image memory 144, and outputs the pixel logL$_{cl}$(p) to a contrast enhancer 294.

A gain value setter 293 calculates a gain value g(p) determining a contrast enhancement value of the logarithmic luminance logL$_c$(p) of the current frame based on the representative value γ of the frame, immediately prior to the current frame, from the tone curve corrector 142 and the logarithmic luminance logL$_c$(p) of the current frame. Based on the gain value g(p) and the interpolation value log L$_{cl}$ of the reduced image, a contrast enhancer 294 calculates, from the logarithmic luminance logL$_c$(p) of the current frame, a logarithmic luminance logL$_u$(p) in which contrast is enhanced in a frequency range other than a low-frequency component.

Figure 14:
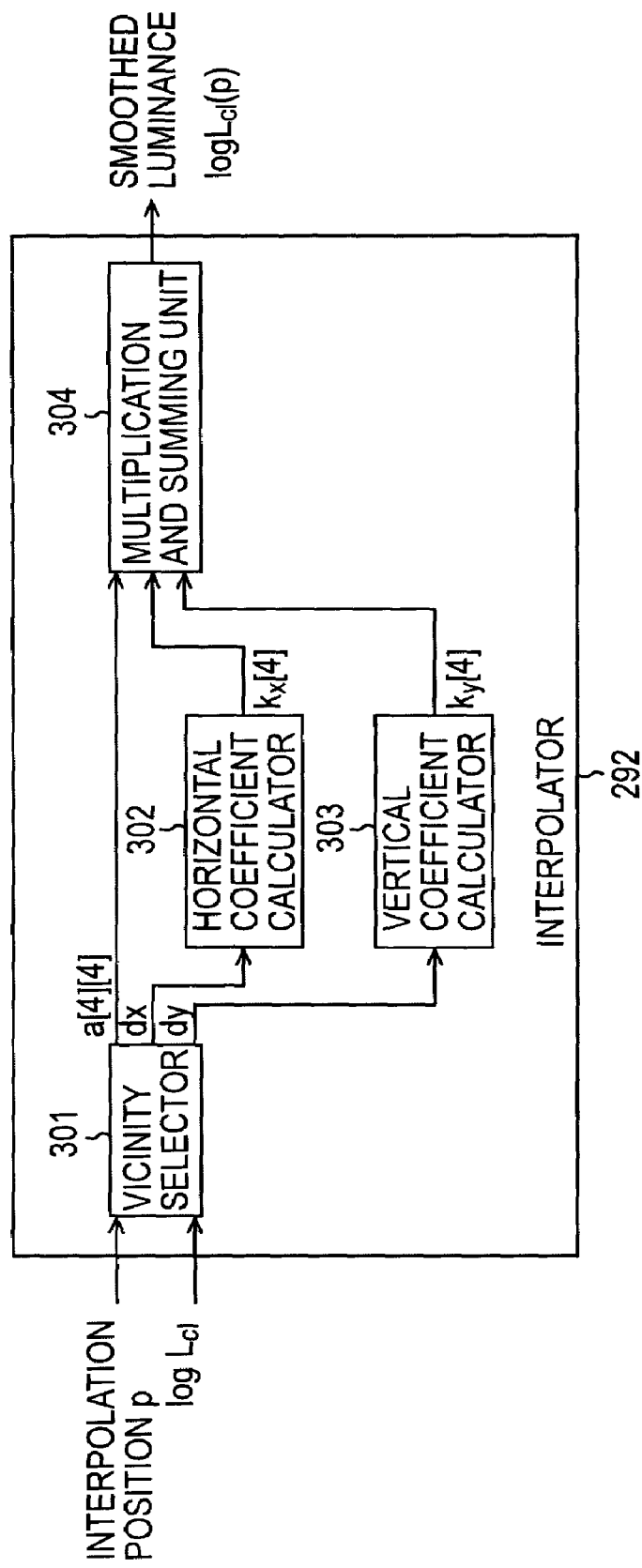
FIG. 14 is a block diagram of an interpolator of FIG. 13.

The interpolator 292 is described below with reference to FIG. 14. The interpolator 292 performs a bi-cubic interpolation process on 4×4 pixels in the vicinity of the interpolation position p of the reduced image logL$_{cl}$ of the frame immediately prior to the current frame, thereby interpolating the pixel logL$_{cl}$(p) at the interpolation position p.

Upon receiving the interpolation position p, a vicinity selector 301 acquires pixel values a[4][4] of the 4×4 pixels in the vicinity of the interpolation position p from the reduced image logL$_{cl}$ of the m×n pixels in the frame, immediately prior to the current frame, stored in the reduced image memory 144, and then outputs the pixel values a[4][4] to a multiplication and summing unit 304. A notation a[i][j] herein means that a pixel "a" has two dimensional data of i×j. The vicinity selector 301 outputs a horizontal position offset dx and a vertical position offset dy, each offset between the acquired pixel value a[4][4] and the interpolation position p, to a horizontal coefficient calculator 302 and a vertical coefficient calculator 303.

The interpolation position p, the vicinity pixel value a[4][4], and position offsets dx and dy are described below with reference to FIG. 15.

Figure 15:
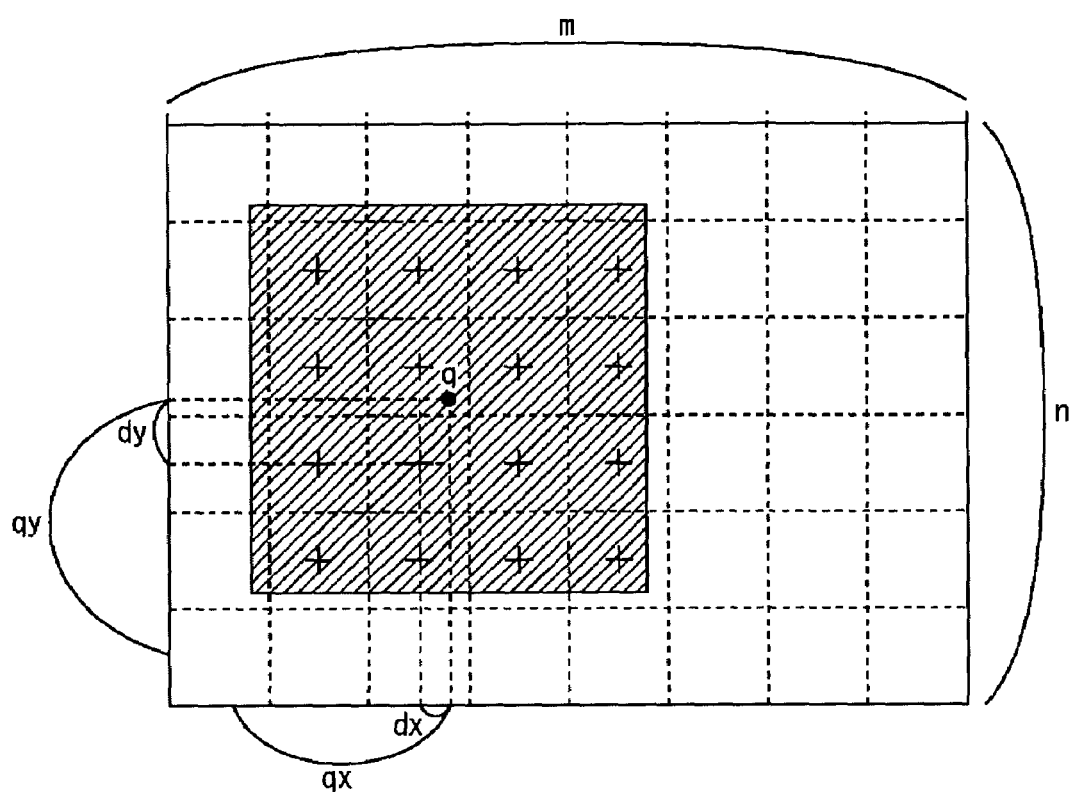
FIG. 15 illustrates a process of the interpolator of FIG. 13.

Cells of m×n of FIG. 15 represent the m×n pixels of the reduced image L$_{cl}$ of, respectively. Given the interpolation position p=(px, py), position q on the reduced image logL$_{cl}$ corresponding to the interpolation position p is q=(qx, qy)= (px/bx−0.5, py/by−0.5), where (bx, by)=(number of pixels of the image logL$_c$ in the horizontal direction/m, number of pixels of the image logL$_c$ in the vertical direction/n).

Obtaining vicinity pixels at position q on the reduced image corresponding to the interpolation position p means to obtain pixels of the reduced image L$_{cl}$ positioned within an area of qx−2<x<qx+2 and qy−2<y<qy+2 hatched in FIG. 15. The positions of the obtained pixels are represented by positive symbols (+) within the hatched area 4×4. The position offset (dx, dy) between the vicinity pixel and the interpolation position p is a difference between the position q and a closest pixel in the bottom-left direction. In other words, the offset (dx, dy)=(fractional part of qx, fractional part of qy).

Returning to FIG. 14, the horizontal coefficient calculator 302 calculates a horizontal cubic interpolation coefficient k$_x$[4] based on the horizontal offset dx inputted from the vicinity selector 301. Similarly, the vertical coefficient calculator 303 calculates a vertical cubic interpolation coefficient k$_y$[4] based on the vertical offset dy inputted from the vicinity selector 301.

For example, the horizontal cubic interpolation coefficient k$_x$[4] is calculated using equation (1):

$$z = |dx - i + 2| \tag{1}$$
$$k_x[i] = \begin{cases} (3z^3 - 6z^2 + 4)/6 & (z < 1) \\ (-z^3 + 6z^2 - 12z + 8)/6 & (1 <= z < 2) \\ 0 & (2 \le z) \end{cases}$$

For example, the vertical cubic interpolation coefficient k$_y$[4] is calculated using equation (2):

$$z = |dy - j + 2| \tag{2}$$
$$k_y[j] = \begin{cases} (3z^3 - 6z^2 + 4)/6 & (z < 1) \\ (-z^3 + 6z^2 - 12z + 8)/6 & (1 <= z < 2) \\ 0 & (2 \le z) \end{cases}$$

To calculate the horizontal cubic interpolation coefficient k$_x$[4] and the vertical cubic interpolation coefficient k$_y$[4], any equations, besides equations (1) and (2), can be used as long as a sufficiently smooth interpolation results.

The multiplication and summing unit 304 performs a multiplication and summing process on the vicinity pixel a[4][4], the horizontal cubic interpolation coefficient k$_x$[4] and the vertical cubic interpolation coefficient k$_y$[4] using equation (3), thereby calculating an interpolation value L$_{cl}$(p) at the interpolation position p in the reduced image logL$_{cl}$.

$$\log L_{cl}(p) = \sum_{i=1}^{4} \sum_{j=1}^{4} a[i][j] \cdot k_x[i] \cdot k_y[j] \tag{3}$$

The gain value setter 293 is described below. The gain value setter 293 sets the gain value g(p) with which the subsequent stage contrast enhancer 294 adjusts the amount of enhancement in a range other than a low-frequency component. If the gain value g(p)=1, the contrast enhancer 294 neither enhances nor suppresses contrast. If the gain value g(p)>1, the contrast enhancer 294 enhances contrast in accordance with the gain value g(p). If the gain value g(p)<1, the contrast enhancer 294 suppresses contrast in accordance with the gain value g(p).

A gain setting process is briefly described below. The contrast of an image is already suppressed in the gradation compression by the tone curve correction. The amount of suppression depends on the slope of the tone curve. For example, if a low slope tone curve for strong gradation compression is applied, contrast is suppressed more. If a straight-line slope is applied as the tone curve, an image remains unchanged, i.e., contrast is not suppressed.

If the representative value γ of the slope of the tone curve is greater than 1, the gain value setter 293 adopts, as a gain value, the reciprocal (1/γ) of the representative value γ of the slope of the tone curve so that the gain value becomes larger than 1.

If contrast enhancement is performed as in the intermediate luminance range when the input logarithmic luminance $logL_c(p)$ is close to a white level or a black level of the image, the image can be clipped leading to the missing of the detail of the image. As the input logarithmic luminance $logL_c(p)$ becomes closer to the white level or the black level, the gain value is adjusted closer to 1.

With the reciprocal $1/\gamma$ of the representative value $\gamma$, the gain value $g(p)$ is calculated in accordance with equation (4):

$$g(p) = 1 + (g_0 - 1) \times attn(p) \quad (4)$$

where $attn(p)$ is an attenuation coefficient, which is calculated using equation (5):

$$attn(p) = attn(logL_{gray}, logL_{white}, logL_c(p)) = \quad (5)$$

$$\begin{cases} \left| \dfrac{logL_c(p) - logL_{gray}}{logL_{white} - logL_{gray}} \right| & (2logL_{gray} - logL_{white} \leq logL_c(p) \leq logL_{white}) \\ 1 & logL_c(p) < 2logL_{gray} - logL_{white} \text{ or} \\ & logL_{white} < logL_c(p) \end{cases}$$

In equation (5), $logL_{gray}$ represents a logarithmic luminance of a intermediate gray level, and $logL_{white}$ represents a logarithmic luminance of a white clip level (the maximum white level), both $logL_{gray}$ and $logL_{white}$ being set constants.

Figure 16:
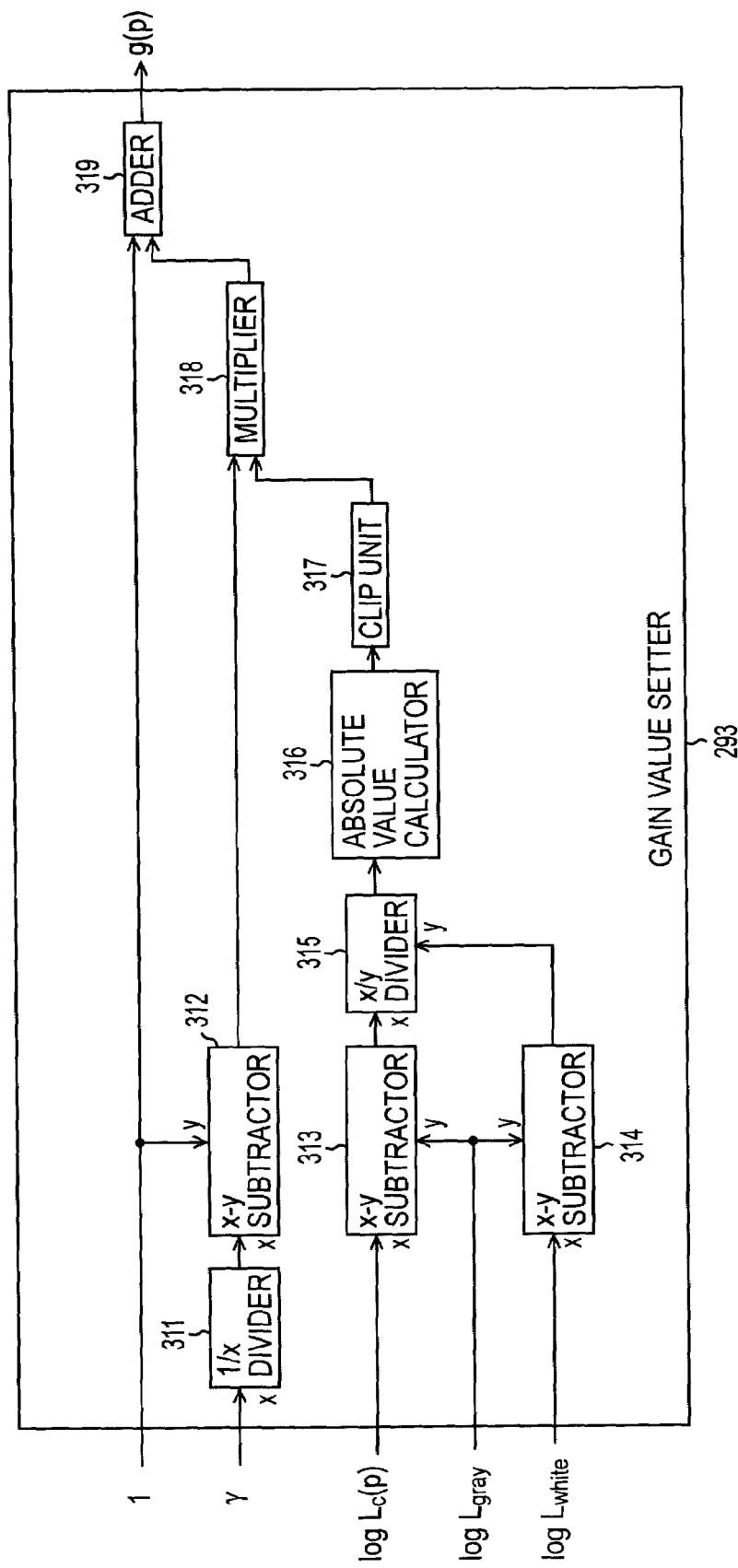
FIG. 16 is a block diagram of a gain value setter of FIG. 13.

FIG. 16 illustrates the structure of the gain value setter 293. A divider 311 calculates the reciprocal $1/\gamma = g_0$ of the representative value $\gamma$ inputted from the preceding stage, and outputs the resulting reciprocal $1/\gamma = g_0$ to a subtractor 312. The subtractor 312 calculates a difference $(g_0 - 1)$, and outputs the resulting difference $(g_0 - 1)$ to a multiplier 318.

A subtractor 313 calculates a difference $(logL_c(p) - logL_{gray})$ between the logarithmic luminance $logL_c(p)$ and the logarithmic luminance $logL_{gray}$ of the intermediate gray level, and outputs the resulting difference $(logL_c(p) - logL_{gray})$ to a divider 315. A subtractor 314 calculates a difference $(logL_{white} - logL_{gray})$ between the logarithmic luminance $logL_{white}$ of the white clip level and the logarithmic luminance $logL_{gray}$, and outputs the difference $(logL_{white} - logL_{gray})$ to a divider 315. The divider 315 divides the output $(logL_c(p) - logL_{gray})$ of the subtractor 313 by the output $(logL_{white} - logL_{gray})$ of the subtractor 314, and outputs the resulting quotient to an absolute value calculator 316. The absolute value calculator 316 calculates the absolute value of the output of the divider 315, and outputs the resulting absolute value to a clip unit 317. If the output of the absolute value calculator 316 rises above 1, the clip unit 317 clips the output to 1. If the output of the absolute value calculator 316 is less than 1, the clip unit 317 outputs the signal input thereto as is to the multiplier 318 as the attenuation coefficient $attn(p)$.

The multiplier 318 multiplies the output of the subtractor 312 by the output of the clip unit 317, and outputs the resulting product to an adder 319. The adder 319 adds 1 to the output of the multiplier 318, and outputs the calculation result as the gain value $g(p)$ to the subsequent stage connected thereto.

Figure 17:
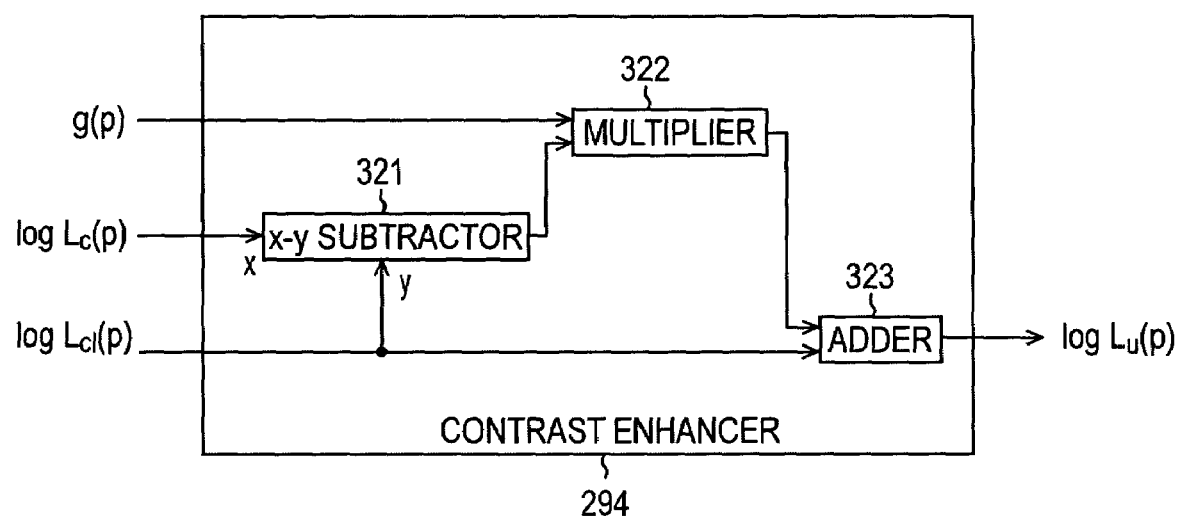
FIG. 17 is a block diagram of a contrast enhancer of FIG. 13.

The structure of the contrast enhancer 294 is described below with reference to FIG. 17. A subtractor 321 calculates a difference $(logL_c(p) - logL_{cl}(p))$ between the logarithmic luminance $logL_c(p)$ and the interpolation value $logL_{cl}(p)$ of the reduced image, and output the resulting difference $(logL_c(p) - logL_{cl}(p))$ to a multiplier 322. The multiplier 322 multiplies the output of the subtractor 321 by the gain value $g(p)$, and outputs the resulting product to an adder 323. The adder 323 adds the interpolation value $logL_{cl}(p)$ of the reduced image to the output of the multiplier 322, thereby outputting a contrast-corrected logarithmic luminance $logL_u(p)$ to the subsequent stage.

Since the interpolation value $logL_{cl}(p)$ of the reduced image is an interpolated value that is obtained from the reduced image of m×n pixels, the interpolation value $logL_{cl}(p)$ has only the lowest frequency component of the image $logL_c$ prior to image reduction.

The output $(logL_c(p) - logL_{cl}(p))$ of the subtractor 321 is the original $logL_c(p)$ with only the lowest frequency component subtracted therefrom. The luminance signal is segmented into two components: the lowest frequency component and the remaining component. The remaining component, which is multiplied by the gain value $g(p)$ for enhancement, is then added to the lowest frequency component by the adder 323. The output of the adder 323 is the contrast-corrected logarithmic luminance $logL_u(p)$.

The contrast enhancer 294 enhances low to high frequency components with the same gain value $g(p)$ except the lowest frequency component. The contrast-corrected logarithmic luminance $logL_u(p)$ is free from localized overshooting at an edge which outstands when only a high frequency range is enhanced. An image with natural looking enhanced contrast thus results.

The luminance domain information calculator 148 and the luminance domain normalizer 151 are described below.

A luminance domain normalizing process is outlined first. The gradation compression by the DSP 116 is intended to convert the wide DR luminance image into a narrow DR image that matches the dynamic range of a replay device such as the display 120. To this end, a tone curve matching the dynamic range of the replay device is available from the tone curve corrector 142. With the tone curve, most of the wide DR luminance images captured are appropriately gradation compressed.

Depending on an object, the dynamic range of incident light of an image of the object can be originally not so wide. If the gradation compress process is performed on such an image, the effect of the gradation compression process becomes excessive and the luminance range can be confined to a range narrower than the dynamic range of the replay device.

To control such over compression, the luminance domain normalizer 151 normalizes the gamma-corrected luminance signal $Y(p)$ so that the dynamic range of the gamma-corrected luminance signal $Y(p)$ matches the dynamic range of the replay device.

Figure 18:
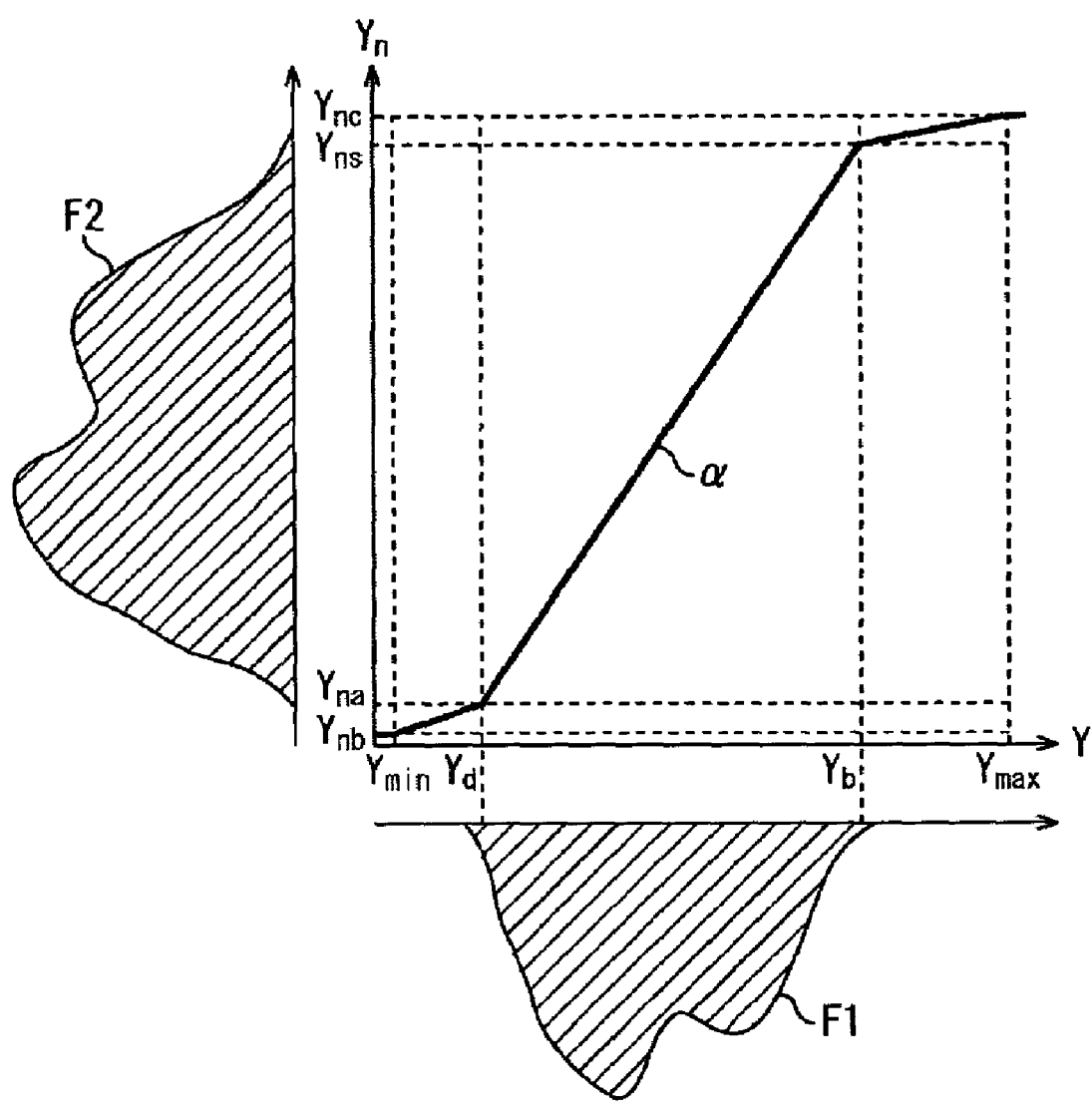
FIG. 18 illustrates a process of a luminance domain normalizer of FIG. 5.

FIG. 18 illustrates a luminance domain normalization process of the luminance domain normalizer 151. In a sequential line graph of FIG. 18, the abscissa represents luminance Y gamma-corrected prior to the luminance domain normalization and the ordinate represents $Y_n$ subsequent to the luminance domain normalization. A gradation conversion line $\alpha$ represents a conversion table to convert luminance Y into luminance $Y_n$.

The gradation conversion line $\alpha$ is determined as discussed below. A hatched graph F1 shown below the sequential line graph is a type of histogram of the luminance image Y prior to the luminance domain normalization process. In a phase subsequent to the gamma correction process but prior to the luminance domain normalization process, an obtained luminance image has a gradation compression dynamic range narrower than a dynamic range from a minimum luminance $Y_{min}$ to a maximum luminance $Y_{max}$ available from the digital video camera 101.

If the image having that dynamic range is output to the replay device as is, the replay device is unable to effectively use the dynamic range thereof. For this reason, the luminance domain normalizer 151 performs the normalization process so that the luminance distribution of the luminance image Y extends over the entire dynamic range of the replay device.

The luminance domain normalizer 151 calculates, as luminance domain information of the luminance image Y prior to the luminance domain normalization process, a range [$Y_d$, $Y_b$] within which the histogram F1 of the luminance image Y is distributed prior to the luminance domain normalization process. Luminance levels $Y_{na}$ and $Y_{ns}$ are set up slightly more inwardly from a luminance range [$Y_{nb}$, $Y_{nc}$] of the replay device, respectively, and the gradation conversion line α is determined so that luminance values [$Y_{min}$, $Y_d$, $Y_b$, $Y_{max}$] on the abscissa correspond to luminance values [$Y_{nb}$, $Y_{na}$, $Y_{ns}$, $Y_{nc}$], respectively.

If the gradation conversion process is performed using the gradation conversion line α, the luminance image $Y_n$ having a hatched histogram F2 shown on the left-hand side of the sequential line graph.

The gradation conversion line α is determined so that the luminance range [$Y_d$, $Y_b$] prior to the luminance domain normalization process is mapped to the luminance range [$Y_{na}$, $Y_{ns}$] slightly narrower than the luminance range [$Y_{nb}$, $Y_{nc}$] of the replay device. This setting is intended to keep a sharp luminance change as a result of clipping from appearing in the vicinity of luminances $Y_{nb}$ and $Y_{nc}$ on the image.

The luminances $Y_{na}$ and $Y_{ns}$ are set to appropriate values based on the luminances $Y_{nb}$ and $Y_{nc}$.

The luminance domain information calculator 148 acquires the luminance range [$Y_d$, $Y_b$] prior to the luminance domain normalization process and the luminance domain normalizer 151 determines the gradation conversion line α and calculates the luminance $Y_n(p)$. The luminance domain information calculator 148 to be discussed later smoothes the luminance domain information prior to the luminance domain normalization process.

Figure 19:
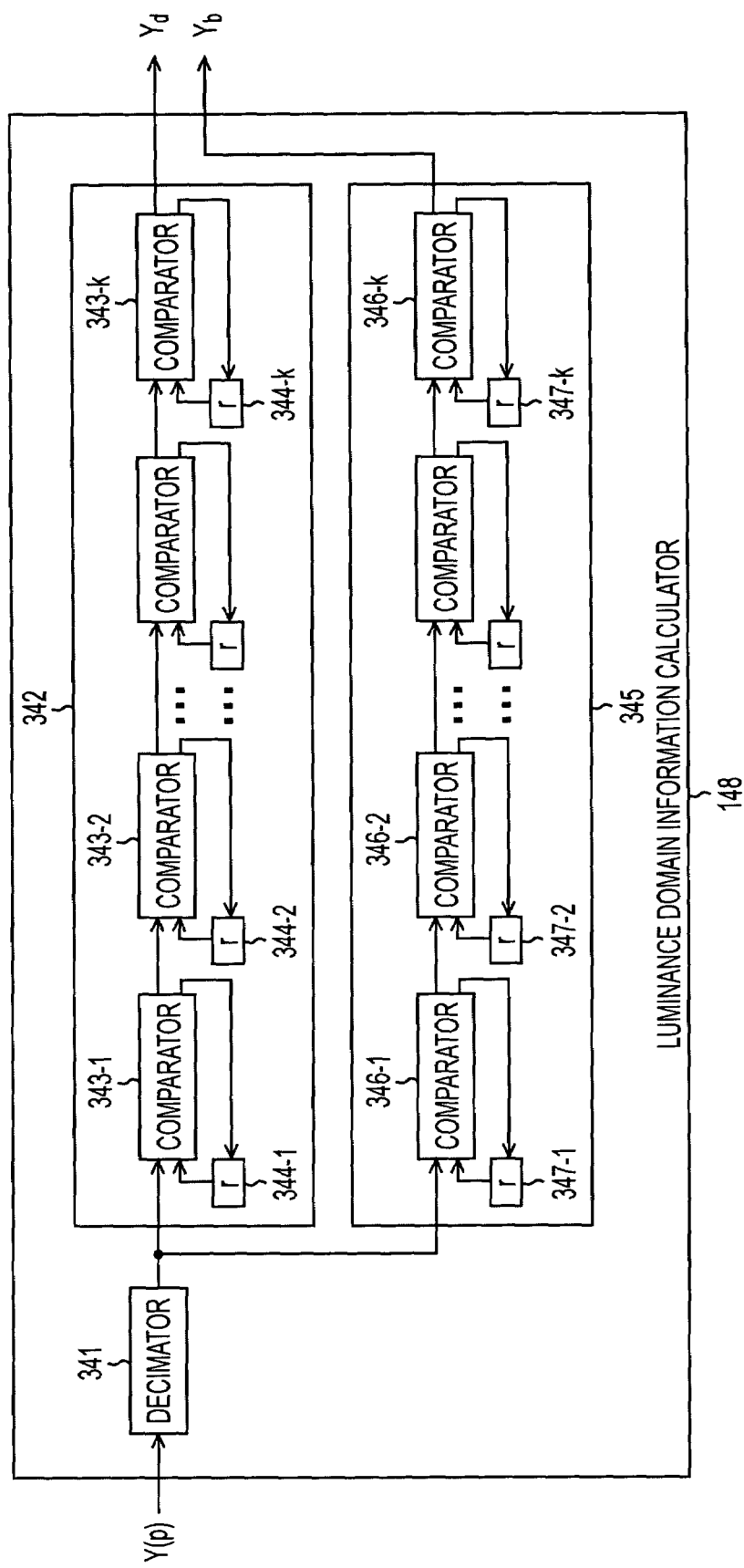
FIG. 19 is a block diagram of a luminance domain information calculator of FIG. 5.

The luminance domain information calculator 148 is described with reference to FIG. 19. A decimator 341 in the luminance domain information calculator 148 decimates the luminance Y(p) inputted from the gamma corrector 147 according to the pixel position p. More specifically, the decimator 341 supplies the luminance of the pixel only at a predetermined pixel position to a MIN sorter 342 and a MAX sorter 345.

The MIN sorter 342 includes k stages of comparators 343 and registers 344, connected in a cascade fashion. The input luminance Y(p) is stored in registers 344-1 through 344-k in the magnitude order from low to high luminance level.

For example, the comparator 343-1 compares the luminance Y(p) from the decimator 341 with a value in the register 344-1. If the luminance Y(p) from the decimator 341 is lower than the value in the register 344-1, the comparator 343-1 updates the vale in the register 344-1 with the luminance Y(p) from the decimator 341. Conversely, if the luminance Y(p) from the decimator 341 is not lower than the value in the register 344-1, the luminance Y(p) from the decimator 341 is supplied to the comparator 343-2.

The comparator 343-2 compares the luminance Y(p) from the comparator 343-1 with a value in the register 344-2. If the luminance Y(p) from the comparator 343-1 is lower than the value in the register 344-2, the comparator 343-2 updates the value in the register 344-2 with the luminance Y(p) from the comparator 343-1. Conversely, if the luminance Y(p) from the comparator 343-1 is not lower than the value in the register 344-2, the luminance Y(p) from the comparator 343-1 is supplied to the comparator 343-3.

The comparator 343-3 and subsequent comparators operate in the same way. When the luminance Y(p) of one frame is inputted, the register 344-1 stores a minimum value $Y_{min}$ of the luminance Y(p) and register 344-2 through register 344-k stores the luminance Y(p) in the magnitude order from low to high luminance level. The luminance Y(p) stored in the register 344-k is outputted to the subsequent stage connected thereto as the luminance $Y_d$ of the luminance domain information.

The MAX sorter 345 includes k states of comparators 346 and registers 347 connected in a cascade fashion. The luminance Y(p) is stored in the register 347-1 through register 347-k in the magnitude order from high to low luminance level.

The comparator 346-1 compares the luminance Y(p) from the decimator 341 with a value in the register 347-1. If the luminance Y(p) from the decimator 341 is higher than the value in the register 347-1, the comparator 346-1 updates the value in the register 347-1 with the luminance Y(p) from the decimator 341. Conversely, if the luminance Y(p) from the decimator 341 is not higher than the value in the register 347-1, the luminance Y(p) from the decimator 341 is supplied to the comparator 346-2.

The comparator 346-2 compares the luminance Y(p) from the comparator 346-1 with a value in the register 347-2. If the luminance Y(p) from the comparator 346-1 is higher than the value in the register 347-2, the comparator 346-2 updates the value in the register 347-2 with the luminance Y(p) from the comparator 346-1. Conversely, if the luminance Y(p) from the comparator 346-1 is not higher than the value in the register 347-2, the luminance Y(p) from the comparator 346-1 is supplied to the comparator 346-3.

The comparator 346-3 and subsequent comparators operate in the same way. When the luminance Y(p) of one frame is inputted, the register 347-1 stores a maximum value $Y_{max}$ of the luminance Y(p), and the register 347-2 through the register 347-k store the luminance Y(p) in the magnitude order from high to low luminance level. The luminance Y(p) stored in the register 347-k is then outputted to the subsequent stage connected thereto as the luminance $Y_b$ in the luminance domain information.

The luminance Y(p), inputted to the MIN sorter 342 and the MAX sorter 345, is the luminance value decimated by the decimator 341. If a decimation interval and the number k of stages of each of the MIN sorter 342 and the MAX sorter 345 are adjusted to proper values, luminances $Y_d$ and $Y_b$, corresponding to top 1 percent and bottom 1 percent of all pixels of one frame, can be obtained.

Figure 20:
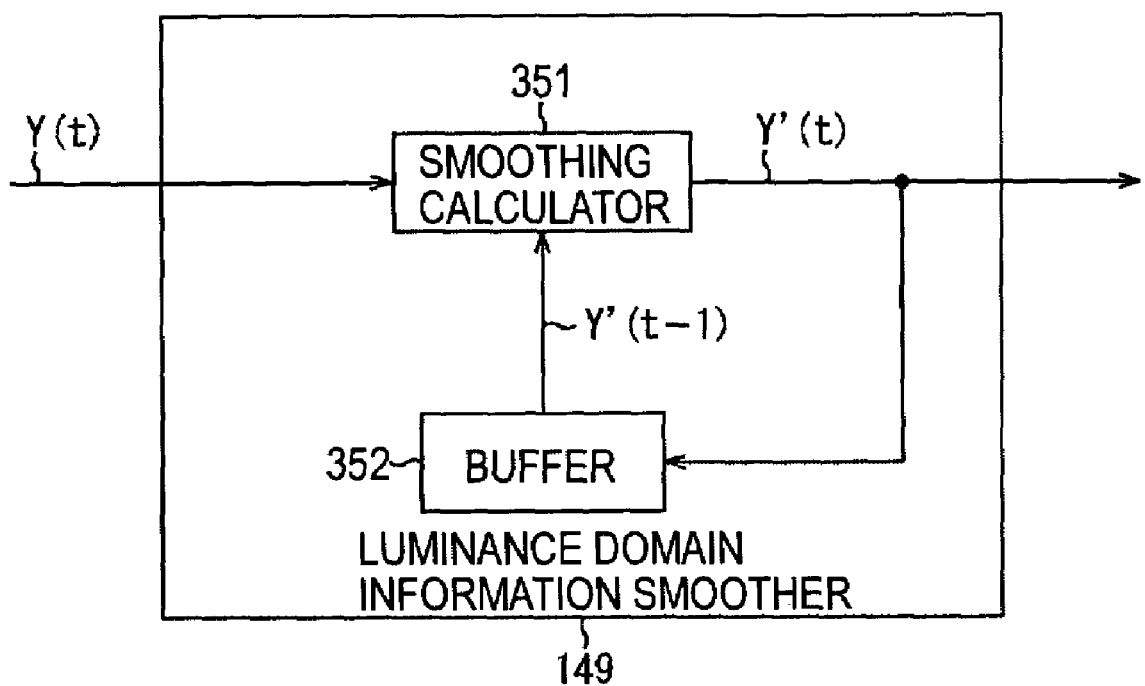
FIG. 20 is a block diagram of a luminance domain information smoother of FIG. 5.

The luminance domain information smoother 149 is described below with reference to FIG. 20. In the discussion of a luminance domain smoothing process, the luminances $Y_d$ and $Y_b$ at time t defining the luminance domain information are collectively referred to as Y(t). The luminance domain information smoother 149 performs a smoothing process to each of luminances $Y_d$ and $Y_b$ of a pixel p at time t defining the luminance domain information, and stores the smoothed luminance domain information in the luminance domain information memory 150.

A smoothing calculator 351 multiplies the luminance domain information Y(t) of the frame at time t to be smoothed, and the luminance domain information Y(t−1) of the frame at time (t−1) immediately prior to the frame at time t by respective weights, and sums the resulting products. The smoothing calculator 351 thus smoothes the luminance domain information Y(t) and outputs the resulting information as luminance domain information Y'(t) of the frame at time t while also storing the luminance domain information Y'(t) of the frame at time t in a buffer 352. The luminance domain information Y'(t) overwrites the content in the buffer 352 as luminance domain information Y(P, t−1). The luminance domain information Y(P, t−1) is then supplied to the smoothing calculator 351. By repeating this process, the smoothing calculator 351 successively smoothes the mean luminance value of each frame.

Figure 21:
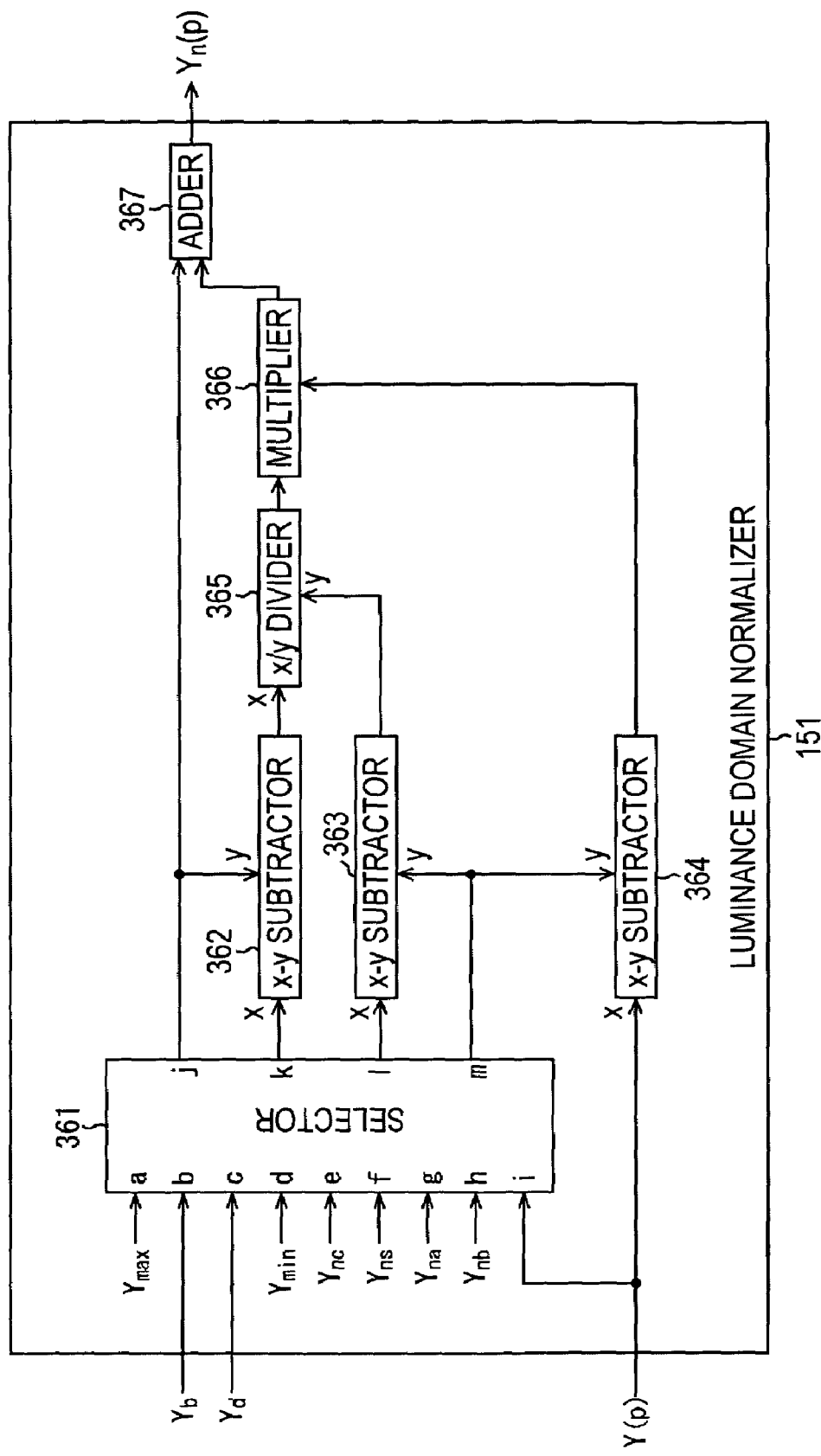
FIG. 21 is a block diagram of the luminance domain information normalizer of FIG. 5.

FIG. 21 illustrates the structure of the luminance domain normalizer 151. As previously discussed, the luminance domain normalizer 151 determines the gradation conversion line α, and converts the gamma-corrected luminance Y(p) into the normalized luminance $Y_n(p)$ using the gradation conversion line α.

As shown in FIG. 18, the gradation conversion line α is composed of five line segments. The luminance domain normalizer 151 determines the range of the line segment which the input luminance Y(p) falls within, and applies one of the five line segments forming the gradation conversion line α to the input luminance Y(p) to convert the input luminance Y(p) into the normalized luminance $Y_n(p)$.

From output terminals "j" through "m", a selector 361 in the luminance domain normalizer 151 outputs four luminances out of luminances $Y_{max}$, $Y_b$, $Y_d$, $Y_{min}$, $Y_{nc}$, $Y_{ns}$, $Y_{na}$, and $Y_{nb}$ inputted respectively to input terminals "a" through "h" based on the luminance Y(p) input to an input terminal "i". The input and output relationship of these signals is described in equation (6)

$$[j, k, l, m] = \begin{cases} [h, h, c, d] & i < d \\ [h, g, c, d] & d \le i < c \\ [g, f, b, c] & c \le i < b \\ [f, e, a, b] & b \le i < a \\ [e, e, a, b] & a \le i \end{cases} \quad (6)$$

A subtractor 362 calculates a difference between an output at the output terminal "k" and an output at the output terminal "j", and outputs a resulting difference to a divider 365. A subtractor 363 calculates a difference between an output at the output terminal "l" and an outputted from the output terminal "m", and outputs a resulting difference to a divider 365. A subtractor 364 calculate a difference between the luminance Y(p) and the outputted from the terminal "m", and outputs a resulting difference to a multiplier 366. The divider 365 calculates the ratio of the output of the subtractor 362 to the output of the subtractor 363, and outputs a resulting ratio to the multiplier 366. The multiplier 366 multiplies the output of the divider 365 by the output of the subtractor 364, and outputs a resulting product to an adder 367. The adder 367 adds the output from the output terminal "j" to the output of the multiplier 366, and outputs a resulting sum as the luminance $Y_n(p)$.

The output $Y_n(p)$ of the adder 367 is expressed by equation (7):

$$Y_n(p) = \frac{k-j}{l-m}(Y(p) - m) + j \quad (7)$$

wherein equation (7) represents a line segment of the gradation conversion line α determined based on the gamma-corrected luminance Y(p).

Figure 11:
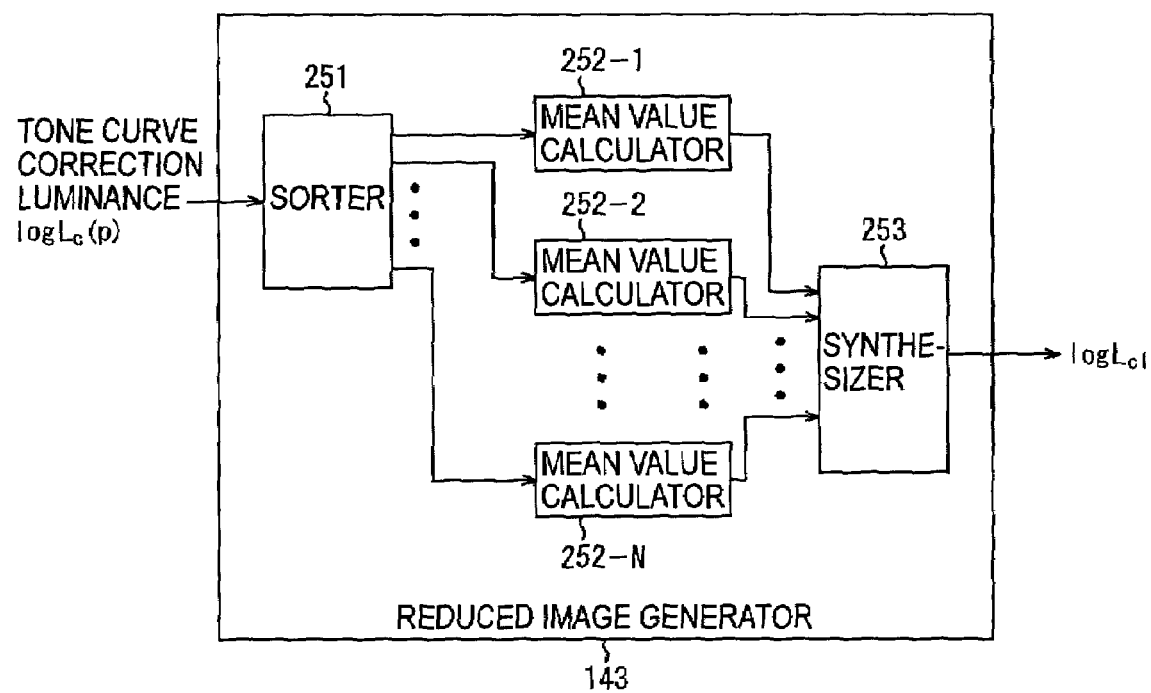
FIG. 11 is a block diagram of a reduced image generator of FIG. 15.

The amount of computation can be reduced with a simple circuit arrangement by taking advantage that the mean luminance calculator 213 in the tone curve corrector 142 of FIG. 9 and the mean value calculator 252 in the reduced image generator 143 of FIG. 11 perform similar calculations. More specifically, a compounder 371 of FIG. 22 can be arranged by combining the tone curve corrector 142, the reduced image generator 143, the reduced image memory 144, and the contrast corrector 145 shown in FIG. 5.

The compounder 371 is interchangeable with a group of the combination of the tone curve corrector 142, the reduced image generator 143, the reduced image memory 144, and the contrast corrector 145 shown in FIG. 5.

An LUT memory 381 in the compounder 371 pre-stores an LUT of the tone curve of FIG. 7 and a representative value $\gamma_1$ representing the slope of the tone curve. A table referencer 382 corrects the logarithmic luminance logL(p) inputted from the preceding stage into a logarithmic luminance $logL_c(p)$ in accordance with the LUT in the LUT memory 381, and outputs the corrected logarithmic luminance $logL_c(p)$ to both a reduced image generator 383 and a multiplier 391.

The reduced image generator 383 segments the logarithmic luminance image $logL_c$ into m×n blocks, calculates the mean value of the logarithmic luminance $logL_c(p)$ of the pixels belonging to each block, generates a first reduced image of the m×n pixels, and stores the first reduced image in a first reduced image memory 384.

A mean luminance calculator 385 calculates the mean luminance value μ of the pixel values of the first reduced image in the frame, immediately prior to the current frame, stored in the first reduced image memory 384, and outputs the mean luminance value μ to a mean luminance smoother 386.

The mean luminance smoother 386 smoothes the mean luminance value μ supplied from the mean luminance calculator 385 based on the mean luminance values μ of frames prior to and subsequent to the current frame, or based on the smoothed mean luminance values μ of the frame prior to and subsequent to the current frame, and outputs the smoothed mean luminance value μ to a divider 387.

The divider 387 divides a predetermined constant $logL_T$ by the smoothed mean luminance value μ to calculate a representative value $\gamma_2$ and stores the representative value $\gamma_2$ in a $\gamma_2$ memory 388. A multiplier 389 multiplies the pixels of the first reduced image stored in the first reduced image memory 384 by the representative value $\gamma_2$ stored in the $\gamma_2$ memory 388 to generate a second reduced image $logL_{cl}$ and stores the second reduced image $logL_{cl}$ onto a second reduced image memory 390.

The multiplier 391 multiplies the logarithmic luminance $logL_c(p)$ of the current frame inputted from the table referencer 382 by the representative value $\gamma_2$ of the frame, immediately prior to the current frame, stored in the $\gamma_2$ memory 388, thereby calculating a tone-curve corrected logarithmic luminance $logL_c(p)$. A multiplier 392 multiplies the representative value $\gamma_1$ by the representative value $\gamma_2$, thereby outputting the resulting product $\gamma(=\gamma_1 \cdot \gamma_2)$ to a gain value setter 393.

The gain value setter 393 calculates the gain value $_g(p)$ determining the contrast enhancement value of the logarithmic luminance $logL_c(p)$ of the current frame, based on the representative value γ of the prior frame inputted from the multiplier 392 and the logarithmic luminance $logL_c(p)$ of the current frame inputted from the multiplier 391.

A contrast enhancer 394 acquires the pixel position p (hereinafter referred to as an interpolation position p) of the logarithmic luminance $logL_c(p)$ of the current frame inputted from the multiplier 391, and outputs the interpolation position p to an interpolator 395. In an interpolation process, the interpolator 395 calculates the logarithmic luminance $logL_{cl}(p)$ at the interpolation position p based on the second reduced image $logL_{cl}$ of the frame, immediately prior to the current frame, stored in the second reduced image memory 390, and outputs the interpolated pixel $logL_{ci}(p)$ to the contrast enhancer 394.

The contrast enhancer 394 calculates a logarithmic luminance $logL_u(p)$ with contrast thereof enhanced except in a low-frequency component in connection with the logarithmic luminance $logL_c(p)$ of the current frame inputted from the multiplier 391, based on the gain value $g(p)$ and the interpolation value $logL_{ci}(p)$ of the reduced image.

In the compounder 371, the mean luminance calculator 385 calculates the mean value of the m×n pixels in the first reduced image. In comparison with the mean luminance calculator 213 of FIG. 9 calculating the mean value of the pixels of the logarithmic luminance image $logL_c(p)$ of the original size, the mean luminance calculator 385 enjoys a reduced amount of computation. A time delay due to computation is thus shortened.

Figure 22:
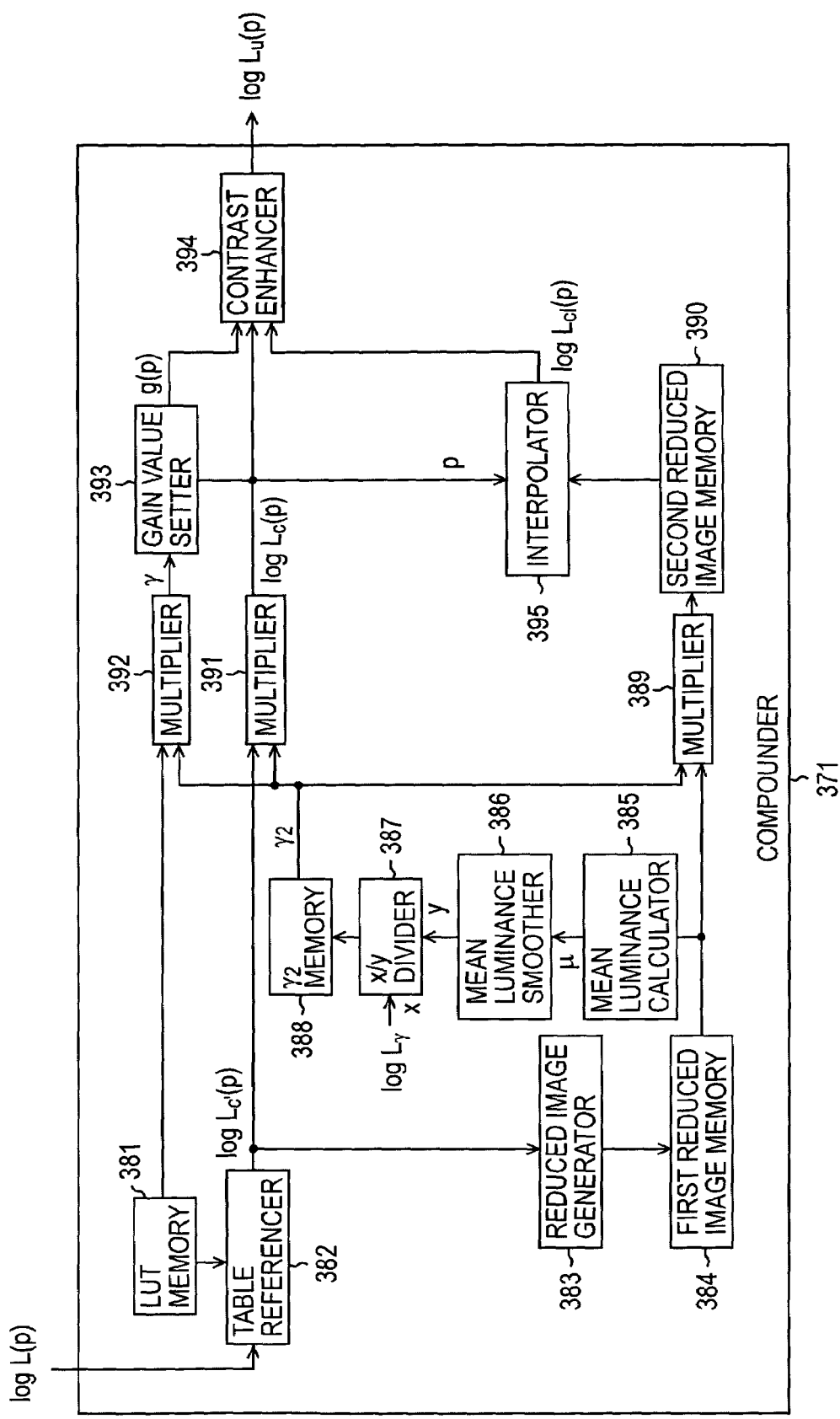
FIG. 22 is a block diagram of a compounder that is interchangeable with elements of FIG. 5 including a tone curve corrector and a contrast corrector.

The general gradation compression process of the first arrangement of the DSP 116 incorporating the compounder 371 of FIG. 22 is described below with reference to a flowchart of FIG. 23.

In step S1, the DSP 116 converts the input wide DR image L of the current frame into a narrow DR image $Y_n$, based on the intermediate information (including the second reduced image $logL_c(p)$, the representative value γ, the luminance domain information $[Y_d, Y_b]$) calculated and stored for the wide DR luminance image of the frame immediately prior to the current image. The DSP 116 also calculates the intermediate information of the wide DR luminance image L of the current frame.

In step S2, the DSP 116 updates the intermediate information of the stored wide DR luminance image of the frame immediately prior to the current frame, based on the intermediate information of the calculated wide DR luminance image L of the current frame.

In step S3, the DSP 116 determines whether a subsequent frame in succession to the wide DR luminance image of the input current frame is present. If it is determined that a subsequent frame is present, the DSP 116 returns to step S1 to repeat the process in step S1 and subsequent steps. If it is determined that no subsequent frame is present, the gradation conversion process completes.

The process on a per pixel basis in step S1 is described with reference to a flowchart of FIG. 24. The process in each step to be discussed here is performed on a pixel of interest (at a pixel position p) inputted in the order of raster scan.

In step S11, luminance $L(p)$ of the pixel of interest (at the pixel position p) is input to the DSP 116. In step S12, the logarithmic converter 141 logarithmically converts the input luminance $L(p)$, thereby outputting the resulting logarithmic luminance $logL(p)$ to the compounder 371. In step S13, the table referencer 382 in the compounder 371 corrects the logarithmic luminance $logL(p)$ inputted from the logarithmic converter 141 to the logarithmic luminance $logL_c(p)$ in accordance with the LUT stored in the LUT memory 381 and outputs the logarithmic luminance $logL_c(p)$ to the reduced image generator 383 and the multiplier 392. At the same time, the LUT memory 381 outputs the representative value $γ_1$ of the slope of the tone curve to the multiplier 392. The multiplier 392 multiplies the representative value $γ_1$ by the representative value $γ_2$ calculated from the first reduced image of the immediately prior frame stored in the $γ_2$ memory 388, thereby outputting the resulting product as the representative value γ to the gain value setter 393.

In step S14, the reduced image generator 383 generates the first reduced image based on the logarithmic luminance $logL_c(p)$ of the frame immediately prior to the current frame.

The representative value $γ_2$ is calculated based on the first reduced image. The generated first reduced image is multiplied by the representative value $γ_2$, and the second reduced image $logL_{ci}$ results.

In step S15, the multiplier 391 multiplies the logarithmic luminance $logL_c(p)$ of the current frame inputted from the table referencer 382 by the representative value $γ_2$ of the frame, immediately prior to the current frame, stored in the $γ_2$ memory 388, thereby outputting the resulting tone-curve corrected logarithmic luminance $logL_c(p)$.

In step S16, the gain value setter 393 calculates the gain value $g(p)$ determining the contrast enhancement amount of the logarithmic luminance $logL_c(p)$ of the current frame, based on the representative value γ of the frame immediately prior to the current frame inputted from the multiplier 392 and the logarithmic luminance $logL_c(p)$ of the current frame inputted from the multiplier 391.

In step S17, the interpolator 395 calculates the logarithmic luminance $logL_{ci}(p)$ at the interpolation position p through the interpolation process using the second reduced image $logL_{ci}$ of the frame, immediately prior to the current frame, stored in the second reduced image memory 390, and outputs the resulting logarithmic luminance $logL_{ci}(p)$ to the contrast enhancer 394. In step S18, the contrast enhancer 394 enhances the tone-curve corrected logarithmic luminance $logL_c(p)$ in a frequency range other than the low-frequency component, based on the interpolation value $logL_{ci}(p)$ of the second reduced image and the gain value $g(p)$, and outputs the resulting contrast-corrected logarithmic luminance $logL_u(p)$ to the anti-logarithmic converter 146.

In step S19, the anti-logarithmic converter 146 converts the contrast-corrected logarithmic luminance $logL_u(p)$ to non-logarithmic luminance $L_u(p)$ and outputs the luminance $L_u(p)$ to the gamma corrector 147. In step S20, the gamma corrector 147 performs a predetermined gamma correction on the luminance $L_u(p)$, and outputs the resulting luminance $Y(p)$ to both the luminance domain information calculator 148 and the luminance domain normalizer 151.

In step S21, the luminance domain information calculator 148 generates the luminance domain information $[Y_d, Y_b]$ based on the luminance $Y(p)$ of one frame.

In step S22, the luminance domain information smoother 149 performs a luminance domain information smoothing process, thereby smoothing the luminance domain information $[Y_d, Y_b]$ and storing the smoothed luminance domain information $[Y_d, Y_b]$ onto the luminance domain information memory 150. The luminance domain information smoothing process will be discussed later with reference to a flowchart of FIG. 25.

In step S23, the luminance domain normalizer 151 normalizes the luminance $Y(p)$ inputted from the gamma corrector 147, based on the smoothed luminance domain information $[Y_d, Y_b]$ of the frame, immediately prior to the current frame, stored in the luminance domain information memory 150, and outputs the resulting normalized luminance $Y_n(p)$. In step S24, the luminance domain normalizer 151 outputs the luminance $Y_n(p)$ as a pixel value of the gradation compressed narrow DR luminance image.

Figure 25:
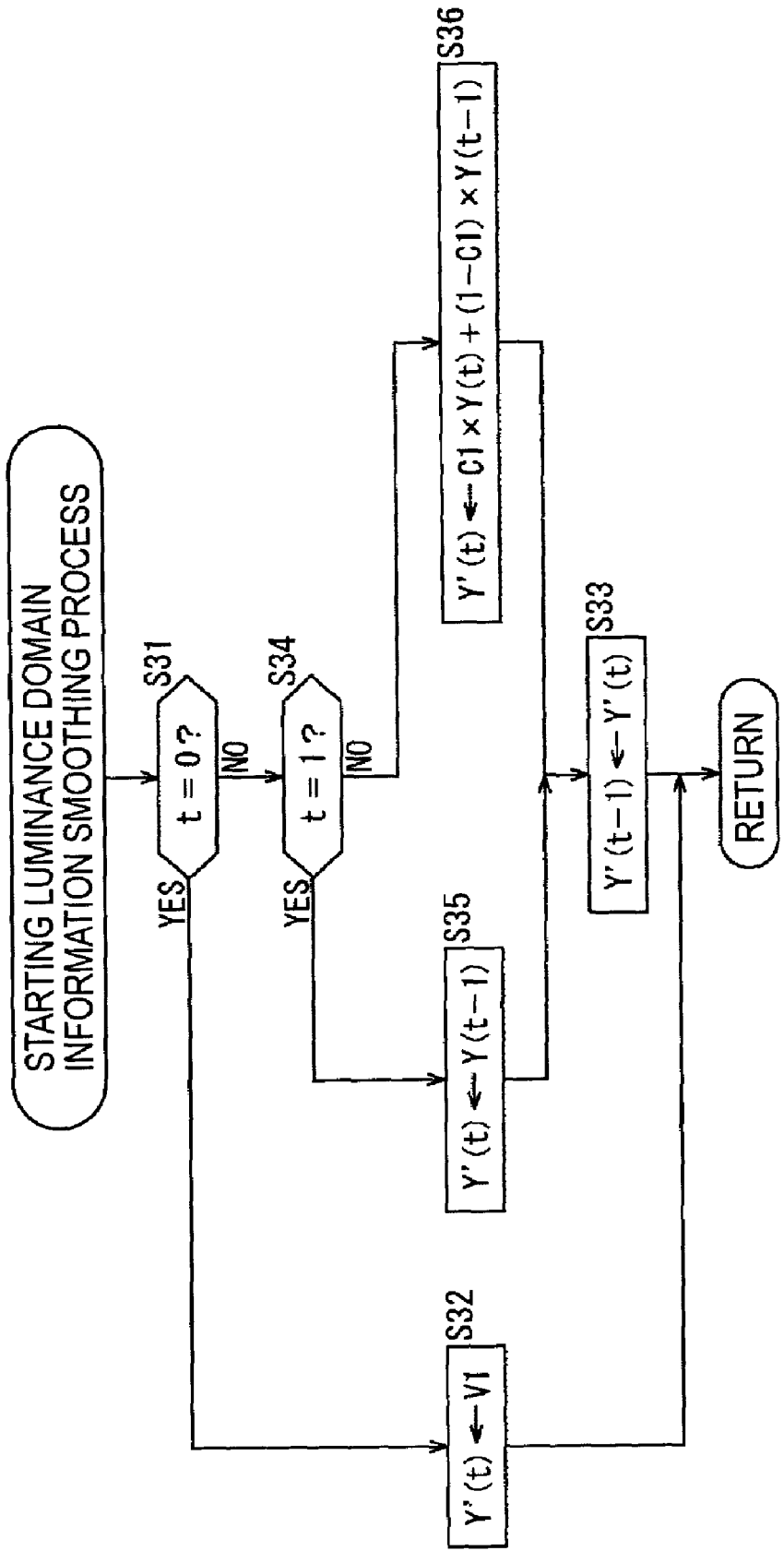
FIG. 25 is a flowchart illustrating a detailed process in step S22 of FIG. 24.

The luminance domain information smoothing process in step S23 in the flowchart of FIG. 24 is described below with reference to the flowchart of FIG. 25. In the discussion of the luminance domain information smoothing process, luminances $Y_d$ and $Y_b$ of the luminance domain information $[Y_d, Y_b]$ at time t is collectively referred to as $Y(t)$.

In step S31, the smoothing calculator 351 in the luminance domain information smoother 149 determines whether time t of an input frame is zero, i.e., whether a frame is a first inputted one. If it is determined in step S31 that time t is zero, the smoothing calculator 351 outputs a predetermined constant V1 as smoothed luminance domain information Y'(t) at time t, while storing the smoothed luminance domain information Y'(t) onto the buffer 352 in step S32.

In step S33, the smoothed luminance domain information Y'(t) overwrites on the buffer 352 as the smoothed luminance domain information Y'(t−1) of the frame immediately prior to the current frame.

If it is determined in step S31 that time t is not zero, i.e., that the luminance domain information Y(t) for a prior frame is already supplied, the smoothing calculator 351 determines in step S34 whether time t=1, i.e., whether the luminance domain information Y(t)(t=1) is for a second frame. If it is determined that the luminance domain information is the luminance domain information Y(t)(t=1) for the second frame, the process proceeds to step S35.

In step S35, the smoothing calculator 351 outputs the luminance domain information Y(t−1) (Y(0) for the second frame) of the frame, immediately prior to the current frame, stored in the buffer 352, as the smoothed result of the luminance domain information Y(t). The process proceeds to step S33.

If it is determined in step S34 that time t is not 1, i.e., that the frame is a third or subsequent frame, the process proceeds to step S36.

In step S36, the smoothing calculator 351 calculates C1×Y(t)+(1−C1)×Y'(t−1) based on the luminance domain information Y(t) of the currently input frame, and the smoothed luminance domain information Y1(t−1) of the immediately prior frame stored in the buffer 352, and outputs the result as the smoothed luminance domain information Y'(t) of the currently input frame. The process proceeds to step S33. Here, a weight C1 is any value greater than 0 but smaller than 1.

By repeating the above-referenced process, the luminance domain information is successively smoothed taking into consideration the smoothed luminance domain information of the immediately prior frame. The gradation compression process is thus performed in accordance with luminance variations in a moving image on a frame-by-frame basis. The closer to 1 the weight C1, the more the value of the luminance domain information of the current frame is reflected in the smoothing operation. Conversely, the closer to 0 the weight C1, the more the value of the luminance domain information of the immediately prior frame is reflected in the smoothing operation. In the above discussion, the luminance domain information is smoothed based on the luminance domain information smoothed at the immediately preceding timing and the luminance domain information currently input. The smoothing process can be performed using luminance domain information smoothed at more timings and the currently input luminance domain information.

Figure 23:
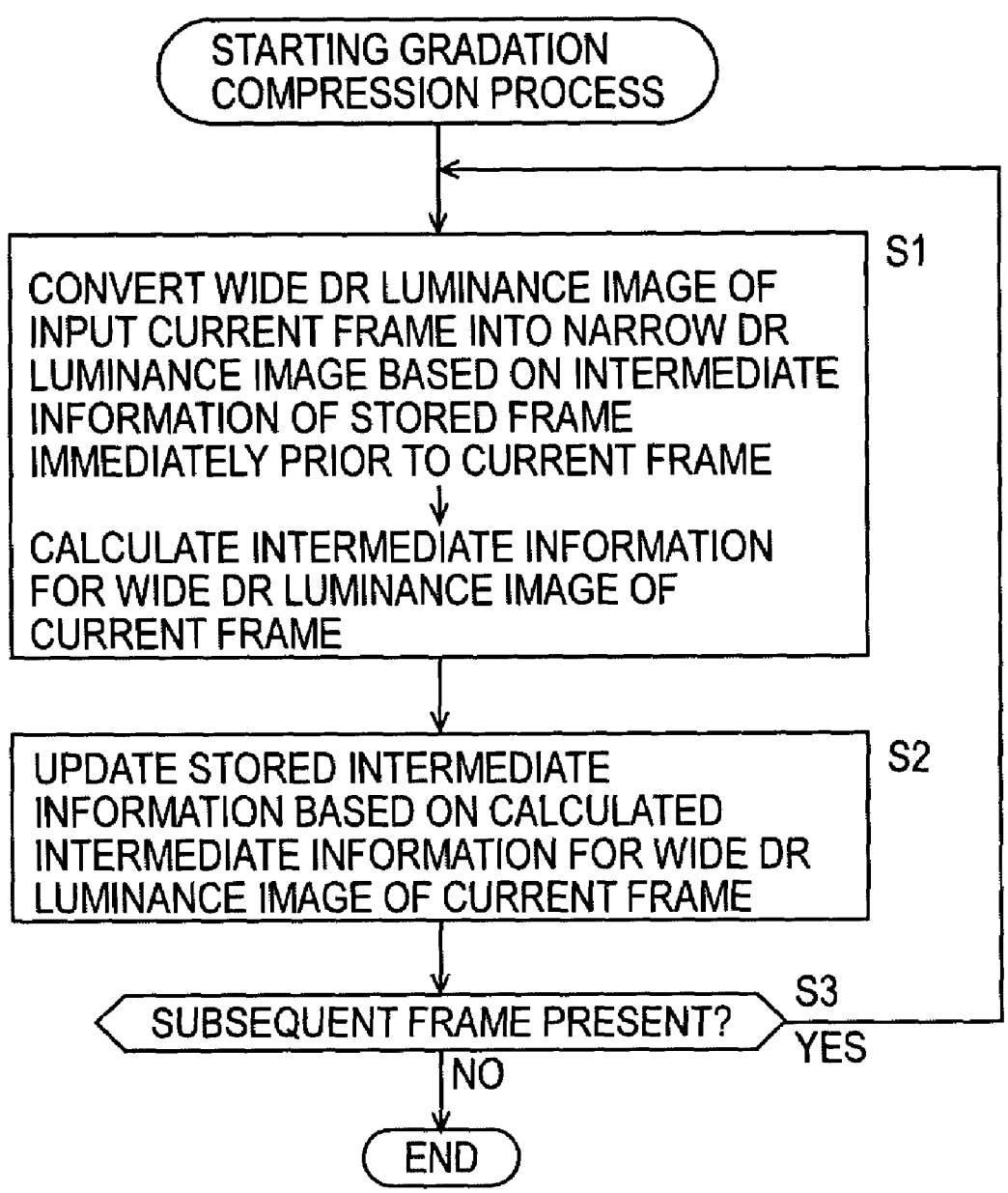
FIG. 23 is a flowchart illustrating a gradation compression process of the first arrangement of the digital signal processor.

The process in step S2 of FIG. 23 is described below with reference to a flowchart of FIG. 26. In step S41, the reduced image generator 383 updates the first reduced image stored in the first reduced image memory 384 with the first reduced image that is generated from the tone-curve corrected logarithmic luminance $\log L_{c'}(p)$ of one frame.

In step S42, the mean luminance calculator 385 calculates the mean luminance value μ based on the pixel value of each pixel in the first reduced image memory 384 and supplies the mean luminance smoother 386 with the mean luminance value μ.

In step S43, the mean luminance smoother 386 performs the mean luminance smoothing process to smooth the supplied mean luminance value μ, and outputs the smoothed mean luminance value μ to the divider 387. The mean luminance smoothing process will be discussed in detail later with reference to a flowchart of FIG. 27.

In step S44, the divider 387 divides the predetermined constant $\log L_T$ by the smoothed mean luminance value μ inputted from the mean luminance calculator 385 to calculate the representative value $\gamma_2$. The divider 387 updates the representative value $\gamma_2$ stored in the $\gamma_2$ memory 388 with the calculated representative value $\gamma_2$.

In step S45, the multiplier 389 multiplies each pixel of the first reduced image updated in step S41 and stored in the first reduced image memory 384 by the representative value $\gamma_2$ updated in step S44 and stored in the $\gamma_2$ memory 388, thereby generating the second reduced image $\log L_{cl}$. The multiplier 389 thus updates the second reduced image $\log L_{cl}$ stored in the second reduced image memory 390 with the generated second reduced image $\log L_{cl}$.

In step S46, the luminance domain information calculator 148 updates the luminance domain information $[Y_d, Y_b]$ of the fame, immediately prior to the current frame, stored in the luminance domain information memory 150 with the luminance domain information $[Y_d, Y_b]$ calculated from the luminance Y(p) of one frame.

Figure 26:
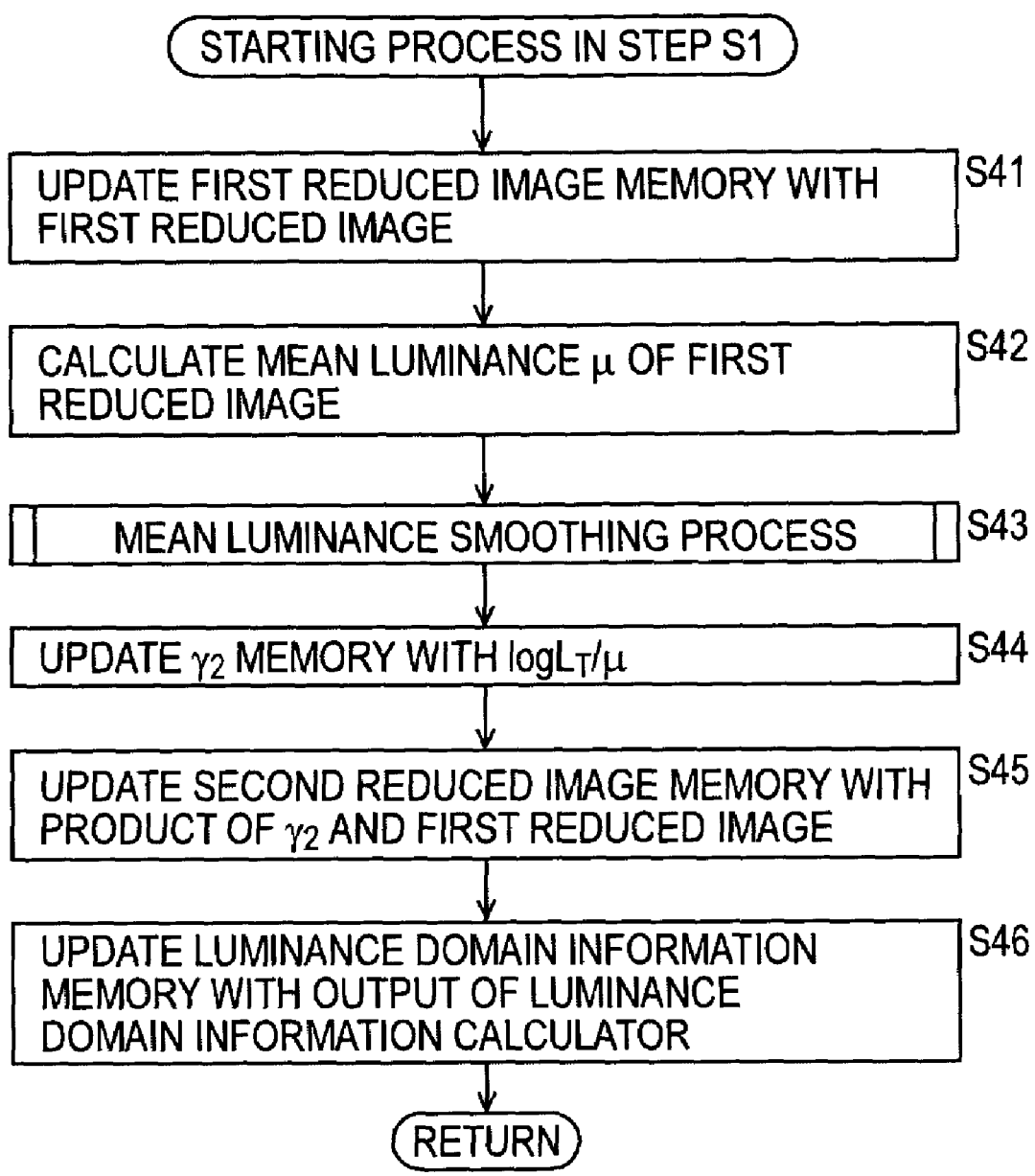
FIG. 26 is a flowchart illustrating a detained process in step S2 of FIG. 23.
Figure 27:
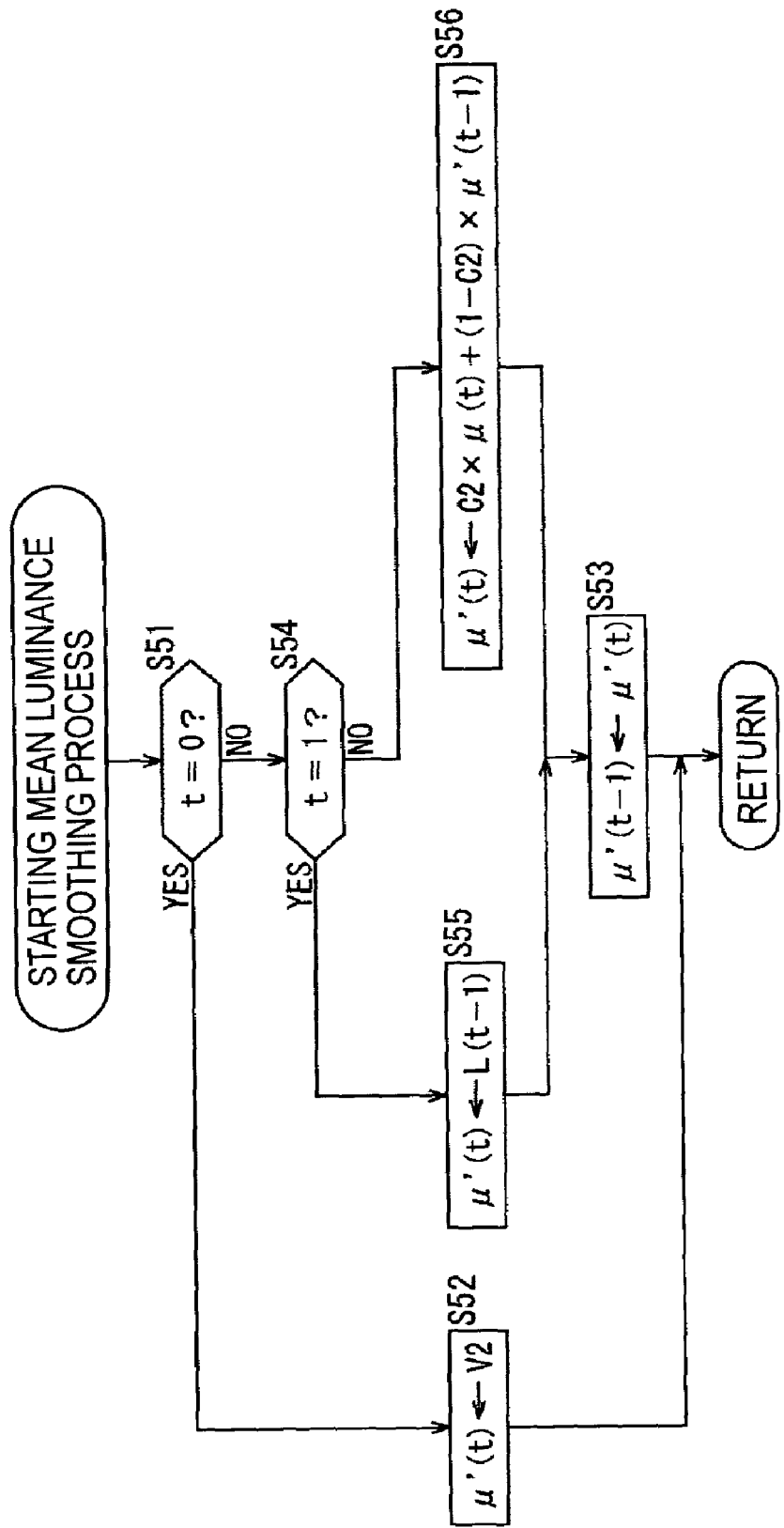
FIG. 27 is a flowchart illustrating a detailed process in step S43 of FIG. 26.

The mean luminance smoothing process in step S43 in the flowchart of FIG. 26 is described below with reference to a flowchart of FIG. 27. In the following discussion, the mean luminance value μ at time t is referred to as μ(t).

In step S51, the smoothing calculator 231 in the mean luminance smoother 214 determines whether time t of an input frame is zero, i.e., whether a frame is a first inputted one. If it is determined in step S51 that time t is zero, the smoothing calculator 231 outputs a predetermined constant V2 as smoothed luminance domain information μ'(t) at time t, while storing the smoothed luminance domain information μ'(t) onto the buffer 232 in step S52.

In step S53, the smoothed mean luminance value μ'(t) overwrites on the buffer 232 as the smoothed mean luminance value μ'(t−1) of the frame immediately prior to the current frame.

If it is determined in step S51 that time t is not zero, i.e., that the mean luminance value μ(t) for a prior frame is already supplied, the smoothing calculator 231 determines in step S54 whether time t=1, i.e., whether the mean luminance value μ(1) is for a second frame. If it is determined that the mean luminance value is the mean luminance value μ(1) for the second frame, the process proceeds to step S55.

In step S55, the smoothing calculator 231 outputs the mean luminance value μ(t−1) (μ(0) for the second frame) of the frame, immediately prior to the current frame, stored in the buffer 232, as the smoothed result of the mean luminance value μ(t). The process proceeds to step S53.

If it is determined in step S54 that time t is not 1, i.e., that the frame is a third or a subsequent frame, the process proceeds to step S56.

In step S56, the smoothing calculator 231 calculates C2×μ(t)+(1−C2)×μ'(t−1) based on the mean luminance value μ(t) of the currently input frame, and the smoothed mean luminance value μ'(t−1) of the immediately prior frame stored in the buffer 232, and outputs the result as the smoothed mean luminance value μ'(t) of the currently input frame. The process proceeds to step S53. Here, a weight C2 is any value greater than 0 but smaller than 1.

By repeating the above-referenced process, the mean luminance value is successively smoothed taking into consideration the smoothed mean luminance value of the immediately prior frame. The gradation compression process is thus performed in accordance with luminance variations in a moving image on a frame-by-frame basis. The closer to 1 the weight C2, the more the value of the mean luminance value of the current frame is reflected in the smoothing operation. The closer to 0 the weight C1, the more the value of the mean luminance value of the immediately prior frame is reflected in the smoothing operation. In the above discussion, the mean luminance value is smoothed based on the mean luminance value smoothed at the immediately preceding timing and the mean luminance value currently input. The smoothing process can be performed using mean luminance value smoothed at more timings and the currently input mean luminance value.

In the above discussion, the mean luminance value of a next frame is smoothed using the process result of a prior frame. This process is a so-called infinite impulse response (IIR), which can provide an unstable result depending on coefficients used in calculation.

A finite impulse filter (FIR) can be used. The FIR stabilizes the output thereof by performing a smoothing operation using a mean luminance value of certain past frames.

Figure 28:
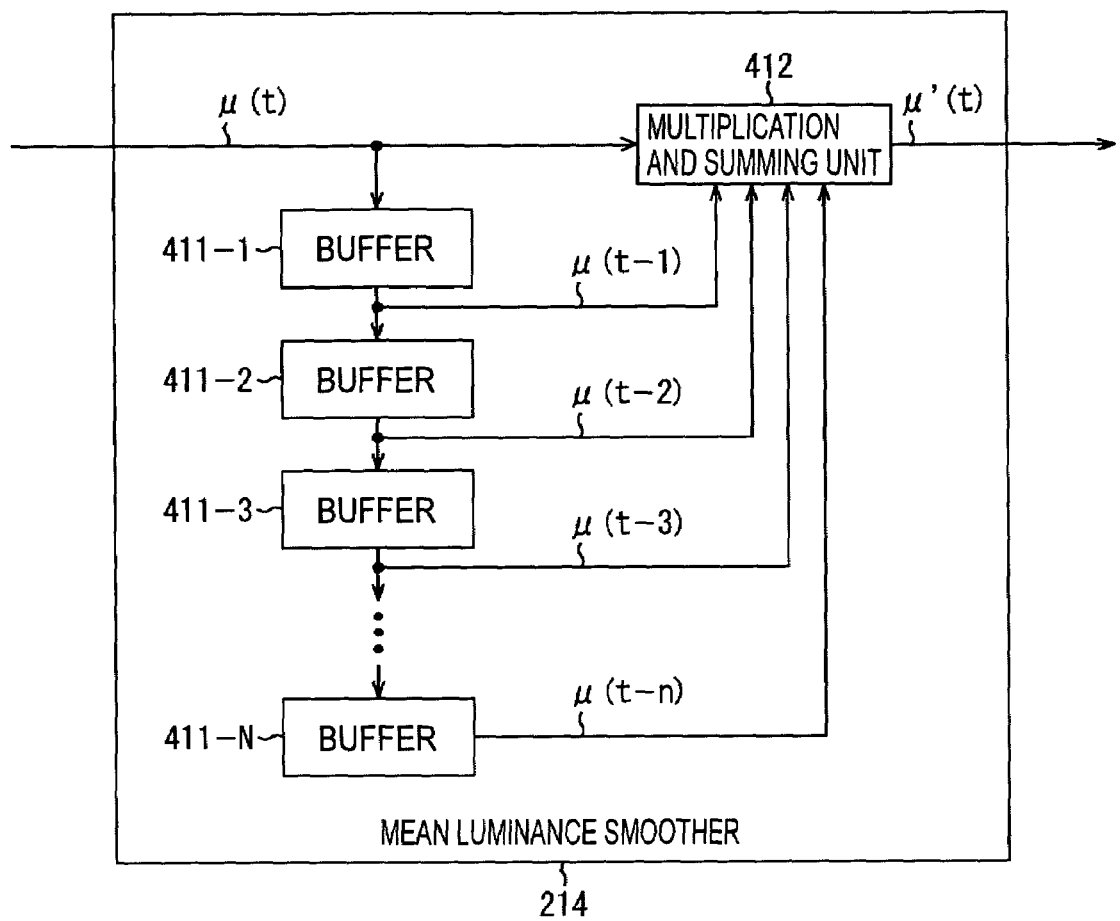
FIG. 28 is a block diagram illustrating another arrangement of the luminance domain information smoother of FIG. 5.

FIG. 28 illustrates an FIR-type mean luminance smoother 214. Buffers 411-1 through 411-N are basically identical to each other in structure. Upon receiving the mean luminance value $\mu(t)$ at time t, the buffer 411-1 supplies a multiplication and summing unit 412 and the buffer 411-2 with the mean luminance value $\mu(t-1)$ stored at time $(t-1)$ prior to time t. Similarly, the buffer 411-$n$ stores the mean luminance value $\mu(t)$ supplied from the buffer 411-$(n-1)$ while supplying the buffer 411-$(n+1)$ and the multiplication and summing unit 412 with the mean luminance value $\mu(t-1)$ stored at immediately preceding timing.

As a result, the buffers 411-1 through 411-N supply the multiplication and summing unit 412 with the mean luminance values $\mu(t-1)$ through $\mu(t-N)$ spreading over from time $(t-N)$ to current time t.

The multiplication and summing unit 412 performs a multiplication and summing operation on the mean luminance values $\mu(t-1)$ through $\mu(t-N)$ and predetermined weight coefficients, thereby smoothing the mean luminance value $\mu(t)$, and outputting the smoothed mean luminance value $\mu'(t)$.

Figure 29:
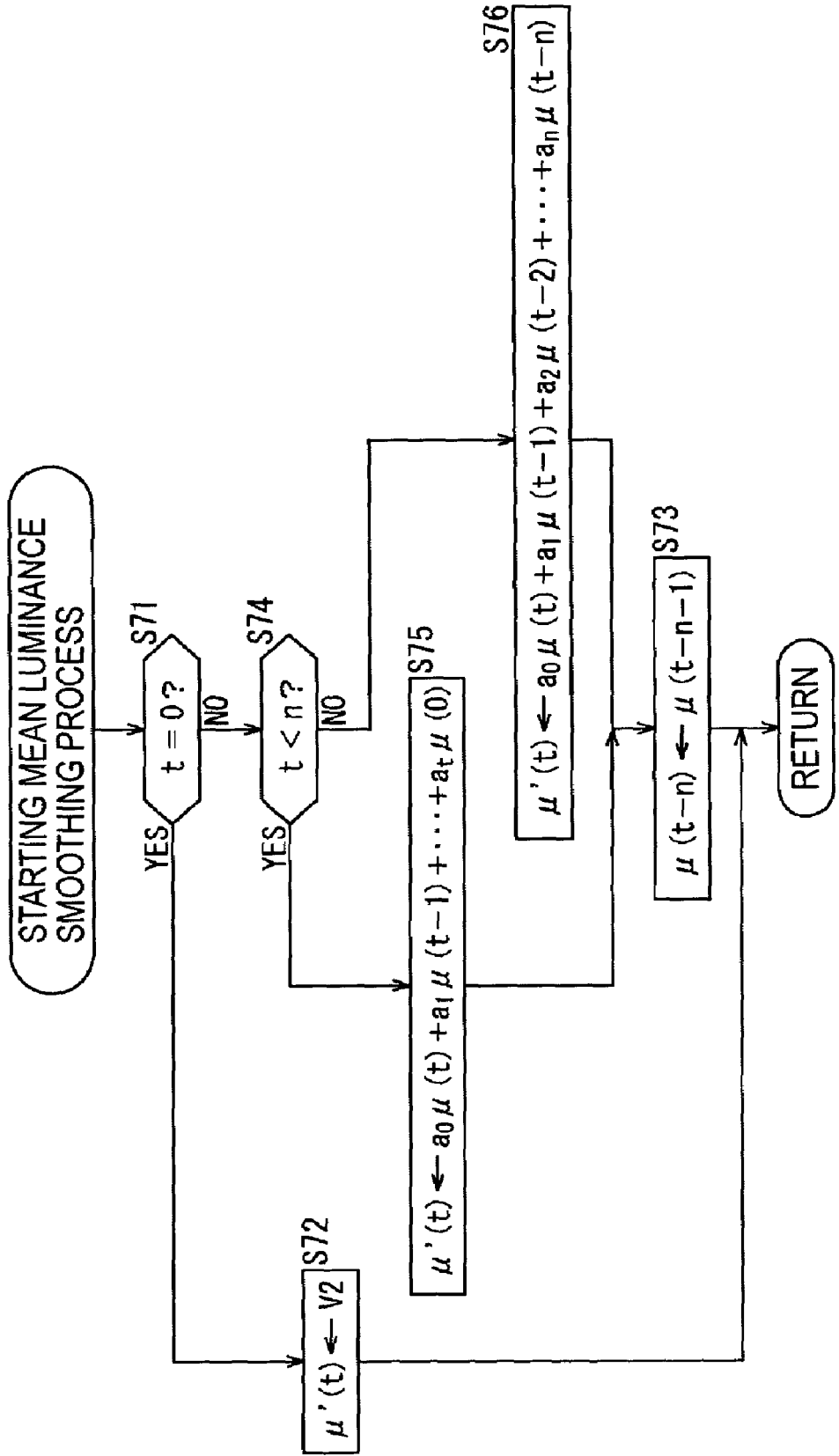
FIG. 29 is a flowchart illustrating another detailed process in step S43 of FIG. 26.

The mean luminance smoothing process of the mean luminance smoother 214 of FIG. 28 is described below with reference to a flowchart of FIG. 29.

In step S71, the multiplication and summing unit 412 in the mean luminance smoother 214 of FIG. 28 determines whether time t of an input frame is zero, i.e., whether a frame is a first inputted one. If it is determined in step S71 that time t is zero, the multiplication and summing unit 412 outputs a predetermined constant V2 as smoothed luminance domain information $\mu'(t)$ at time t, and the buffer 411-1 stores the input mean luminance value $\mu(t)$(=mean luminance value $\mu(0)$) in step S72.

In step S73, the buffer 411-$n$ supplies the buffer 411-$(n+1)$ with the mean luminance value $\mu(t-n)$ stored therein, while causing the mean luminance value $\mu(t)$ supplied from the buffer 411-$(n-1)$ thereon as the mean luminance value $\mu(t-n)$.

If it is determined in step S71 that time t is not zero, i.e., that the mean luminance value $\mu(t)$ for a frame prior to the frame is already supplied, the multiplication and summing unit 412 determines in step S74 whether the condition of time $t \leq N$ holds, i.e., whether none of the buffers 411-1 through 411-N store the mean luminance value $\mu(t)$. If it is determined that none of the buffers stores the mean luminance value, the process proceeds to step S75.

In step S75, the multiplication and summing unit 412 multiplies the mean luminance values $\mu(t)$ through $\mu(0)$ of the buffers 411-1 through 411-$t$, having already stored mean luminance value $\mu$, from among the buffers 411-1 through 411-N, and the current frame by weight coefficients $a_0$ through $a_t$, respectively, in order to output the mean luminance value $\mu'(t)$. The mean luminance value $\mu'(t)$ is a smoothed version of the mean luminance value $\mu(t)$. The process proceeds to step S73. More specifically, the multiplication and summing unit 412 calculates $a_0\mu(t)+a_1\mu(t-1)+a_2\mu(t-2)+ \ldots +a_t\mu(0)$, and outputs the smoothed mean luminance value $\mu'(t)$. The weight coefficients, satisfying $a_0+a_1+a_2+ \ldots +a_t=1$, can be any value.

If it is determined in step S74 that the condition of time $t \leq N$ does not holds, the process proceeds to step S76.

In step S76, the multiplication and summing unit 412 multiplies the mean luminance values $\mu(t)$ through $\mu(0)$ stored the buffers 411-1 through 411-N, having already stored mean luminance value $\mu$, and the current frame by weight coefficients $a_0$ through $a_N$, respectively, in order to output the mean luminance value $\mu'(t)$. The mean luminance value $\mu'(t)$ is a smoothed version of the mean luminance value $\mu(t)$. The process proceeds to step S73. More specifically, the multiplication and summing unit 412 calculates $a_0\mu(t)+a_1\mu(t-1)+a_2\mu(t-2)+ \ldots +a_n\mu(t-n)$, and outputs the smoothed mean luminance value $\mu'(t)$. The weight coefficients, satisfying $a_0+a_1+a_2+ \ldots +a_n=1$, can be any value.

By repeating the above-referenced process, the mean luminance value is successively smoothed taking into consideration the smoothed mean luminance value of the immediately prior frames. The gradation compression process is thus performed in accordance with luminance variations in a moving image on a frame-by-frame basis. As the FIR type filter, the mean luminance smoother 214 uses the mean luminance value of past input frames, the result becomes stabilized.

The FIR type mean luminance smoothing process has been discussed. Also, the luminance domain information smoothing process can be an FIR type.

Figure 30:
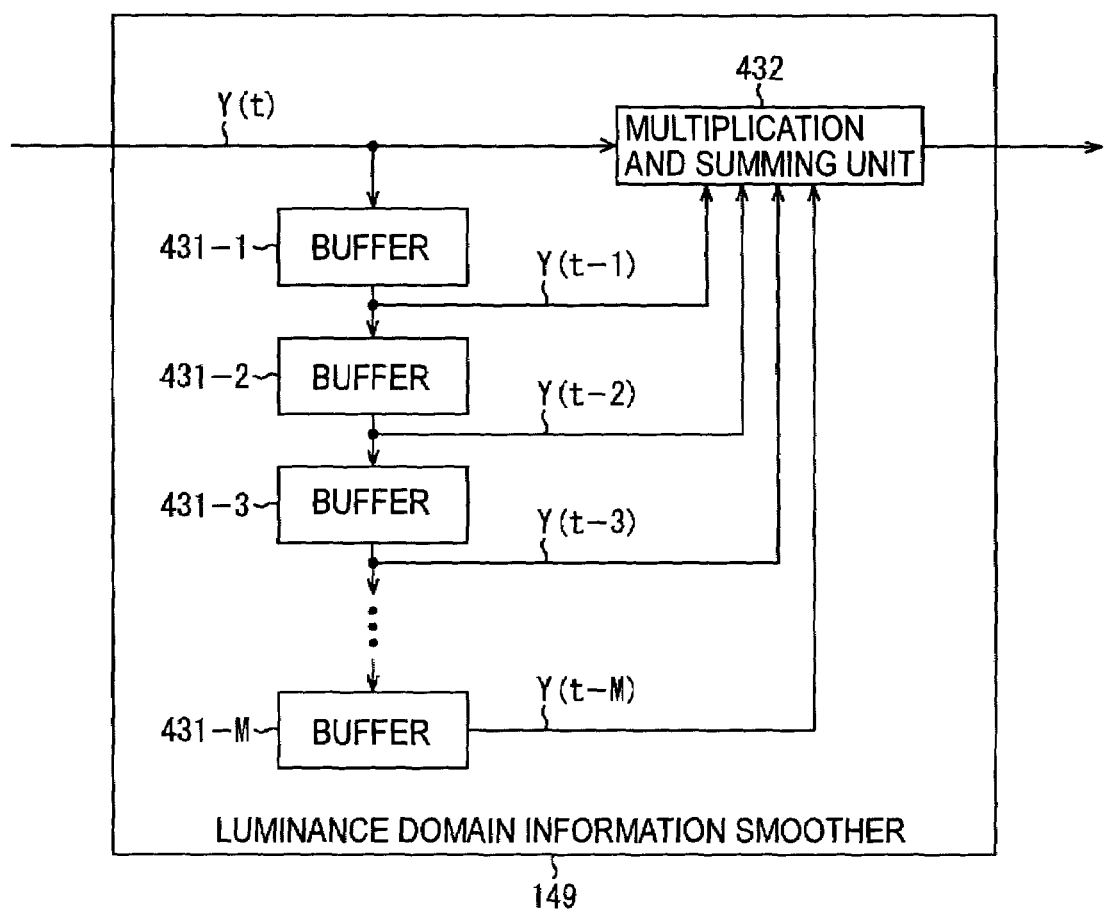
FIG. 30 is a block diagram illustrating another arrangement of the luminance domain information smoother of FIG. 5.

FIG. 30 illustrates an FIR type luminance domain information smoother 149.

Buffers 431-1 through 431-M are identical to each other in structure. Upon receiving the luminance domain information Y(t) at time t, the buffer 431-1 supplies a multiplication and summing unit 432 and the buffer 431-2 with the luminance domain information Y(t-1) stored at time (t-1) prior to time t. Similarly, the buffer 431-$n$ stores the luminance domain information Y(t) supplied from the buffer 411-$(n-1)$ while supplying the buffer 431-$(n+1)$ and the multiplication and summing unit 432 with the luminance domain information Y(t-1) stored at immediately preceding timing.

As a result, the buffers 431-1 through 431-M supply the multiplication and summing unit 432 with the luminance domain information Y(t-1) through Y(t-N) spreading over from time t-N to current time t.

The multiplication and summing unit 432 performs a multiplication and summing operation on the luminance domain information Y(t) through Y(t-M) and predetermined weight coefficients, thereby smoothing the luminance domain information Y(t), and outputting the luminance domain information Y'(t).

Figure 31:
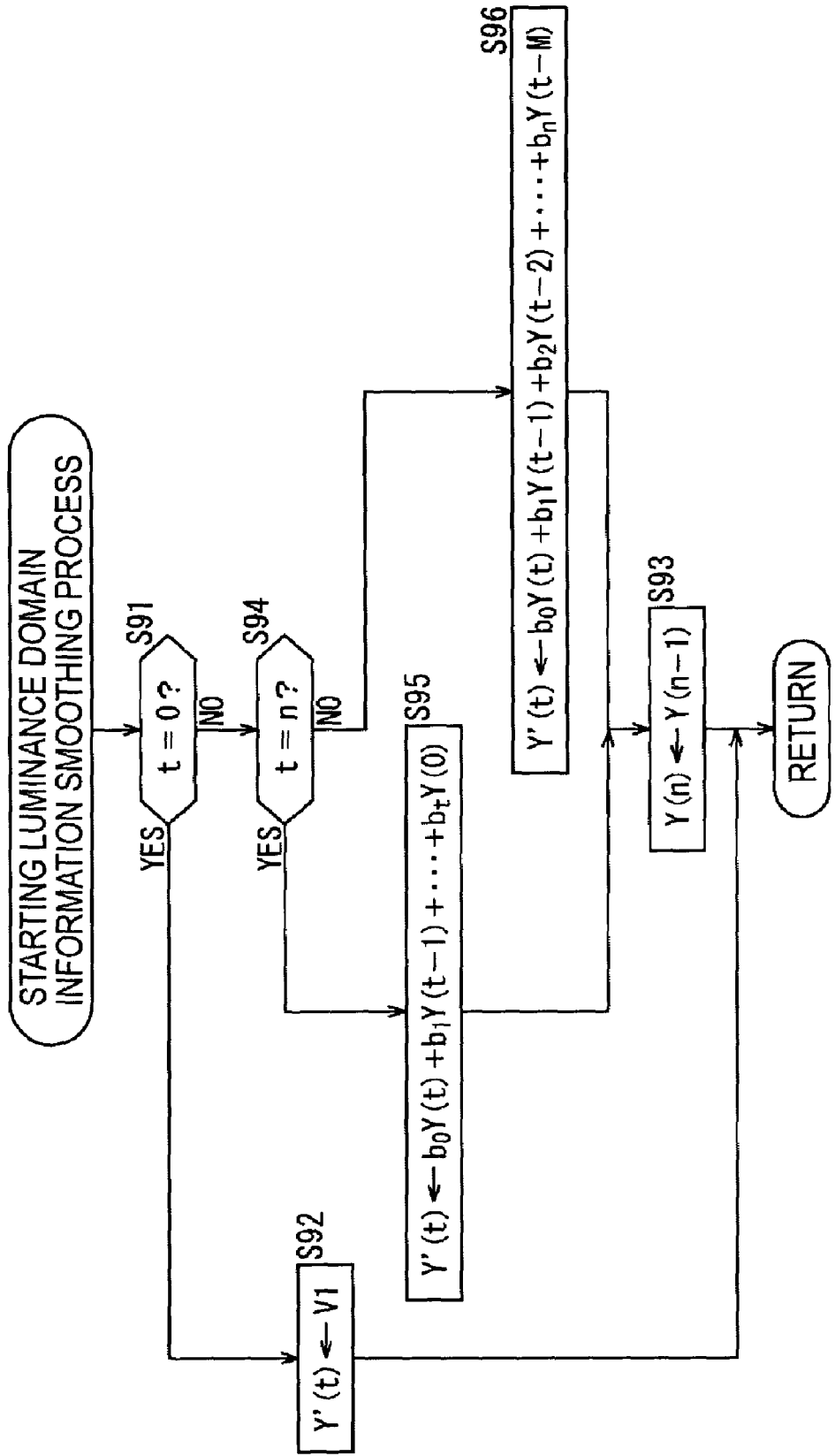
FIG. 31 is a flowchart illustrating another detailed process in step S22 of FIG. 24.

The mean luminance smoothing process of the luminance domain information smoother 149 of FIG. 30 is described below with reference to a flowchart of FIG. 31.

In step S91, the multiplication and summing unit 432 in the luminance domain information smoother 149 of FIG. 30 determines whether time t of an input frame is zero, i.e., whether a frame is a first inputted one. If it is determined in step S91 that time t is zero, the multiplication and summing unit 432 outputs a predetermined constant V1 as smoothed luminance domain information Y'(t) at time t, and the buffer 431-1 stores the luminance domain information Y(t) (=luminance domain information Y(t)(t=0)) in step S92.

In step S93, the buffer 431-$n$ (n=1, 2, 3 ..., M) supplies the buffer 431-($n$+1) with the luminance domain information Y(t−1) stored therein, while causing the luminance domain information Y(t) supplied from the buffer 431-($n$−1) to overwrite thereon as the luminance domain information Y(t−1).

If it is determined in step S91 that time t is not zero, i.e., that the luminance domain information Y(t) for a prior frame is already supplied, the multiplication and summing unit 432 determines in step S94 whether the condition of time t≦M holds, i.e., whether none of the buffers 431-1 through 431-M store the luminance domain information Y(t). If it is determined that none of the buffers stores the luminance domain information Y(t), the process proceeds to step S95.

In step S95, the multiplication and summing unit 432 multiplies the luminance domain information Y(t) through Y(0) of the buffers 431-1 through 431-$t$, having already stored luminance domain information Y, from among the buffers 431-1 through 431-M, and the current frame by weight coefficients $b_0$ through $b_t$, respectively, in order to output the mean luminance value µ'(t). The luminance domain information Y'(t) is a smoothed version of the luminance domain information Y(t). The process proceeds to step S93. More specifically, the multiplication and summing unit 432 calculates $b_0Y(t)+b_1Y(t-1)+b_2Y(t-2)+ \ldots +b_tY(0)$, and outputs the smoothed mean luminance value Y'(t). The weight coefficients, satisfying $b_0+b_1+b_2+ \ldots +b_t=1$, can be any value.

If it is determined in step S94 that the condition of t≦M does not hold, i.e., that the frame is a frame M or subsequent frame, the process proceeds to step S96.

In step S96, the multiplication and summing unit 432 multiplies the luminance domain information Y(t) through Y(0) stored in the buffers 431-1 through 431-M and the current frame by weight coefficients $b_0$ through $b_N$, respectively, in order to output the luminance domain information Y'(t). The luminance domain information Y'(t) is a smoothed version of the luminance domain information Y(t). The process proceeds to step S93. More specifically, the multiplication and summing unit 432 calculates $b_0Y(t)+b_1Y(t-1)+b_2Y(t-2)+ \ldots +b_MY(t-M)$, and outputs the smoothed luminance domain information Y'(t). The weight coefficients, satisfying $b_0+b_1+b_2+ \ldots +b_M=1$, can be any value.

By repeating the above-referenced process, the luminance domain information is successively smoothed taking into consideration the smoothed luminance domain information of the immediately prior frames. The gradation compression process is thus performed in accordance with luminance variations in a moving image on a frame-by-frame basis. Since the luminance domain information smoother 149 uses the mean luminance value of past input frames as the FIR type filter, the result becomes stabilized.

Figure 32:
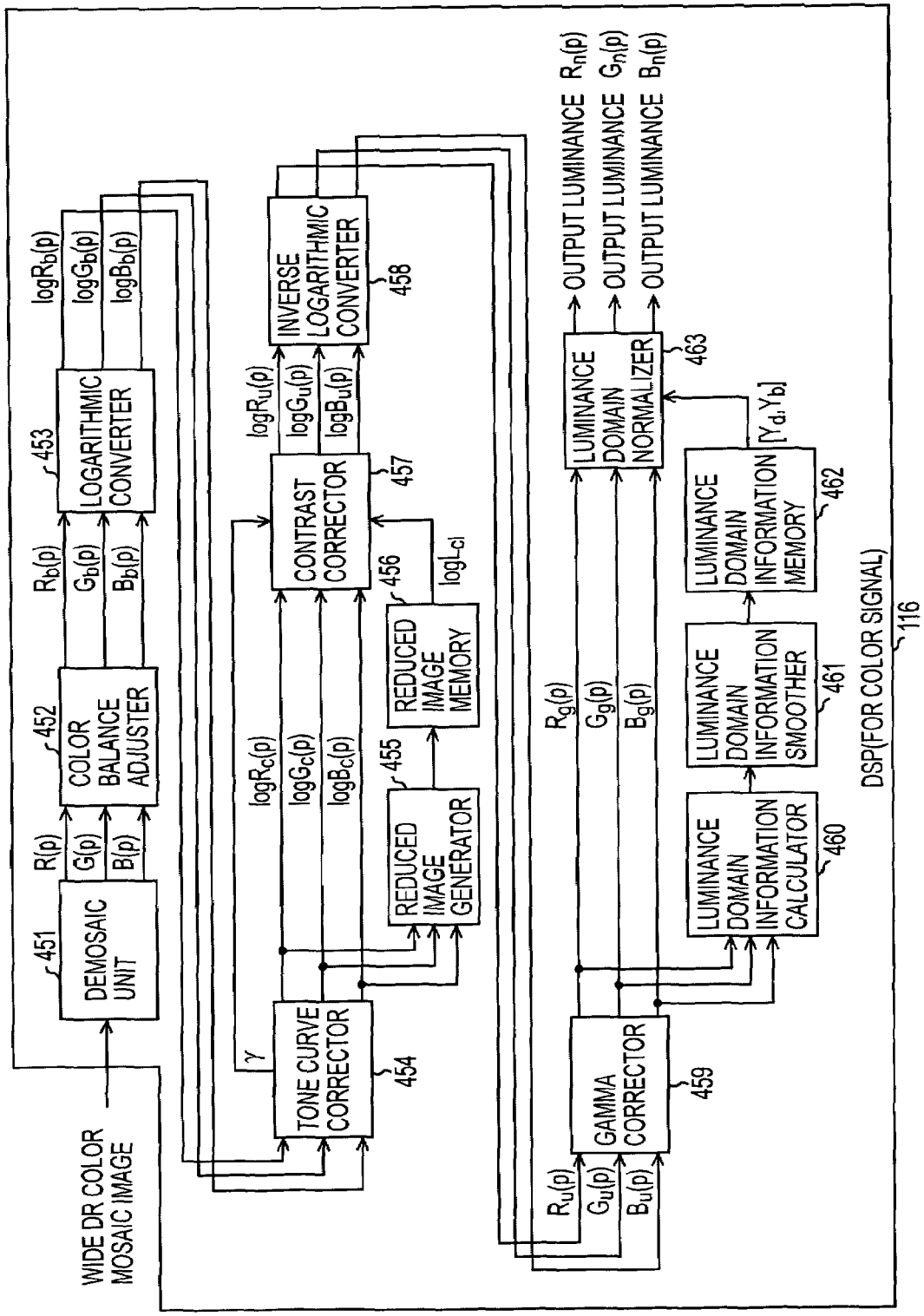
FIG. 32 is a block diagram illustrating a second arrangement of the digital signal processor of FIG. 1.

FIG. 32 illustrates the DSP 116 that handles a color wide DR luminance image. In a wide DR luminance image inputted to the DSP 116 in the order of raster scan, each pixel contains not all of red, green, and blue components but one of the red (R), green (G), and blue (B) components. The color wide DR luminance image inputted to the second arrangement of the DSP 116 is referred to as a wide DR mosaic image. The color component of each pixel of the wide DR color mosaic image is determined by the position of the pixel.

The pixel value of the wide DR color mosaic image inputted to the DSP 116 is represented by L(p).

In the second arrangement of the DSP 116, a demosaic unit 451 performs a demosaic process based on the pixel value L(p) of one frame with one pixel different from another in color component so that each pixel has all of the RGB components. The demosaic unit 451 thus generates a color signal [R(p), G(p), B(p)] and outputs the color signal [R(p), G(p), B(p)] to a color balance adjuster 452. The color signal outputted from the demosaic unit 451 is referred to as a wide DR color image.

The color balance adjuster 452 adjusts the R, G, and B components in order to achieve an appropriate color balance in an entire image, generating a color signal [$R_b$(P), $G_b$(p), $B_b$(P)]. The demosaic unit 451 and the color balance adjuster 452 can be those installed in a typically available digital video camera having a one-CCD image sensor.

A logarithmic converter 453 logarithmically converts the color signal [$R_b$(P), $G_b$(P), $B_b$(P)] inputted from the color balance adjuster 452 and outputs the resulting logarithmic color signal [log$R_b$(p), log$G_b$(p), log$B_b$(p)] to a tone curve corrector 454. The tone curve corrector 454 applies a preset tone curve to the inputted logarithmic color signal [log$R_b$(p), log$G_b$(p), log$B_b$(p)] for gradation compression. The tone curve corrector 454 outputs the resulting logarithmic color signal [log$R_c$(p), log$G_c$(p), log$B_c$(p)] to a reduced image generator 455 and a contrast corrector 457. The tone curve corrector 454 outputs a representative value γ representing the slope of the applied tone curve to the contrast corrector 457.

The reduced image generator 455 generates a logarithmic luminance log$L_{cl}$(p) based on the logarithmic color·signal [log$R_c$(p), log$G_c$(p), log$B_c$(p)] of one frame inputted from the tone curve corrector 454, and stores the resulting logarithmic luminance log$L_{cl}$(p) in a reduced image memory 456.

The contrast corrector 457 corrects the contrast of the logarithmic color signal [log$R_c$(p), log$G_c$(p), log$B_c$(p)] of the current frame inputted from the tone curve corrector 454 and lowered in the cone curve correction process, based on the representative value γ and the reduced image log$L_{cl}$ of the frame, immediately prior to the current frame, stored in the reduced image memory 456. The resulting logarithmic color signal [log$R_u$(p), log$G_u$(p), log$B_u$(p)] is then outputted to an anti-logarithmic converter 458. The anti-logarithmic converter 458 anti-logarithmically converts the contrast-corrected logarithmic color signal [log$R_u$(p), log$G_u$(p), log$B_u$(p)], and outputs the resulting non-logarithmic color signal [$R_u$(p), $G_u$(p), $B_u$(p)] to a gamma corrector 459.

The gamma corrector 459 performs, on the color signal [$R_u$(p), $G_u$(p), $B_u$(p)] inputted from the anti-logarithmic converter 458, a gamma correction process that accounts for gamma characteristics of a replay device (such as the display 120). The resulting gamma-corrected color signal [log$R_g$(p), log$G_g$(p), log$B_g$(p)] is then outputted to both a luminance domain information calculator 460 and a luminance domain normalizer 463. The luminance domain information calculator 460 converts the color signal [log$R_g$(p), log$G_g$(p), log$B_g$(p)] of one frame inputted from the gamma corrector 459 into luminance Y(p), and calculates luminance domain information representing the distribution of the luminance Y(p). The resulting luminance domain information is then outputted to a luminance domain information smoother 461.

The luminance domain information smoother 461 smoothes the luminance domain information based on the luminance domain information of the frame to be smoothed and the luminance domain information (smoothed luminance domain information) of the frames having a predetermined time-sequence relationship with the frame to be smoothed, and stores the resulting smoothed luminance domain information onto the luminance domain information memory 462. The luminance domain information, showing a range of distribution of the luminance Y(p) of one frame, is luminance domain information [$Y_d$, $Y_b$] where $Y_d$ represents luminance close to the darkest end of the distribution and $Y_b$ represents luminance close to the brightest end of the distribution.

The luminance domain normalizer 463 converts the color signal [$\log R_9(p)$, $\log G_9(p)$, $\log B_9(p)$] of the current frame inputted from the gamma corrector 459, based on the luminance domain information [$Y_a, Y_b$] of the frame, immediately prior to the current frame, stored in the luminance domain information smoother 461. The resulting color signal [$R_n(p)$, $G_n(p)$, $B_n(p)$] is then output as a pixel value of a narrow DR color image.

The second arrangement of the DSP 116 of FIG. 32 handling the color image is substantially identical in structure to the first arrangement of the DSP 116 of FIG. 5 handling the monochrome image except that the DSP 116 of FIG. 32 additionally includes the demosaic unit 451 and the color balance adjuster 452. Since the DSP 116 of FIG. 32 handles the color image, each element thereof is slightly different from the counterpart thereof in the DSP 116 of FIG. 5.

Figure 33:
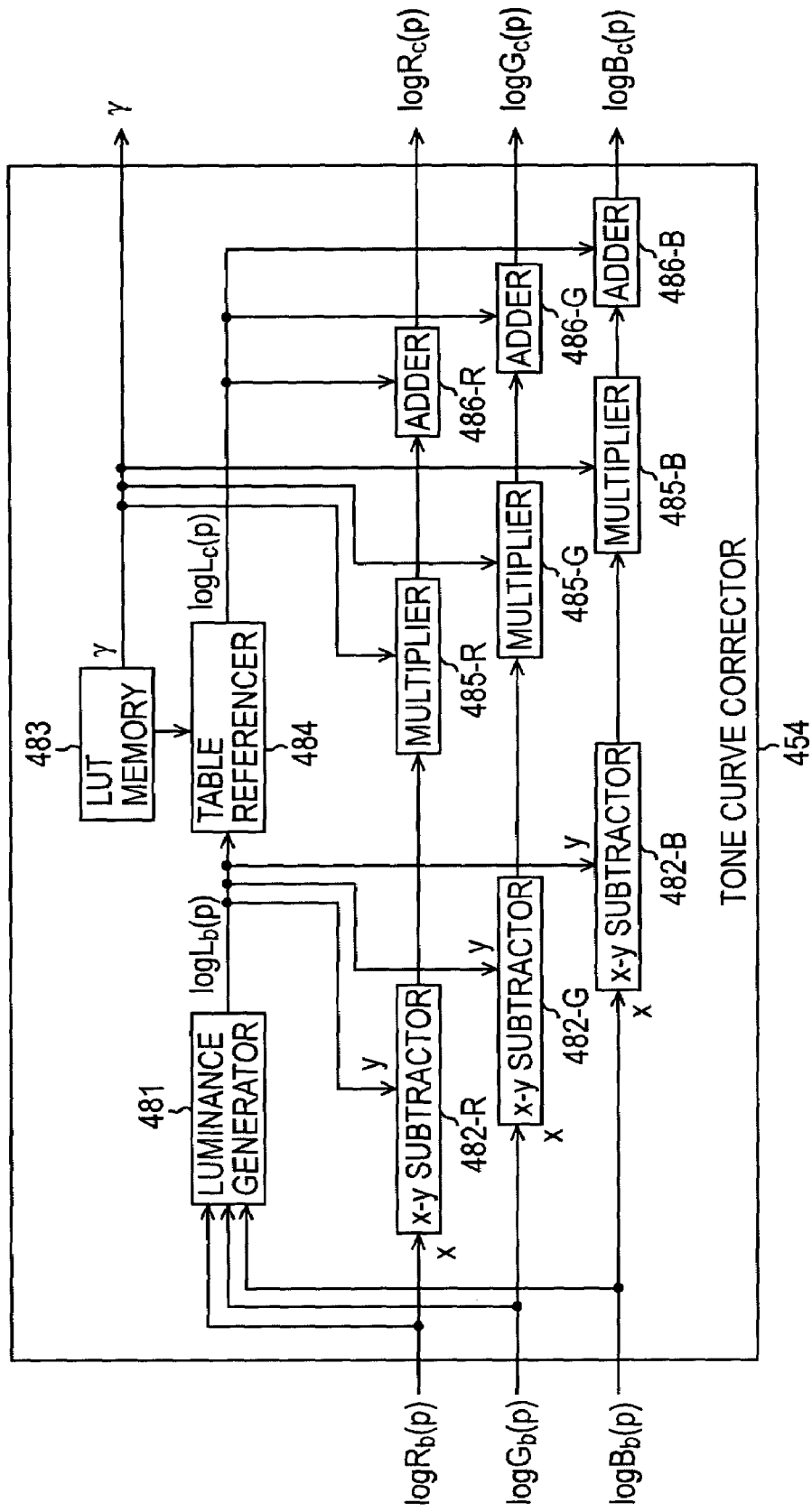
FIG. 33 is a block diagram illustrating a first arrangement of the tone curve corrector of FIG. 32.

FIG. 33 illustrates a first arrangement of the tone curve corrector 454. A luminance generator 481 performs a linear summing operation on the input color signal [$R_b(P)$, $G_b(P)$, $B_b(P)$], generating logarithmic luminance $\log L_b(p)$. The resulting logarithmic luminance $\log L_b(p)$ is outputted to subtractors 482-R, 482-G, and 482-B, and a table referencer 484.

The subtractor 482-R subtracts a logarithmic luminance $\log L_b(p)$ from a logarithmic luminance color signal $\log R_b(p)$, and outputs a resulting difference to a multiplier 485-R. An LUT memory 483 pre-stores an LUT of the tone curve of FIG. 4 and a representative value $\gamma$ representing the slope of the tone curve. A table referencer 484 corrects the logarithmic luminance $\log L(p)$ into the logarithmic luminance $\log L_c(p)$ based on the LUT stored in the LUT memory 483, and outputs the logarithmic luminance $\log L_c(p)$ to adders 486-R, 486-G, and 486-B.

The multiplier 485-R multiplies the output of the subtractor 482-R by the representative value $\gamma$ inputted from the LUT memory 483, and outputs a resulting product to the adder 486-R. The adder 486-R sums the output of the multiplier 485-R and the logarithmic luminance $\log L_c(p)$, and outputs the resulting sum as a tone-curve corrected logarithmic luminance $\log L_c(p)$.

Elements for processing the G and B components remain unchanged from the elements for processing the R component, and the discussion thereof is omitted herein.

Figure 34:
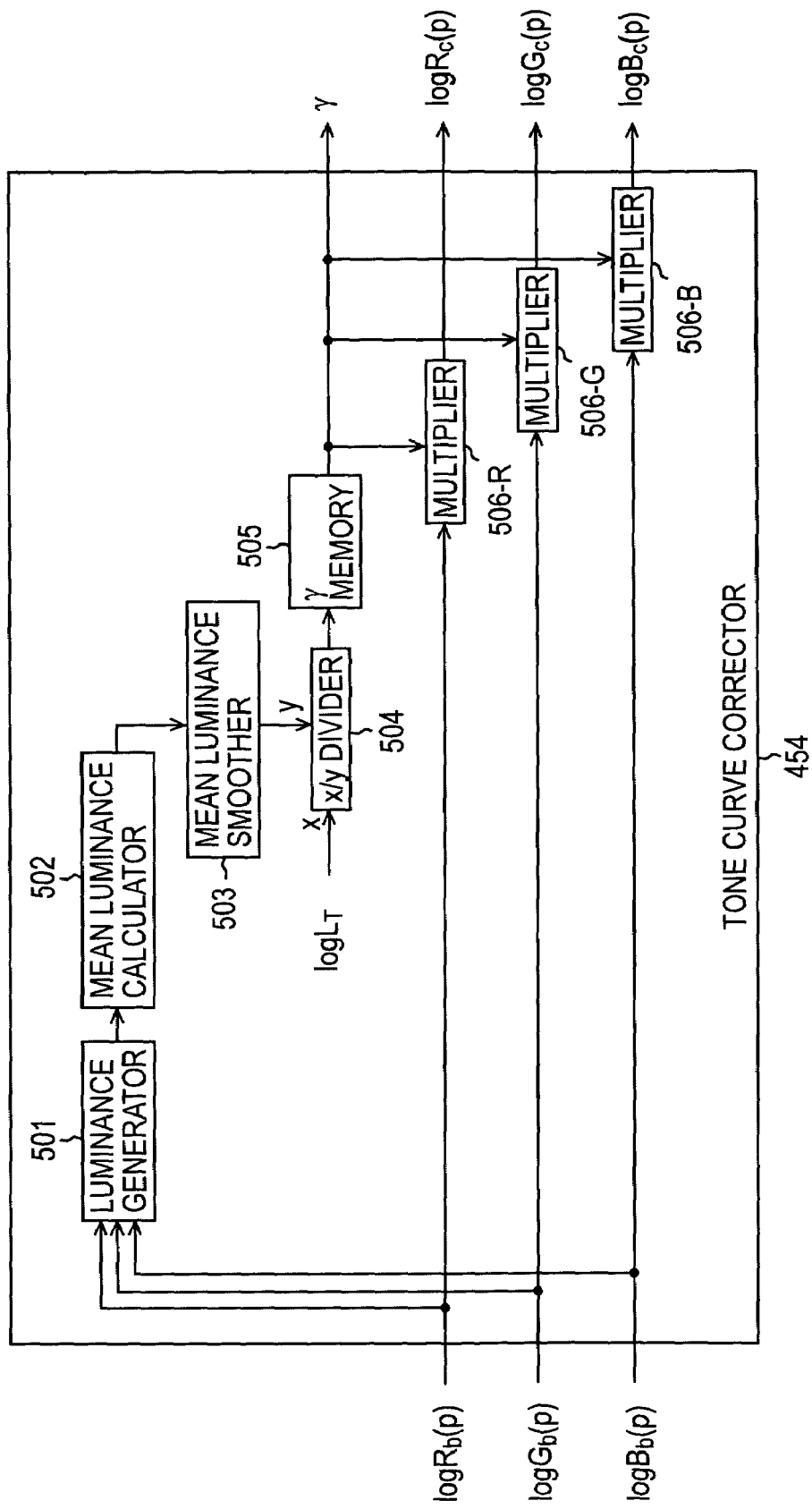
FIG. 34 is a block diagram illustrating a second arrangement of the tone curve corrector of FIG. 32.

FIG. 34 illustrates a second arrangement of the tone curve corrector 454. In the second arrangement, a luminance generator 501 linearly sums the input logarithmic color signal [$\log R_b(p)$, $\log G_b(p)$, $\log B_b(p)$], generating a logarithmic luminance $\log L_b(p)$. The resulting logarithmic luminance $\log L_b(p)$ is then outputted to a mean luminance calculator 502. The mean luminance calculator 502 calculates the mean luminance value $\beta$ of the logarithmic luminance $\log L(p)$ of one frame, and supplies a mean luminance smoother 503 with the mean luminance value $\mu$. The mean luminance smoother 503 smoothes the mean luminance value $\mu$ supplied from the mean luminance calculator 502, based on the mean luminance values of frames prior to and subsequent to the current frame or based on the smoothed mean luminance values of the frames prior to and subsequent to the current frame. The resulting smoothed mean luminance value is then outputted to a divider 504. The divider 504 divides a predetermined constant $\log L_T$ by the representative value $\gamma$ and stores the resulting quotient in a $\gamma$ memory 505.

A multiplier 506-R multiplies the logarithmic luminance color signal $\log L_b(p)$ of the current frame by the representative value $\gamma$ of the frame, immediately prior to the current frame, stored in the $\gamma$ memory 505, thereby calculating the tone-curve corrected logarithmic luminance color signal $\log L_c(p)$.

Elments for processing the G and B components remain identical to the above-referenced elements for processing the R component, and the discussion thereof is omitted herein.

Figure 35:
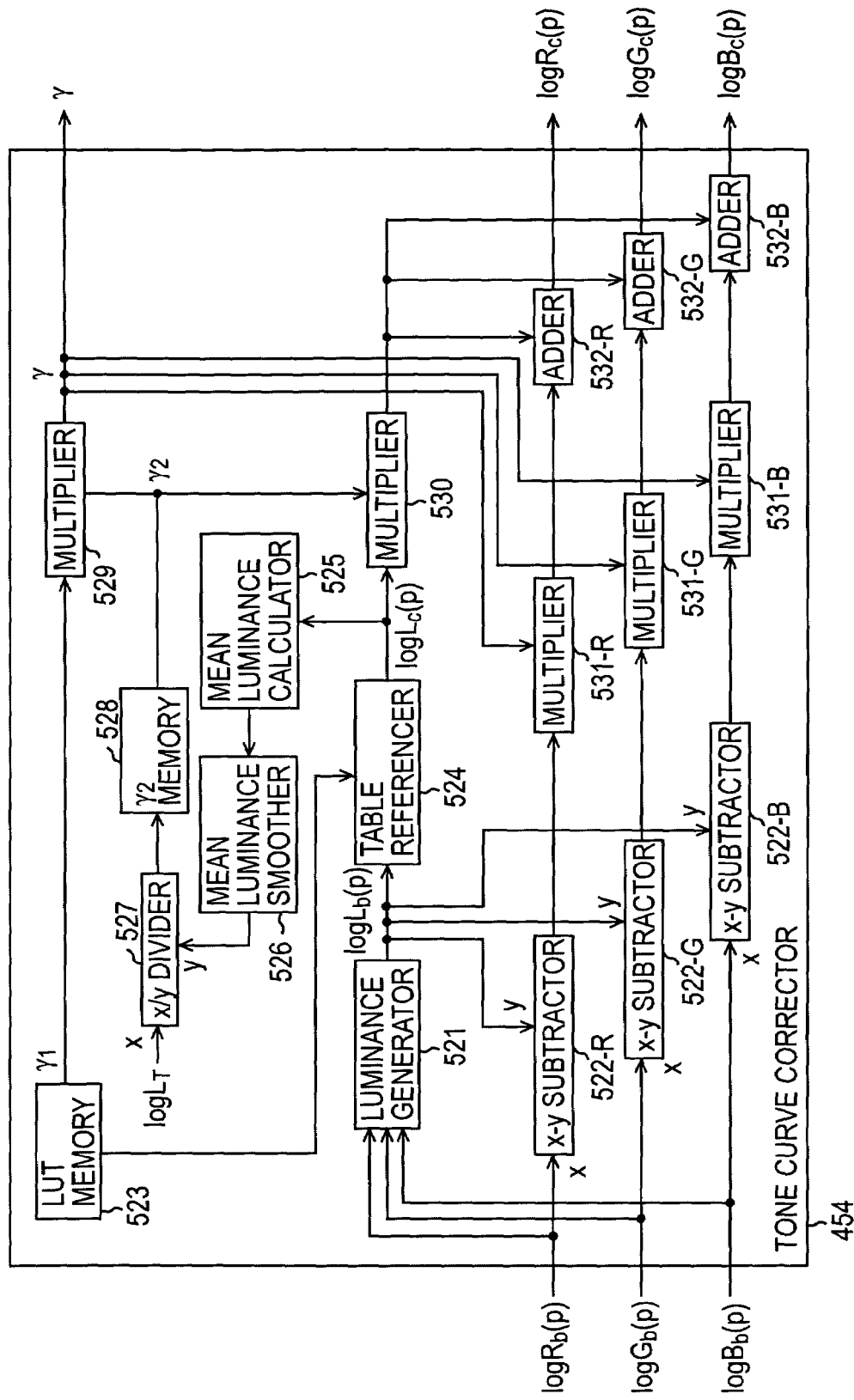
FIG. 35 is a block diagram illustrating a third arrangement of the tone curve generator of FIG. 32.

FIG. 35 illustrates a third arrangement of the tone curve corrector 454. The third arrangement is a combination of the first arrangement and the second arrangement. In the third arrangement of the tone curve corrector 454, a luminance generator 521 linearly sums the inputted logarithmic color signal [$\log R_b(p)$, $\log G_b(p)$, $\log B_b(p)$], generating a logarithmic luminance $\log L_b(p)$. The resulting logarithmic luminance $\log L_b(p)$ is then outputted to subtractors 522-R, 522-G, and 522-B, and a table referencer 524.

The subtractor 522-R subtracts the logarithmic luminance $\log L_b(p)$ from the logarithmic luminance color signal $\log R_b(p)$, and outputs a resulting difference to a multiplier 531-R. An LUT memory 523 pre-stores the LUT of the tone curve of FIG. 4 and a representative value $\gamma_1$ representing the slope of the tone curve. A table referencer 524 corrects the logarithmic luminance $\log L(p)$ into a logarithmic luminance $\log L_c(p)$ based on the LUT stored in the LUT memory 523, and outputs the resulting logarithmic luminance $\log L_c(p)$ to both a mean luminance calculator 525 and a multiplier 530.

The mean luminance calculator 525 calculates the mean luminance value $\mu$ of the logarithmic luminance $\log L_c(p)$ of one frame, and outputs the mean luminance value $\mu$ to a mean luminance smoother 526. The mean luminance smoother 526 smoothes the mean luminance value $\mu$ supplied from the mean luminance calculator 525, based on the mean luminance value $\mu$ of frames prior to and subsequent to the current frame or based on the smoothed mean luminance value $\mu$ of the frames prior to and subsequent to the current frame. The smoothed mean luminance value $\mu$ is then outputted to a divider 527.

The divider 527 calculates a representative value $\gamma_2$ by dividing a predetermined constant $\log L_T$ by the mean luminance value $\mu$, and stores the representative value $\gamma_2$ in a $\gamma_2$ memory 528. A multiplier 529 multiplies representative values $\gamma_1$ and $\gamma_2$ and outputs the product as a representative value $\gamma$ ($=\gamma_1 \cdot \gamma_2$) to the contrast corrector 457 as a subsequent stage.

A multiplier 530 multiplies the logarithmic luminance $\log L_c(p)$ of the current frame by the representative value $\gamma_2$ of the frame, immediately prior to the current frame, stored in the $\gamma_2$ memory 528, thereby calculating the tone-curve corrected logarithmic luminance $\log L_c(p)$. The tone-curve corrected logarithmic luminance $\log L_c(p)$ is outputted to adders 532-R, 532-G, and 532-B.

A multiplier 531-R multiplies the output of a subtractor 522-R by the representative value $\gamma$ inputted from the multiplier 529, and outputs a resulting product to an adder 532-R. The adder 532-R sums the output of the multiplier 531-R and the output of the multiplier 530, and outputs the tone-curve corrected logarithmic luminance $\log L_c(p)$ to the subsequent stage.

The elements for processing the G and B components are identical to those for processing the R component, and the discussion thereof is omitted here.

Figure 36:
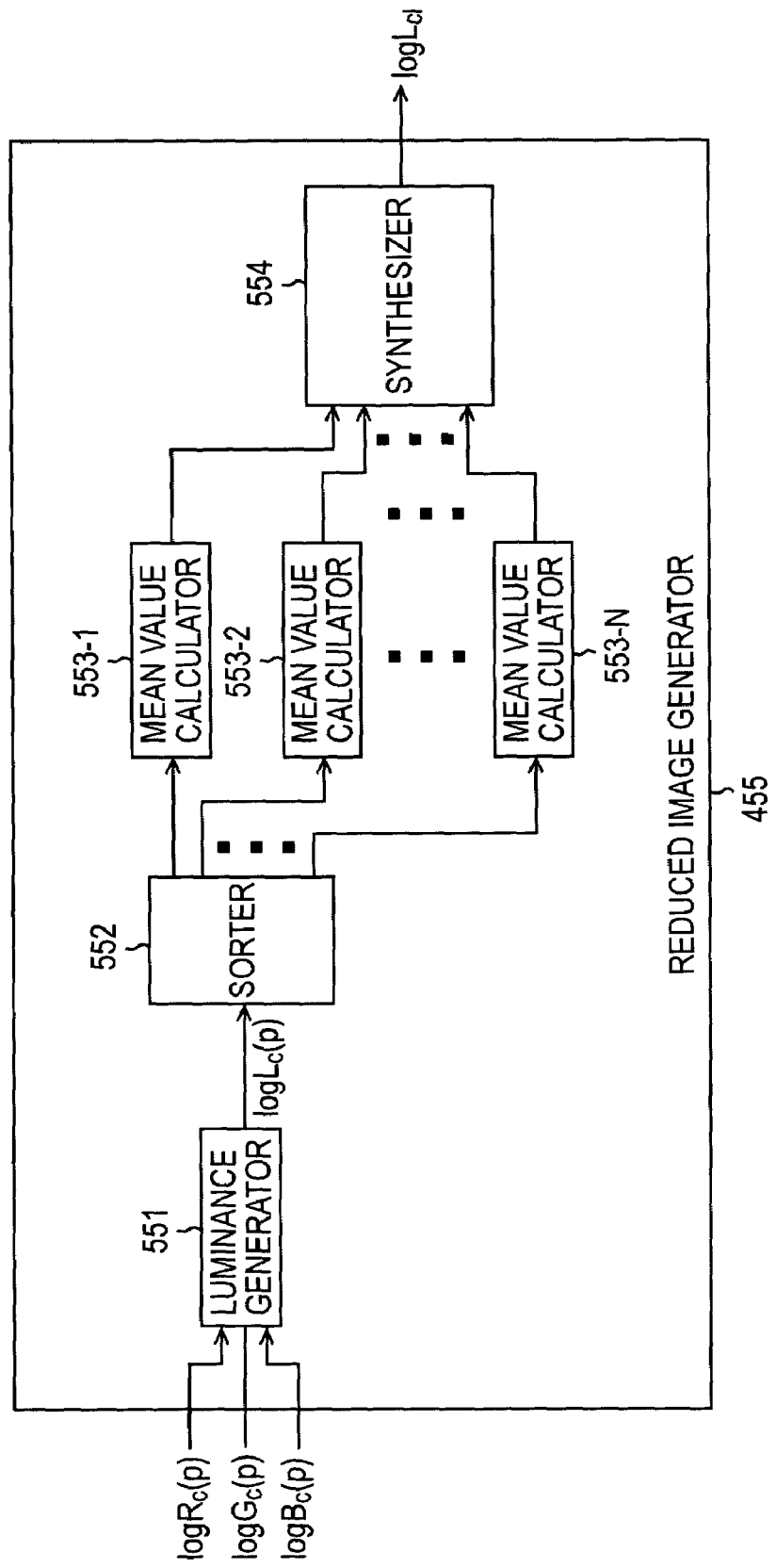
FIG. 36 is a block diagram of a reduced image generator of FIG. 32.

FIG. 36 illustrates the reduced image generator 455. A luminance generator 551 in the reduced image generator 455 linearly sums the input tone-curve corrected logarithmic color signal [$\log R_c(p)$, $\log G_c(p)$, $\log B_c(p)$], thereby generating a logarithmic luminance $\log L_c(p)$. The resulting logarithmic luminance $\log L_c(p)$ is then outputted to a sorter 552.

The sorter 552 sorts the logarithmic luminance $\log L_c(p)$ on a block-by-block basis, wherein the image is segmented into the m×n blocks. The sorted logarithmic luminances $logL_c(p)$ are supplied to the mean value calculators 553-1 through 553-N (N=m×n). For example, the logarithmic luminance $logL_c(p)$ sorted as a first block is supplied to the mean value calculator 553-1, the logarithmic luminance $logL_c(p)$ sorted as a second block is supplied to the mean value calculator 553-2, . . . , the logarithmic luminance $logL_c(p)$ sorted as an N-th block is supplied to the mean value calculator 553-N.

The mean value calculator 553-$i$ ($i$=1, 2 . . . , N) calculates the mean value of the logarithmic luminances $logL_c(p)$ sorted as the i-th block, out of the logarithmic luminances $logL_c(p)$ of one frame, and outputs a resulting mean value to a synthesizer 554. The synthesizer 554 generates a reduced image log $L_{cl}$ of m×n pixels, each having a pixel value of the mean value of the logarithmic luminance $logL_c(p)$ inputted from the mean value calculator 553-$i$, and stores the reduced image log $L_{cl}$ onto the reduced image memory 456 as a subsequent stage.

Figure 37:
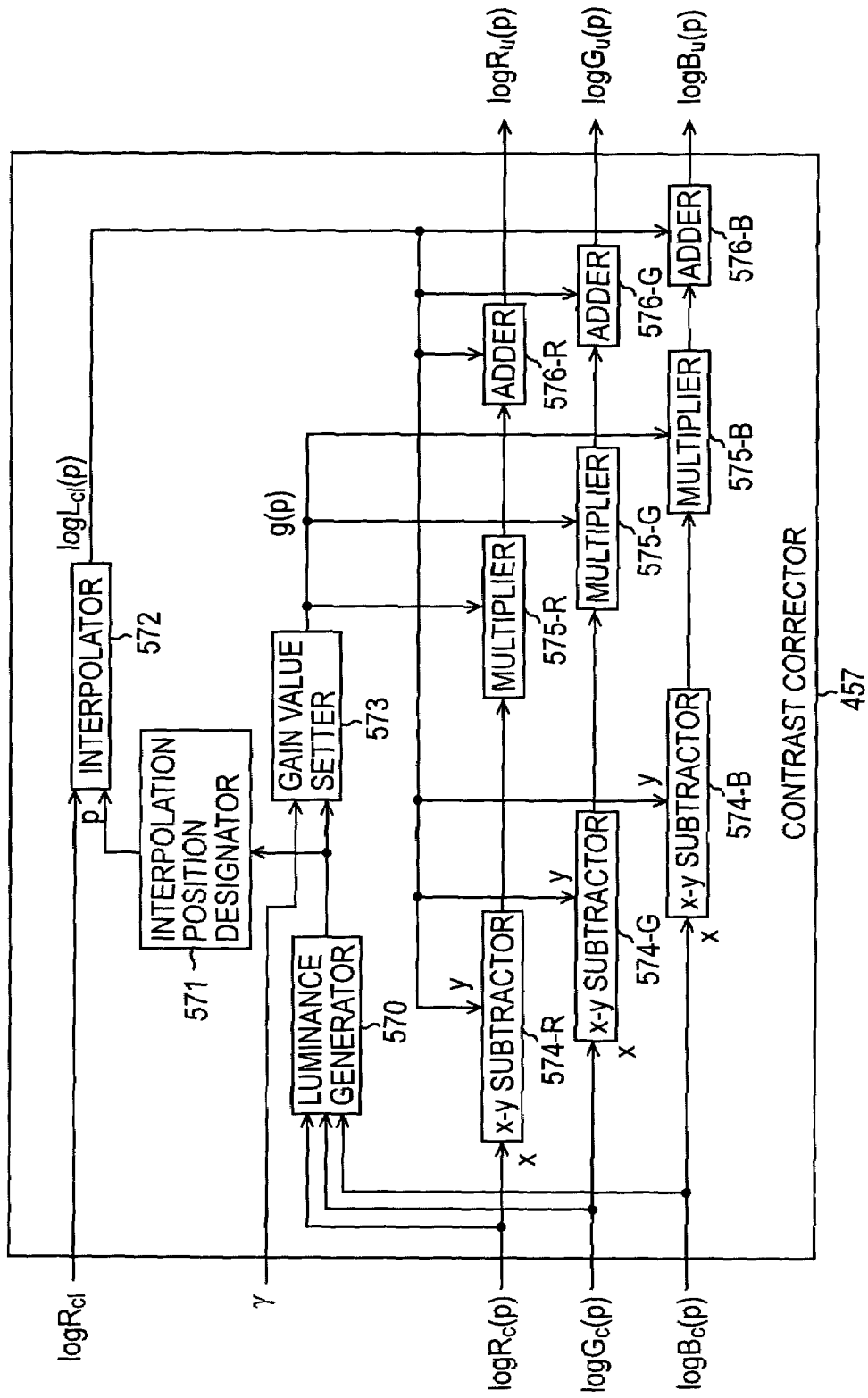
FIG. 37 is a block diagram of a contrast corrector of FIG. 32.

FIG. 37 illustrates the contrast corrector 457. A luminance generator 570 in the contrast corrector 457 linearly sums the input tone-curve corrected logarithmic color signal [$logR_c(p)$, $logG_c(p)$, $logB_c(p)$], thereby generating the logarithmic luminance $logL_c(p)$. The resulting logarithmic luminance $logL_c(p)$ is then outputted to an interpolation position designator 571 and a gain value setter 573.

The interpolation position designator 571 acquires the pixel position p (also referred to as an interpolation position p) of the logarithmic luminance $logL_c(p)$, and outputs the pixel position information to an interpolator 572. Through an interpolation process, the interpolator 572 calculates the pixel $logL_{cl}(p)$ at the interpolation position p based on the reduced image $logL_{cl}(p)$ of the frame, immediately prior to the current frame, stored in the reduced image memory 456. The resulting logarithmic luminance $logL_{cl}(p)$ is outputted to subtractors 574-R, 574-G, and 574-B and adders 576-R, 576-G, and 576-B.

A gain value setter 573 calculates a gain value g(p) determining a contrast enhancement amount of the logarithmic luminance $logL_c(p)$ of the current frame, based on the representative value γ of the prior frame inputted from the tone curve corrector 454, and the logarithmic luminance $logL_c(p)$ of the current frame, and outputs the gain value g(p) to multipliers 575-R, 575-G, and 575B.

The subtractor 574-R subtracts the logarithmic luminance $logL_c(p)$ from the interpolation value logarithmic color signal $logR_{cl}(p)$, and outputs a resulting difference to the multiplier 575-R. The multiplier 575-R multiplies the output of the subtractor 574-R by the gain value g(p), and outputs a resulting product to the adder 576-R. The adder 576-R adds the interpolation value $logL_{cl}(p)$ to the output of the multiplier 575-R, and outputs the resulting sum as a contrast corrected logarithmic color signal $logR_u(p)$ to the subsequent stage.

Elements for processing the G and B components are identical to the elements for processing the R component, and the discussion thereof is omitted herein.

Figure 38:
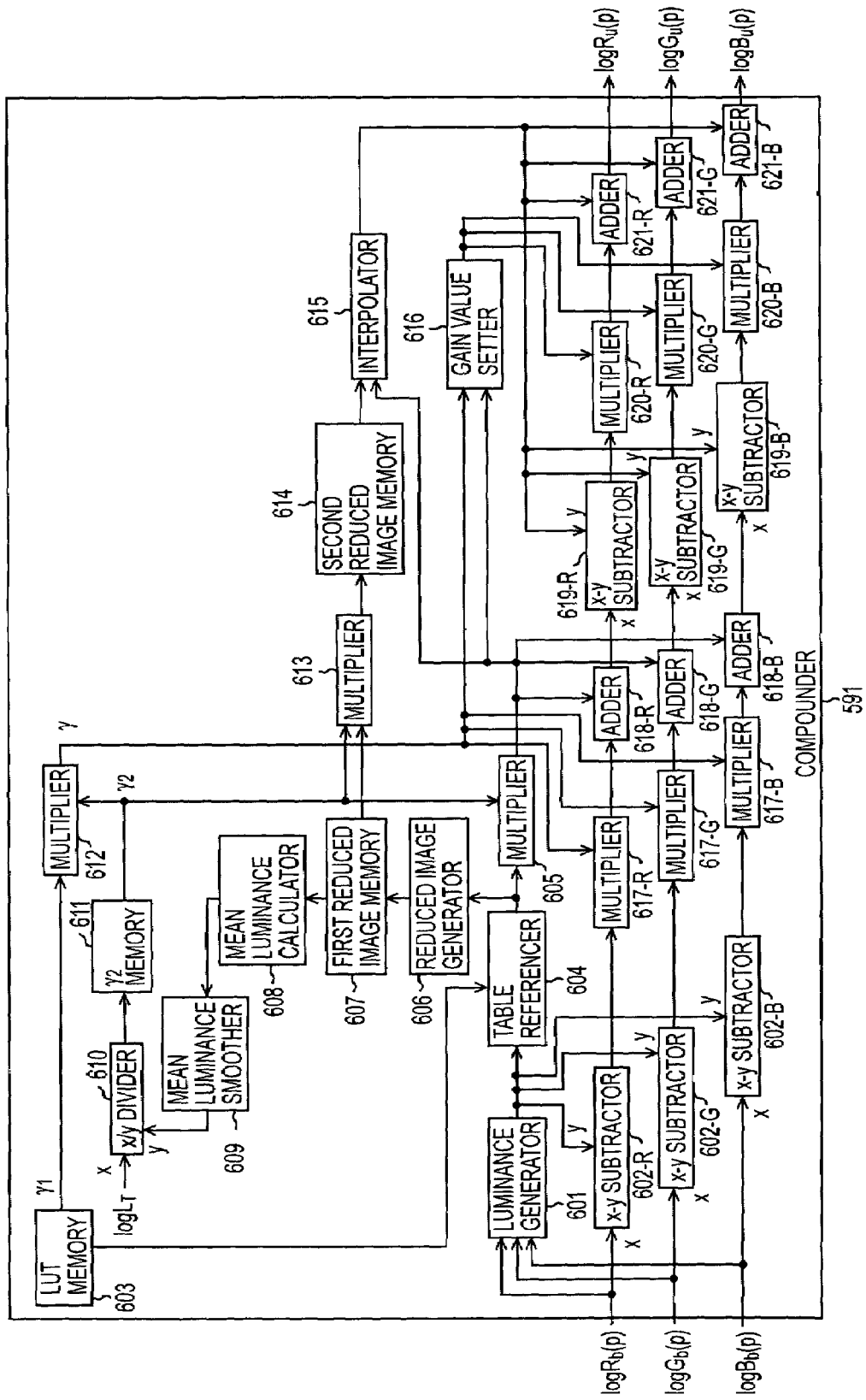
FIG. 38 is a block diagram of a compounder that is interchangeable with elements of FIG. 32 including a tone curve corrector and a contrast enhancer.

FIG. 38 illustrates a compounder 591 that is interchangeable with a group of the tone curve corrector 454, the reduced image generator 455, the reduced image memory 456, and the contrast corrector 457, all shown in FIG. 32.

A luminance generator 601 in the compounder 591 linearly sums the input logarithmic color signal [$logR_b(p)$, $logG_b(p)$, $logB_b(p)$], thereby generating a logarithmic luminance $logL_b(p)$. The resulting logarithmic luminance $logL_b(p)$ is then outputted to subtractors 602-R, 602-G, and 602-B, and a table referencer 604. The subtractor 602-R subtracts the logarithmic luminance $logL_b(p)$ from the logarithmic color signal $logR_b(p)$, and outputs a resulting difference to a multiplier 617-R.

An LUT memory 603 pre-stores the LUT of the tone curve of FIG. 7, and the representative value $γ_1$ representing the slope of the tone curve. A table referencer 604 corrects the logarithmic luminance $logL(p)$ inputted from the luminance generator 601 into a logarithmic luminance $logL_c(p)$, based on the LUT stored in the LUT memory 603. The resulting corrected logarithmic luminance $logL_c(p)$ is then outputted to a multiplier 605 and a reduced image generator 606.

The multiplier 605 multiplies the logarithmic luminance $logL_c(p)$ of the current frame inputted from the table referencer 604 by the representative value $γ_2$ of the frame, immediately prior to the current frame, stored in a $γ_2$ memory 611, thereby calculating a tone-curve corrected logarithmic luminance $logL_c(p)$. The resulting tone-curve corrected logarithmic luminance $logL_c(p)$ is outputted to adders 618-R, 618-G, and 618-B.

A reduced image generator 606 segments the logarithmic color image $logL_c$ into m×n blocks, calculates the mean value of the logarithmic luminance $logL_c(p)$ of pixels belonging to each block, generates a first reduced image of m×n pixels, and stores the first reduced image in a first reduced image memory 607.

The mean luminance calculator 608 calculates the mean luminance value μ of the first reduced image of the frame, immediately prior to the current frame, stored in the first reduced image memory 607, and supplies the mean luminance value μ to a mean luminance smoother 609. The mean luminance smoother 609 smoothes the mean luminance value μ supplied from the mean luminance calculator 608, based on the mean luminance values μ of frames prior to and subsequent to the current frame, or based on the smoothed mean luminance values μ of the frames prior to and subsequent to the current frame. The resulting smoothed mean luminance value μ is supplied to a divider 610. The divider 610 divides a predetermined constant $logL_T$ by the mean luminance value μ to determine a representative value $γ_2$. The resulting representative value $γ_2$ is stored in a $γ_2$ memory 611. A multiplier 612 multiplies the representative values $γ_1$ and $γ_2$, and outputs the resulting product as a representative value γ ($γ_1 \cdot γ_2$). The representative value γ is then outputted to a gain value setter 616 and multipliers 617-R, 617-G, and 617-B.

A multiplier 613 multiplies each pixel of the first reduced image stored in a first reduced image memory 607 by the representative value $γ_2$ stored in the $γ_2$ memory 611, thereby generating a second reduced image luminance $logL_{cl}$. The resulting second reduced image luminance $logL_{cl}$ is then stored in a second reduced image memory 614.

Through an interpolation process, an interpolator 615 calculates a pixel $logL_{cl}$ of the logarithmic luminance $log_{Lc}(p)$ of the current frame, inputted from the multiplier 605, at the pixel position p (hereinafter an interpolation position p), based on the second reduced image $logL_{cl}(p)$ of the frame, immediately prior to the current frame, stored in the second reduced image memory 614. The resulting pixel logarithmic luminance $logL_{cl}$ is then outputted to subtractors 619-R, 619-G, and 619-B, and adders 621-R, 621-G, and 621-B.

The gain value setter 616 calculates the gain value g(p) determining the contrast enhancement amount of the logarithmic luminance $logL_c(p)$ of the current frame, based on the representative value γ of the frame, immediately prior to the current frame, inputted from the multiplier 612 and logarithmic luminance $logL_c(p)$ of the current frame inputted from the multiplier 605.

The multiplier 617-R multiplies the output of the subtractor 602-R by the representative value γ, and outputs a resulting product to an adder 618-R. The adder 618-R sums the output of the multiplier 617-R and the output of the multiplier 605, and outputs the resulting sum to a subtractor 619-R. The subtractor 619-R subtracts the interpolation value $\log L_{cl}(p)$ from the output of the adder 618-R, and outputs a resulting difference to the multiplier 620-R. The multiplier 620-R multiplies the output of the subtractor 619-R by the gain value g(p), and outputs a resulting product to an adder 621-R. The adder 621-R sums the output of the multiplier 620-R and the interpolation value $\log L_{cl}(p)$, and outputs the resulting sum as a contrast corrected logarithmic color signal $\log R_u(p)$ to the subsequent stage.

Elements for processing the G and B components are identical to those for processing the R component, and the discussion thereof is omitted herein.

In the compounder 591, the mean luminance calculator 608 calculates the mean luminance value μ of the m×n pixels in the first reduced image. In comparison with the mean luminance calculator 525 of FIG. 35 calculating the mean luminance value of the logarithmic luminance $\log L_c(p)$ of the image of the original size, the mean luminance calculator 608 enjoys a small amount of computation. A delay time resulting from computation is thus shortened.

Figure 39:
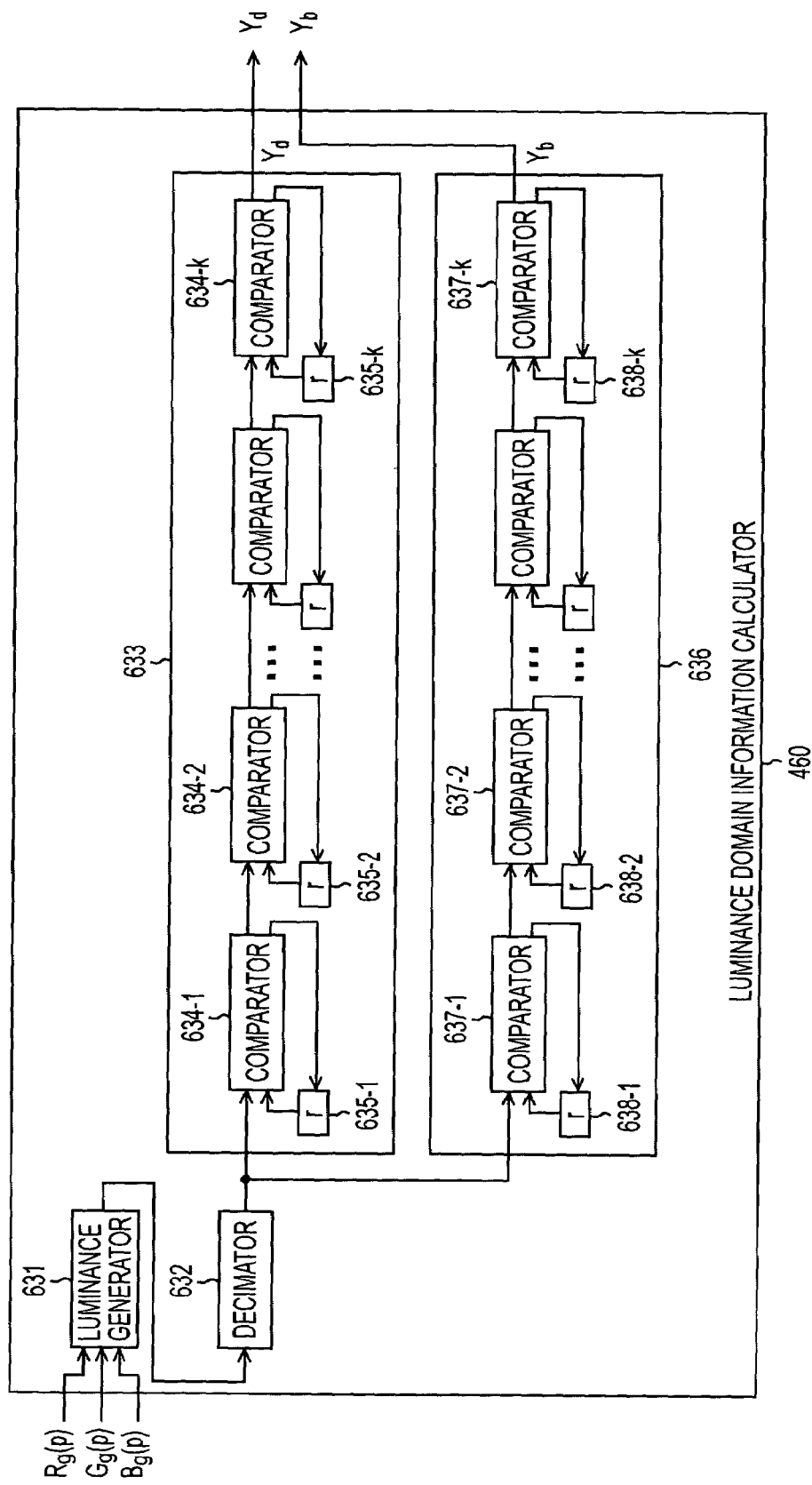
FIG. 39 is a block diagram illustrating a luminance domain information calculator of FIG. 32.

FIG. 39 illustrates the luminance domain information calculator 460. A luminance generator 631 in the luminance domain information calculator 460 linearly sums the gamma corrected color signal $[R_g(p), G_g(p), B_g(p)]$, thereby generating a luminance Y(p). The resulting luminance Y(p) is then outputted to a decimator 632. The decimator 632 selects the luminance Y(p) inputted from a luminance generator 631 in accordance with the pixel position p. More specifically, only the luminance Y(p) of a pixel at the predetermined pixel position is supplied to subsequent MIN sorter 633 and MAX sorter 636.

The MIN sorter 633 includes k stages of comparators 634 and registers 635, connected in a cascade fashion. The input luminance Y(p) is stored in registers 635-1 through 635-k in the magnitude order from low to high luminance level.

For example, the comparator 634-1 compares the luminance Y(p) from the decimator 632 with a value in the register 635-1. If the luminance Y(p) from the decimator 632 is lower than the value in the register 635-1, the comparator 634-1 updates the vale in the register 635-1 with the luminance Y(p) from the decimator 632. Conversely, if the luminance Y(p) from the decimator 632 is not lower than the value in the register 635-1, the luminance Y(p) from the decimator 632 is supplied to the comparator 634-2.

The comparator 634-2 and subsequent comparators operate in the same way. When the luminance Y(p) of one frame is inputted, the register 635-1 stores a minimum value $Y_{min}$ of the luminance Y(p) and register 635-2 through register 635-k store the luminance Y(p) in the magnitude order from low to high luminance level. The luminance Y(p) stored in the register 635-k is outputted to the subsequent stage connected thereto as the luminance $Y_d$ of the luminance domain information.

The MAX sorter 636 includes k states of comparators 637 and registers 638 connected in a cascade fashion. The luminance Y(p) is stored in the register 638-1 through register 638-k in the magnitude order from high to low luminance level.

The comparator 637-1 compares the luminance Y(p) from the decimator 632 with a value in the register 638-1. If the luminance Y(p) from the decimator 632 is higher than the value in the register 638-1, the comparator 637-1 updates the value in the register 638-1 with the luminance Y(p) from the decimator 632. Conversely, if the luminance Y(p) from the decimator 632 is not higher than the value in the register 638-1, the luminance Y(p) from the decimator 632 is supplied to the comparator 637-2.

The comparator 637-2 and subsequent comparators operate in the same way. When the luminance Y(p) of one frame is inputted, the register 638-1 stores a maximum value $Y_{max}$ of the luminance Y(p), and the register 638-2 through the register 638-k store the luminance Y(p) in the magnitude order from high to low luminance level. The luminance Y(p) stored in the register 638-k is then outputted to the subsequent stage as the luminance $Y_b$ in the luminance domain information.

The luminance Y(p), inputted to the MIN sorter 633 and the MAX sorter 636, is the luminance value decimated by the decimator 632. If a decimation interval and the number k of stages in each of the MIN sorter 633 and the MAX sorter 636 are adjusted to proper values, luminances $Y_d$ and $Y_b$, corresponding to top 1 percent or top 0.1 percent and bottom 1 percent or bottom 0.1 percent of all pixels of one frame, can be obtained.

The general gradation conversion process of the second arrangement of the DSP 116 including the compounder 591 is described below with reference to a flowchart of FIG. 40.

In step S111, the demosaic unit 451 in the DSP 116 generates a wide DR color image by performing a demosaic process on a wide DR color mosaic image, and outputs the pixel value of the wide DR color image, i.e., a color signal [R(p), G(p), B(p)] to the color balance adjuster 452 in the order of raster scan. In step S112, the color balance adjuster 452 in the DSP 116 adjusts the R, G, and B components for appropriate color balance in the entire image, and outputs the color signal $[R_b(P), G_b(P), B_b(P)]$.

In step S113, the DSP 116 converts the color signal of the wide DR color image of the input current frame into the narrow DR color image $Y_n$, based on the intermediate information (the second reduced image logarithmic luminance $\log L_c(p)$, the representative value γ, and the luminance domain information $[Y_d, Y_b]$) calculated and stored for the wide DR color signal of the frame immediately prior to the current frame. The DSP 116 then calculates intermediate information of the wide DR color image L of the current frame.

In step S114, the DSP 116 updates the stored intermediate information of the wide DR color image of the frame immediately prior to the current frame with the intermediate information of the calculated wide DR color image L of the current frame.

In step S115, the DSP 116 determines whether a subsequent frame is present to the wide DR color image of the current input frame. If it is determined that a subsequent frame is present, the DSP 116 returns to step S111 to repeat the process in step S111 and subsequent steps. If it is determined in S115 that no subsequent frame is present, the gradation conversion process completes.

Figure 41:
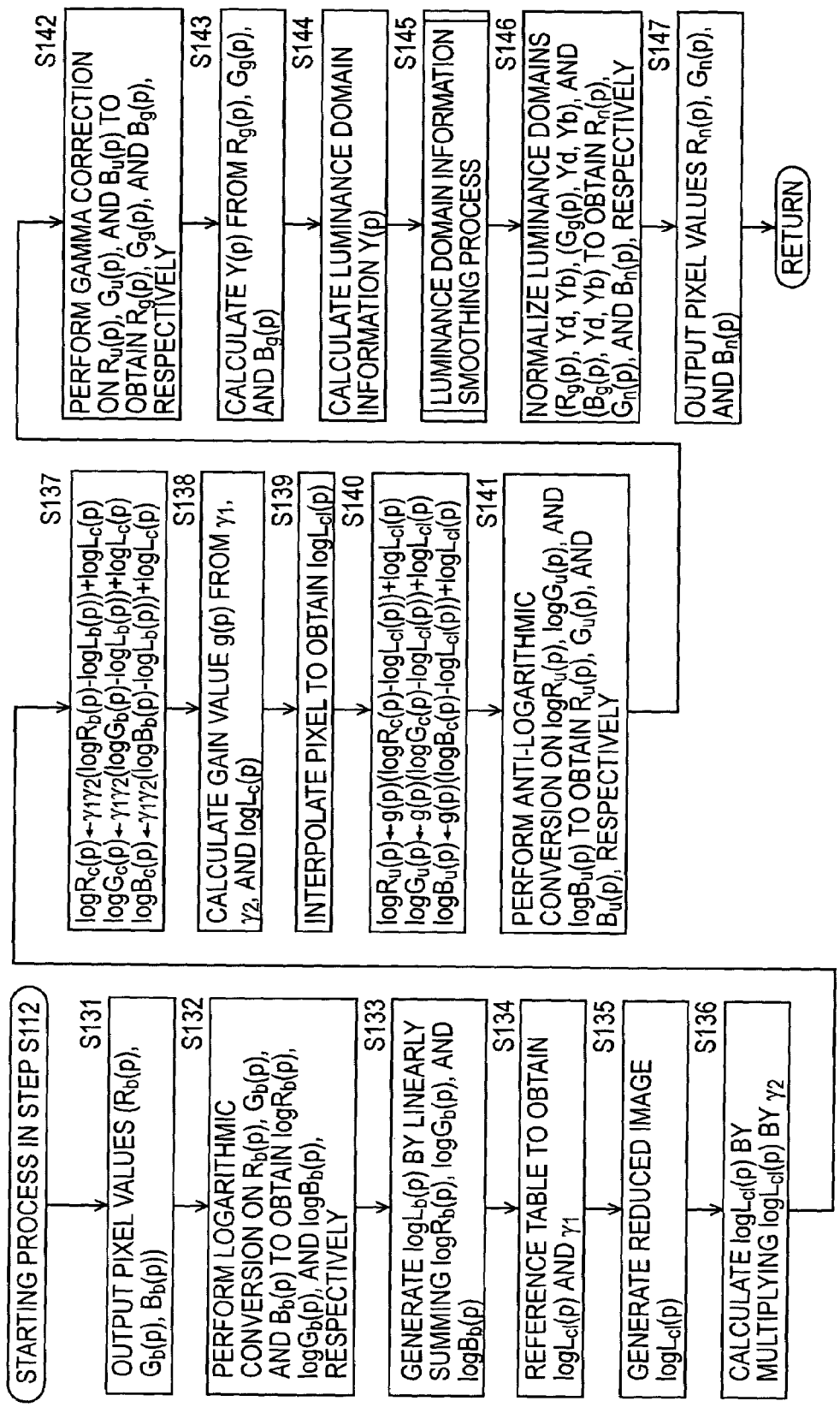
FIG. 41 is a flowchart illustrating a detailed process in step S113 of FIG. 40.

The process on a per pixel basis in step S112 is described below with reference to FIG. 41. Each step in the following process is executed on a pixel of interest (at the pixel position p) inputted in the order of raster scan.

In step S131, the color balance adjuster 452 outputs the generated color signal $[R_b(P), G_b(P), B_b(P)]$ to the logarithmic converter 453. In step S132, the logarithmic converter 453 logarithmically converts the input color signal $[R_b(P), G_b(P), B_b(P)]$, and outputs the resulting logarithmic color signal $[\log R_b(P), \log G_b(p), \log B_b(p)]$ to the compounder 591.

In step S133, the luminance generator 601 in the compounder 591 linearly sums the input logarithmic color signal

[logR$_b$(p), logG$_b$(p), logB$_b$(p)], thereby generating the logarithmic luminance logL$_b$(p). The resulting logarithmic luminance logL$_b$(p) is then outputted to the subtractors 602-R, 602-G, and 602-B, and the table referencer 604. In step S134, the table referencer 604 corrects the input logarithmic luminance logL(p) into the logarithmic luminance logL$_c$(p) in accordance with the LUT stored in the LUT memory 603. The resulting logarithmic luminance logL$_c$(p) is then outputted to the multiplier 605 and the reduced image generator 606.

In step S135, the reduced image generator 606 generates the first reduced image, based on the tone-curve corrected logarithmic luminance logL$_c$(p) of one frame. Based on the first reduced image generated here, the representative value $\gamma_2$ is calculated. The generated first reduced image is multiplied by the representative value $\gamma_2$, and the second reduced image is generated.

In step S136, the multiplier 605 multiplies the logarithmic luminance logL$_c$(p) of the current frame inputted from the table referencer 604 by the representative value $\gamma_2$ of the frame, immediately prior to the current frame, stored in the $\gamma_2$ memory 611, and outputs the tone-curve corrected logarithmic luminance logL$_c$(p).

In step S137, for the R component, the subtractor 602-R, the multiplier 617-R, and the adder 618-R perform the calculation process, thereby generating the tone-curve corrected logarithmic color signal logR$_c$(p). For the G component, the subtractor 602-G, the multiplier 617-G, and the adder 618-G perform the calculation process, thereby generating the tone-curve corrected logarithmic color signal logG$_c$(p). For the B component, the subtractor 602-B, the multiplier 617-B, and the adder 618-B perform the calculation process, thereby generating the tone-curve corrected logarithmic color signal logB$_c$(p).

In step S138, the gain value setter 616 calculates the gain value g(p) determining the contrast enhancement amount of the logarithmic luminance logL$_c$(p) of the current frame, based on the representative value $\gamma$ of the frame, immediately prior to the current frame, inputted from the multiplier 612, and the logarithmic luminance logL$_c$(p) of the current frame inputted from the multiplier 605. In step S139, the interpolator 615 calculates the pixel logL$_{cl}$(p) at the interpolation position p through the interpolation process based on the second reduced image logL$_{cl}$ of the frame, immediately prior to the current frame, stored in the second reduced image memory 614.

In step S140, for the R component, the subtractor 619-R, the multiplier 620-R, and the adder 621-R perform the calculation process, thereby generating the contrast corrected logarithmic color signal logR$_u$(p). For the G component, the subtractor 619-G, the multiplier 620-G, and the adder 621-G perform the calculation process, thereby generating the contrast corrected logarithmic color signal logG$_u$(p). For the B component, the subtractor 619-B, the multiplier 620-B, and the adder 621-B perform the calculation process, thereby generating the contrast corrected logarithmic color signal logB$_u$(p).

In step S141, the anti-logarithmic converter 458 anti-logarithmically converts the contrast-corrected logarithmic color signal [logR$_u$(p), logG$_u$(p), logB$_u$(p)], thereby generating the non-logarithmic color signal [R$_u$(p), G$_u$(p), B$_u$(p)]. The resulting non-logarithmic color signal [R$_u$(p), G$_u$(p), B$_u$(p)] is then outputted to the gamma corrector 459. In step S142, the gamma corrector 459 performs the predetermined gamma correction process, and outputs the resulting gamma-corrected color signal [R$_g$(p), G$_g$(p), B$_g$(p)] to both the luminance domain information calculator 460 and the luminance domain normalizer 463.

In step S143, the luminance generator 631 in the luminance domain information calculator 460 generates the luminance Y(p) from the gamma-corrected color signal [R$_g$(p), G$_g$(p), B$_g$(p)]. In step S144, the MIN sorter 633 and the MAX sorter 636, in the luminance domain information calculator 460, generate the luminance domain information [Y$_d$, Y$_b$] from the luminance Y(p) of one frame.

In step S145, the luminance domain information smoother 461 performs the luminance domain information smoothing process to smooth the luminance domain information [Y$_d$, Y$_b$] and stores the resulting smoothed luminance domain information [Y$_d$, Y$_b$] in the luminance domain information memory 462. The luminance domain information smoothing process has already been discussed with reference to the flowchart of FIG. 25.

In step S146, the luminance domain normalizer 463 normalizes the color signal [R$_g$(p), G$_g$(p), B$_g$(p)] inputted from the gamma corrector 459, based on the luminance domain information [Y$_d$, Y$_b$] of the frame, immediately prior to the current frame, stored in the luminance domain information smoother 461, thereby calculating the color signal [logR$_n$(p), logG$_n$(p), logB$_n$(p)]. In step S147, the luminance domain normalizer 463 outputs the calculated color signal [logR$_c$(p), logG$_n$(p), logB$_n$(p)] as the pixel value of the gradation compressed narrow DR color signal.

Figure 40:
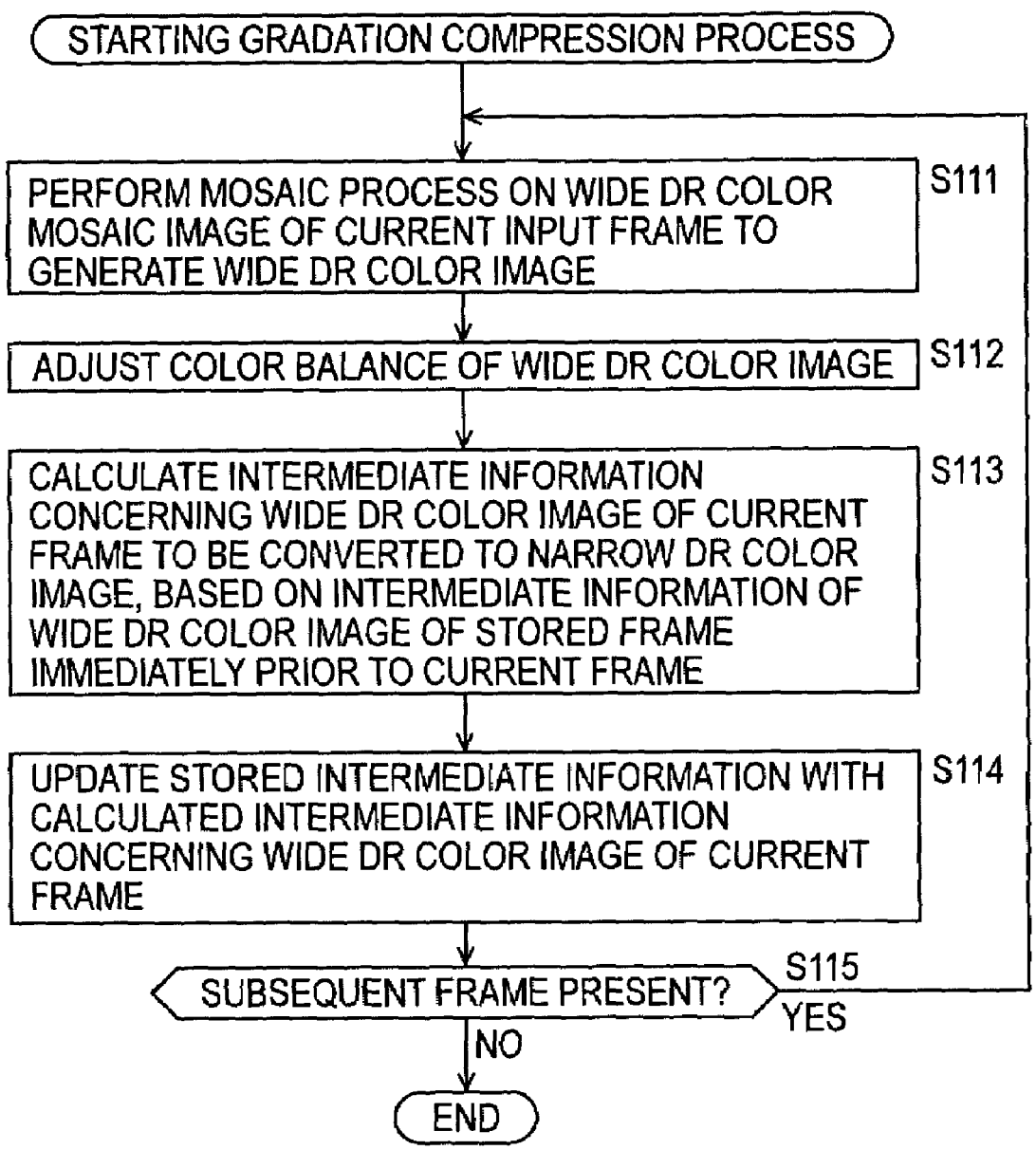
FIG. 40 is a flowchart illustrating a gradation compression process of the second arrangement of the digital signal processor.
Figure 42:
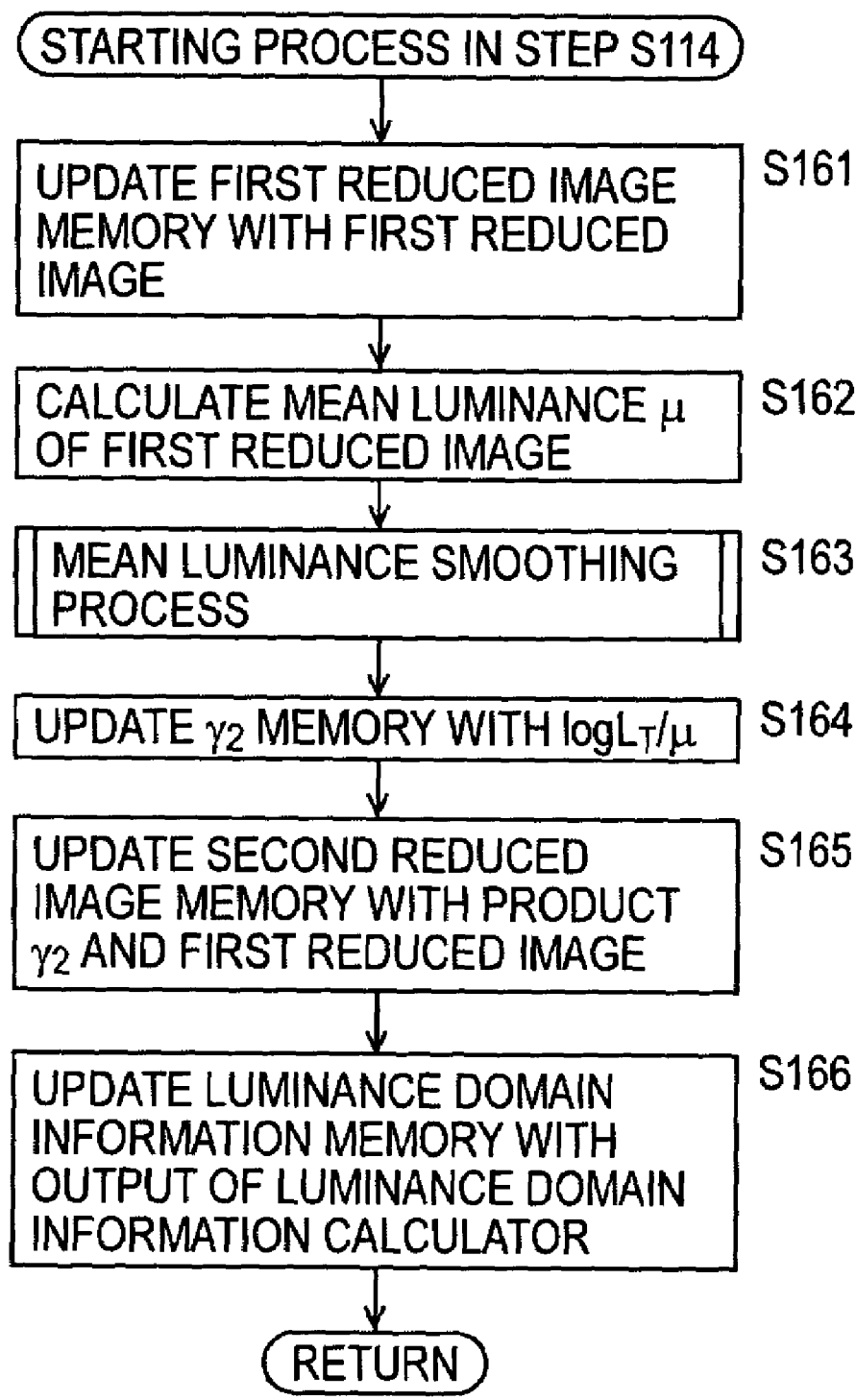
FIG. 42 is a flowchart illustrating a detailed process in step S114 of FIG. 40.

The process in step S114 of FIG. 40 is described in detail below with reference to a flowchart of FIG. 42. In step S161, the reduced image generator 606 updates the first reduced signal, stored in the first reduced image memory 607, with the first reduced image that is generated based on the tone-curve corrected logarithmic luminance logL$_c$(p) of one frame.

In step S162, the mean luminance calculator 608 calculates the mean luminance value $\mu$ based on the pixel value of each pixel in the first reduced image memory 607, and supplies the mean luminance smoother 609 with the calculated mean luminance value $\mu$.

In step S163, the mean luminance smoother 609 smoothes the mean luminance value $\mu$ through the mean luminance value smoothing process, and outputs the resulting smoothed mean luminance value $\mu$ to the divider 610. The mean luminance value smoothing process has been already discussed with reference to the flowchart of FIG. 27.

In step S164, the divider 610 divides the predetermined constant logL$_T$ by the smoothed mean luminance value $\mu$ inputted from the mean luminance smoother 609, thereby calculating the representative value $\gamma_2$. The representative value $\gamma_2$ stored in the $\gamma_2$ memory 611 is updated with the calculated representative value $\gamma_2$.

In step S165, the multiplier 613 multiplies each pixel of the first reduced image updated in step S161 and stored in the first reduced image memory 607 by the representative value $\gamma_2$ updated in step S164 and stored in the $\gamma_2$ memory 611. The multiplier 613 thus generates the second reduced image logL$_{cl}$, and updates the second reduced image logL$_{cl}$ stored in the second reduced image memory 614 with the generated second reduced image logL$_{cl}$.

In step S166, the luminance domain information calculator 460 generates the luminance domain information [Y$_d$, Y$_b$] from the luminance domain information generated from the color signal [R$_g$(p), G$_g$(p), B$_g$(p)] of one frame, and updates the luminance domain information [Y$_d$, Y$_b$] of the frame, immediately prior to the current frame, stored in the luminance domain information smoother 461 with the generated luminance domain information [Y$_d$, Y$_b$].

The mean value of luminance is calculated by each of the mean luminance calculator 191 of FIG. 8, the mean luminance calculator 213 of FIG. 9, the mean luminance calculator 385 of FIG. 22, the mean luminance calculator 502 of FIG. 34, and the mean luminance calculator 525 of FIG. 35. Weighted mean value of luminance may be calculated in this case. For example, weights of a center portion of an image are set to be larger than those of a peripheral portion of the image so that brightness correction is performed with emphasis placed on a reflectance of an object present in the center of the image.

Each of the compounder 371 of FIG. 22 and the compounder 591 of FIG. 38 includes the memory storing the first reduced image and the memory storing the second reduced image that is generated by multiplying the first reduced image by the representative value $\gamma_2$. When the second reduced image is generated, storing the first reduced image is no long necessary, and the two memories may be united into one memory.

The present invention is applied to the digital video camera that captures a wide DR image, and outputs an image with a gradation thereof compressed so that the image is displayable on a narrow dynamic range display. In this arrangement, the gradation compression is performed without the need for a high-capacity memory, such as a frame memory or a delay line for image data. The output image provided by the gradation compression of the present invention is as good as the image provided by known gradation compression techniques that use a large-scale filtering process.

The present invention provides a higher quality and lower cost digital camera than ever before.

In addition to the digital camera, the present invention is applicable to an image pickup device, such as a digital still camera, and an audio-visual device and software program for processing image data.

In the preceding embodiments, the gradation compression process is performed on the wide DR image to display the image on the replay device such as the display 120.

Alternatively, the gradation compression process may be performed to be adapted to a dynamic range of one of a monitor and a printer connected to the digital video camera 101.

Both the mean luminance value and the luminance domain information are successively smoothed based on the smoothed luminance value of the prior frames and the smoothed luminance domain information. Alternatively, only one of the mean luminance value and the luminance domain information may be smoothed.

In the above discussion, the CCD image sensor is used to generate image data. Another type of image sensor may be used. For example, a complementary metal oxide semiconductor (CMOS) image sensor may be substituted for the CCD image sensor 113.

The smoothed mean luminance value of the prior frame or the smoothed luminance domain information of the prior frame or both are successively smoothed. The gradation compression is thus performed taking into consideration frame-by-frame luminance variations in a moving image.

The above series of process steps may be performed using hardware, software, or a combination thereof. If the series of process steps is performed using software, a computer program of process sequence may be installed from a network or a recording medium to a memory of a computer assembled into dedicated hardware, or into a general-purpose computer that performs a variety of functions by installing various programs thereon.

FIG. 43 illustrates a general-purpose computer. The computer includes a central processing unit (CPU) 1001. The CPU 1001 is connected to an input/output interface 1005 via a bus 1004. A read-only memory (ROM) 1002 and a random-access memory (RAM) 1002 are connected to the bus 1004.

Also connected to the input/output interface 1005 are an input unit 1006 including a keyboard with which a user inputs operation commands, and an input device such as a mouse, an output unit 1007 outputting an operation screen and an image as a process result to a display device, a storage unit 1008 such as a hard disk storing programs and a variety of data, and a communication unit 1009, including a local area network (LAN) adapter, for performing a communication process via a network such as the Internet. Furthermore, a drive 1010 is connected to the input/output interface 1005. The drive 1010 reads data from and writes data to a magnetic disk 1021 (including a floppy® disk), an optical disk (such as compact disk-read only memory (CD-ROM), or digital versatile disk (DVD)) 1022, a magneto-optical disk 1023 (such as mini disk (MD)), or a semiconductor memory 1024.

The CPU 1001 performs a variety processes in accordance with a program stored in the ROM 1002, and a program that is read from one of the magnetic disk 1021 through the semiconductor memory 1024, installed onto the storage unit 1008, and then loaded from the storage unit 1008 to the RAM 1003. The RAM 1003 stores, as necessary, data the CPU 1001 requires to execute the variety of processes.

The process steps discussed in this specification are sequentially performed in the time sequence order as stated. Alternatively, the process steps may be performed in parallel or separately.

What is claimed is:

1. An image processing apparatus comprising:

means for calculating luminance domain information representing a width of a luminance distribution of a first frame of an image;

means for smoothing the luminance domain information by using a predetermined weight, a multiplication operation, and a summing operation on the luminance domain information of the first frame to be smoothed and the luminance domain information of a plurality of frames of the image having a time-sequence relationship with the first frame to calculate a smoothed luminance domain information, and outputting the smoothed luminance domain information; and means for normalizing luminance of the image in accordance with a luminance range of a display displaying the image, based on the smoothed luminance domain information.

2. The image processing apparatus according to claim 1, wherein the luminance domain information calculating means calculates a low-end luminance value and a high-end luminance value of the luminance distribution of the image as the luminance domain information.

3. The image processing apparatus according to claim 1, wherein the luminance domain information smoothing means performs, using a predetermined weight, a multiplication and summing operation on the luminance domain information of the first frame to be smoothed and the smoothed luminance domain information of the plurality of frames having a predetermined time-sequence relationship with the first frame to smooth the luminance domain information of the first frame in time sequence and to output the smoothed luminance domain information.

4. The image processing apparatus according to claim 1, further comprising:

means for calculating a mean luminance value of the image;

means for smoothing, in time sequence, the mean luminance value calculated by the mean luminance value calculating means to output smoothed mean luminance value; and means for correcting brightness of the image based on the smoothed mean luminance value outputted from the mean luminance value smoothing means.

5. The image processing apparatus according to claim 4, wherein the mean luminance value calculating means segments the image into m×n blocks, determines a mean luminance value of each block, and performs a multiplication and summing operation on the mean luminance values of the blocks using a predetermined weight in order to calculate the mean luminance value of the image.

6. The image processing apparatus according to claim 4, wherein the mean luminance value time-sequence smoothing means performs, using a predetermined weight, a multiplication and summing operation on a mean pixel value of a first frame to be smoothed and mean pixel values of a plurality of frames having a predetermined time-sequence relationship with the first frame to smooth the mean pixel value of the image in time sequence and to output the smoothed mean pixel value.

7. The image processing apparatus according to claim 4, wherein the mean luminance value time-sequence smoothing means performs, using a predetermined weight, a multiplication operation, and a summing operation on a mean pixel value of the first frame to be smoothed and smoothed mean pixel values of the plurality of frames having a predetermined time-sequence relationship with the first frame to smooth the mean pixel value of the image in time sequence and to output the smoothed mean pixel value.

8. The image processing apparatus according to claim 4, further comprising:

means for logarithmically converting a pixel value of the image; and means for anti-logarithmically converting a pixel value of the image, wherein the mean luminance value calculating means calculates the mean luminance value of the image logarithmically converted by the logarithmically converting means, and wherein the anti-logarithmically converting means anti-logarithmically converts the image corrected by the brightness correcting means.

9. An image processing method comprising steps of:

calculating luminance domain information representing a width of a luminance distribution of a first frame of an image;

smoothing the luminance domain information by using a predetermined weight, a multiplication operation, and a summing operation on the luminance domain information of the first frame to be smoothed and the luminance domain information of a plurality of frames of the image having a time-sequence relationship with the first frame to calculate a smoothed luminance domain information, and outputting the smoothed luminance domain information; and normalizing luminance of the image in accordance with a luminance range of a display displaying the image, based on the smoothed luminance domain information.

10. A recording medium storing a computer-executable program comprising program codes for performing steps of:

calculating luminance domain information representing a width of a luminance distribution of a first frame of an image;

smoothing the luminance domain information by using a predetermined weight, a multiplication operation, and a summing operation on the luminance domain information of the first frame to be smoothed and the luminance domain information of a plurality of frames of the image having a time-sequence relationship with the first frame to calculate a smoothed luminance domain information, and outputting the smoothed luminance domain information; and normalizing luminance of the image in accordance with a luminance range of a display displaying the image, based on the smoothed luminance domain information.

11. An image processing apparatus comprising:

means for calculating a mean luminance value of a first frame of an image;

means for smoothing, in time sequence, the mean luminance value by using a predetermined weight, a multiplication operation, and a summing operation on a mean pixel value of the first frame to be smoothed and mean pixel values of a plurality of frames having a predetermined time-sequence relationship with the first frame for smoothing the mean pixel value of the image, and outputting a smoothed mean luminance value; and means for correcting brightness of the image based on the smoothed mean luminance value.

12. The image processing apparatus according to claim 11, wherein the mean luminance value calculating means segments the image into m×n blocks, determines a mean luminance value of each block, and performs a multiplication and summing operation on the mean luminance values of the blocks using a predetermined weight in order to calculate the mean luminance value of the image.

13. The image processing apparatus according to claim claim 11, wherein the mean luminance value time-sequence smoothing means performs, using a predetermined weight, a multiplication operation, and a summing operation on a mean pixel value of the first frame to be smoothed and smoothed mean pixel values of the plurality of frames having a predetermined time-sequence relationship with the first frame to smooth the mean pixel value of the image in time sequence and to output the smoothed mean luminance value.

14. The image processing apparatus according to claim 11, further comprising:

means for logarithmically converting a pixel value of the image; and means for anti-logarithmically converting a pixel value of the image, wherein the mean luminance value calculating means calculates the mean luminance value of the image logarithmically converted by the logarithmically converting means, and wherein the anti-logarithmically converting means anti-logarithmically converts the image corrected by the brightness correcting means.

15. An image processing method comprising steps of:

calculating a mean luminance value of a first frame of an image;

smoothing, in time sequence, the mean luminance value by using a predetermined weight, a multiplication operation, and a summing operation on a mean pixel value of the first frame to be smoothed and mean pixel values of a plurality of frames having a predetermined time-sequence relationship with the first frame for smoothing the mean pixel value of the image, and outputting a smoothed mean luminance value; and correcting brightness of the image based on the smoothed mean luminance value.

16. A recording medium storing a computer-executable program comprising program codes for performing steps of:
calculating a mean luminance value of a first frame of an image;
smoothing, in time sequence, the mean luminance value by using a predetermined weight, a multiplication operation, and a summing operation on a mean pixel value of the first frame to be smoothed and mean pixel values of a plurality of frames having a predetermined time-sequence relationship with the first frame for smoothing the mean pixel value of the image, and outputting a smoothed mean luminance value; and
correcting brightness of the image based on the smoothed mean luminance value.

* * * * *

UNITED STATES PATENT AND TRADEMARK OFFICE
CERTIFICATE OF CORRECTION

| | |
|---|---|
| PATENT NO. | : 7,551,794 B2 |
| APPLICATION NO. | : 11/037806 |
| DATED | : June 23, 2009 |
| INVENTOR(S) | : Tomonori Masuno et al. |

Page 1 of 1

It is certified that error appears in the above-identified patent and that said Letters Patent is hereby corrected as shown below:

In claim 3, column 38, line 58, change "and the smoothed" to --and smoothed--.

Signed and Sealed this

Third Day of November, 2009

David J. Kappos
*Director of the United States Patent and Trademark Office*